US008434133B2

(12) United States Patent
Kulkarni et al.

(10) Patent No.: US 8,434,133 B2
(45) Date of Patent: Apr. 30, 2013

(54) SINGLE-PARTY, SECURE MULTI-CHANNEL AUTHENTICATION

(75) Inventors: Rajandra Laxman Kulkarni, Burlington, MA (US); Adam Greenberg, Lincoln, MA (US); Anthony M. Marotto, Cambridge, MA (US); William A. Thornton, III, Sherborn, MA (US)

(73) Assignee: FMR LLC, Boston, MA (US)

( * ) Notice: Subject to any disclaimer, the term of this patent is extended or adjusted under 35 U.S.C. 154(b) by 1129 days.

(21) Appl. No.: 11/752,265

(22) Filed: May 22, 2007

(65) Prior Publication Data

US 2008/0086764 A1 Apr. 10, 2008

Related U.S. Application Data

(60) Provisional application No. 60/849,971, filed on Oct. 6, 2006.

(51) Int. Cl.

| | |
|---|---|
| ***G06F 7/04*** | (2006.01) |
| ***G06F 15/16*** | (2006.01) |
| ***G06F 17/30*** | (2006.01) |
| ***H04L 29/06*** | (2006.01) |

(52) U.S. Cl.
USPC .......................................... 726/7; 726/4; 726/5

(58) Field of Classification Search ................ 726/1–10, 726/17, 20, 21
See application file for complete search history.

(56) References Cited

U.S. PATENT DOCUMENTS

| | | | | |
|---|---|---|---|---|
| 5,805,801 | A | 9/1998 | Holloway et al. | |
| 6,189,032 | B1 * | 2/2001 | Susaki et al. | 709/225 |
| 6,199,113 | B1 | 3/2001 | Alegre et al. | |
| 6,341,352 | B1 * | 1/2002 | Child et al. | 726/1 |
| 6,477,648 | B1 | 11/2002 | Schell et al. | |
| 6,704,787 | B1 | 3/2004 | Umbreit | |
| 7,043,230 | B1 | 5/2006 | Geddes et al. | 455/410 |
| 7,103,663 | B2 | 9/2006 | Inoue et al. | |
| 7,140,045 | B2 | 11/2006 | Gudorf et al. | |
| 7,334,254 | B1 | 2/2008 | Boydstun et al. | |
| 7,373,671 | B2 | 5/2008 | Gudorf et al. | |
| 7,444,518 | B1 | 10/2008 | Dharmarajan et al. | |
| 7,870,599 | B2 * | 1/2011 | Pemmaraju | 726/2 |
| 2002/0049907 | A1 | 4/2002 | Woods et al. | |
| 2002/0147801 | A1 | 10/2002 | Gullotta et al. | |

(Continued)

OTHER PUBLICATIONS

International Search Report for International Application No. PCT/US2007/080645 dated Feb. 26, 2008.
"IBM Tivoli Software Presentation", 2007.
Jun. 3, 2010 Office Action for U.S. Appl. No. 11/752,266 (19 pages).
Apr. 27, 2010 Office Action for U.S. Appl. No. 11/752,269 (19 pages).

(Continued)

*Primary Examiner* — Edan Orgad
*Assistant Examiner* — Jahangir Kabir
(74) *Attorney, Agent, or Firm* — Proskauer Rose LLP

(57) ABSTRACT

A method for using multiple channels to authenticate a user, wherein a first authentication parameter from a first device associated with a user is received over a first channel, a token value is transmitted to the user on the first channel, and the user transmits the token value and a second authentication parameter over a second channel. The token value is used to associate the first authentication parameter to the second authentication parameter, whereby the user is authenticated on the first channel.

13 Claims, 45 Drawing Sheets

U.S. PATENT DOCUMENTS

| | | | | |
|---|---|---|---|---|
| 2002/0156879 | A1 | 10/2002 | Delany et al. | |
| 2002/0165960 | A1 | 11/2002 | Chan | |
| 2003/0005135 | A1 | 1/2003 | Inoue et al. | |
| 2003/0084172 | A1 | 5/2003 | deJong et al. | |
| 2003/0154406 | A1 | 8/2003 | Honarvar et al. | |
| 2004/0010724 | A1 | 1/2004 | Brown et al. | |
| 2004/0117818 | A1 | 6/2004 | Karaoguz et al. | |
| 2005/0273442 | A1 | 12/2005 | Bennett et al. | 705/67 |
| 2006/0041755 | A1 * | 2/2006 | Pemmaraju | 713/182 |
| 2006/0206717 | A1 * | 9/2006 | Holt et al. | 713/182 |
| 2007/0143824 | A1 | 6/2007 | Shahbazi | |
| 2007/0162766 | A1 * | 7/2007 | Watanabe | 713/193 |
| 2008/0091618 | A1 * | 4/2008 | Obrea et al. | 705/76 |

OTHER PUBLICATIONS

Apache HTTP Server Version 1.3, Authentication, Authorization, and Access Control, downloaded Apr. 23, 2011, 16 pages.

MacGregor et al., NIST Special Publication 800-103, Draft, An Ontology of Identity Credentials Part 1: Background and Formulation, Oct. 2006, 70 Pages.

Burr et al., NIST Special Publication 800-63 Version 1.0.2, Electronic Authentication Guideline, Apr. 2006, 64 Pages.

Jan. 13, 2011 Office Action for U.S. Appl. No. 11/752,266.

Dec. 9, 2010 Office Action for U.S. Appl. No. 11/752,269.

* cited by examiner

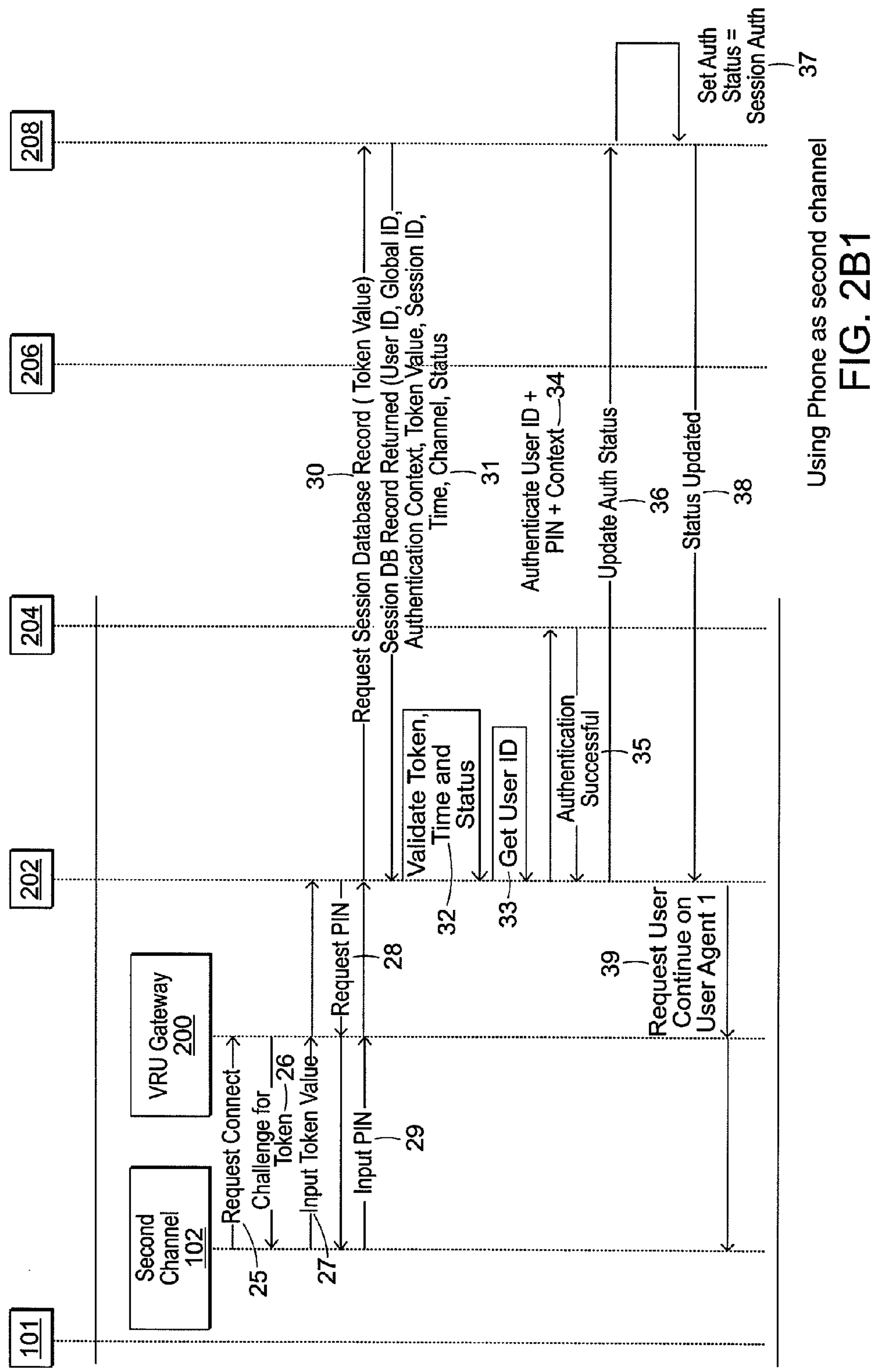
FIG. 2B1

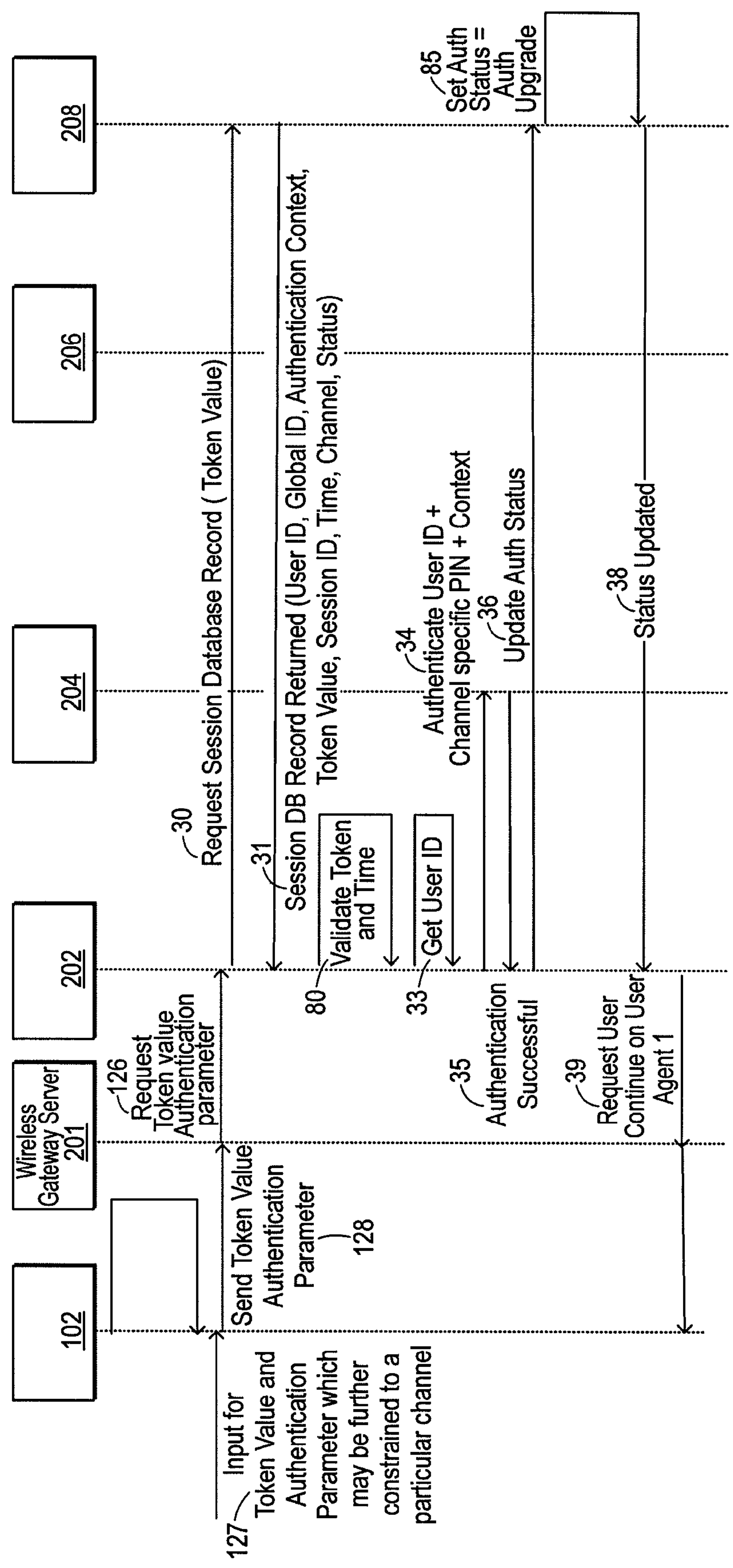
FIG. 2B2

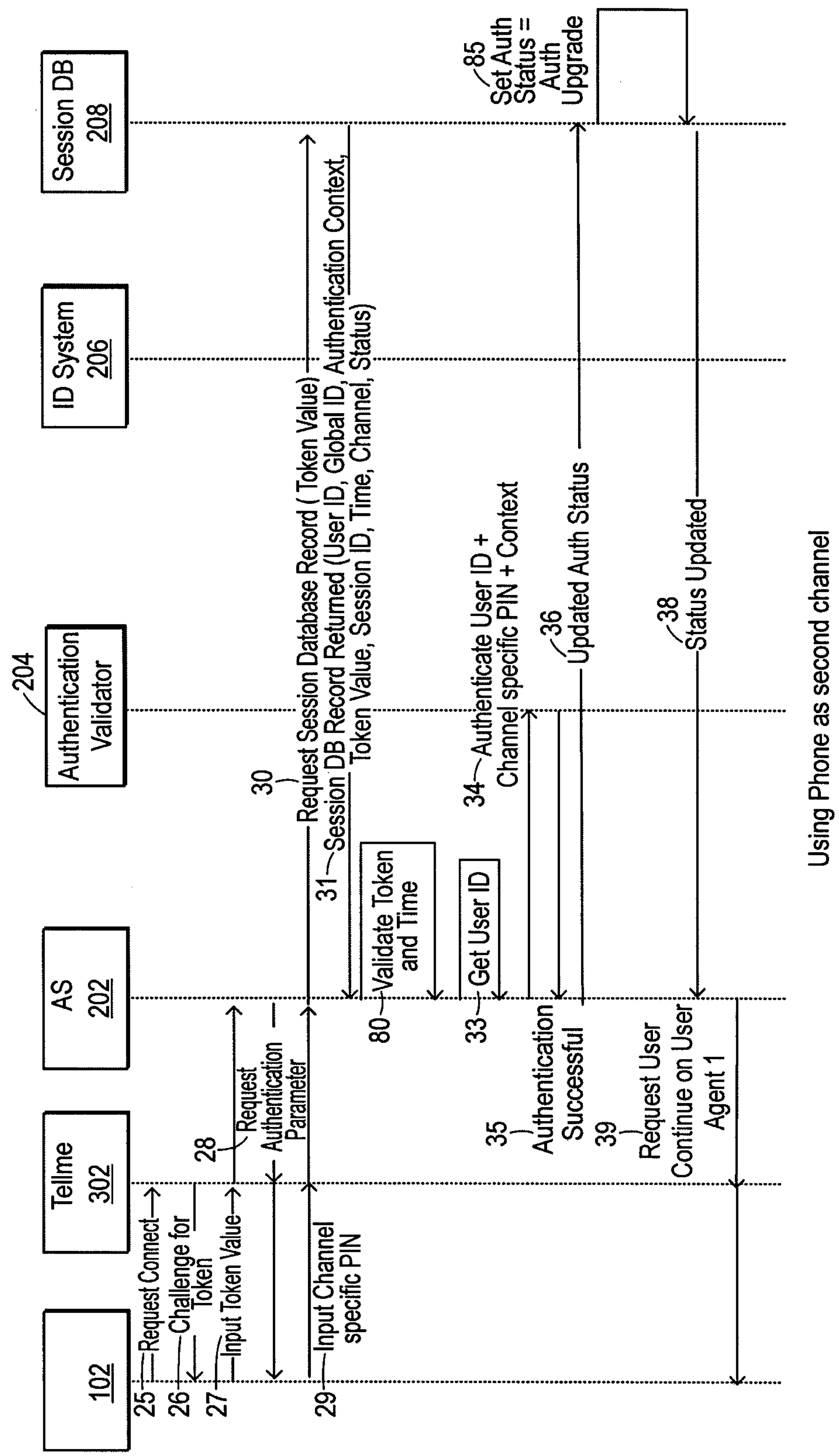
FIG. 3B1

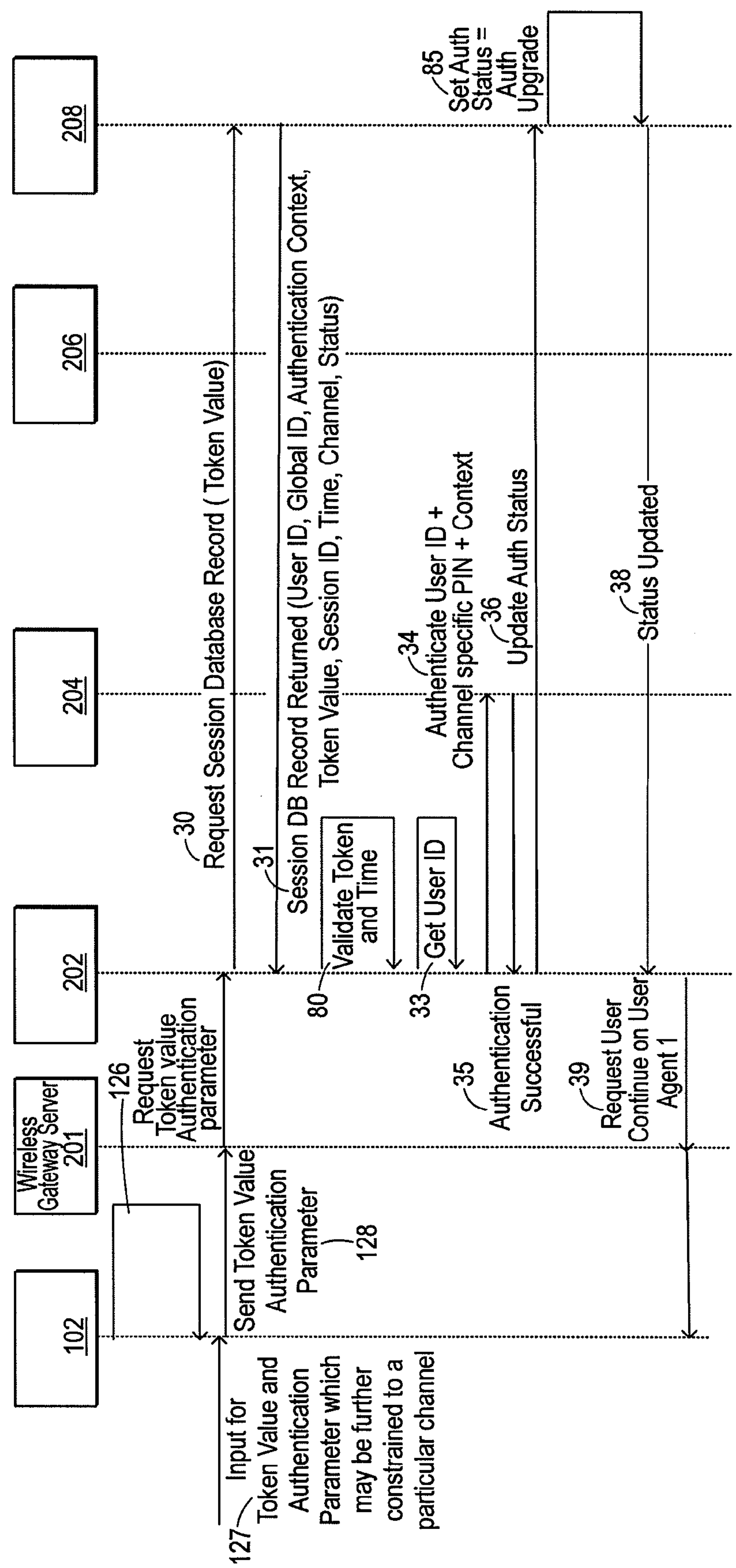
FIG. 3B2

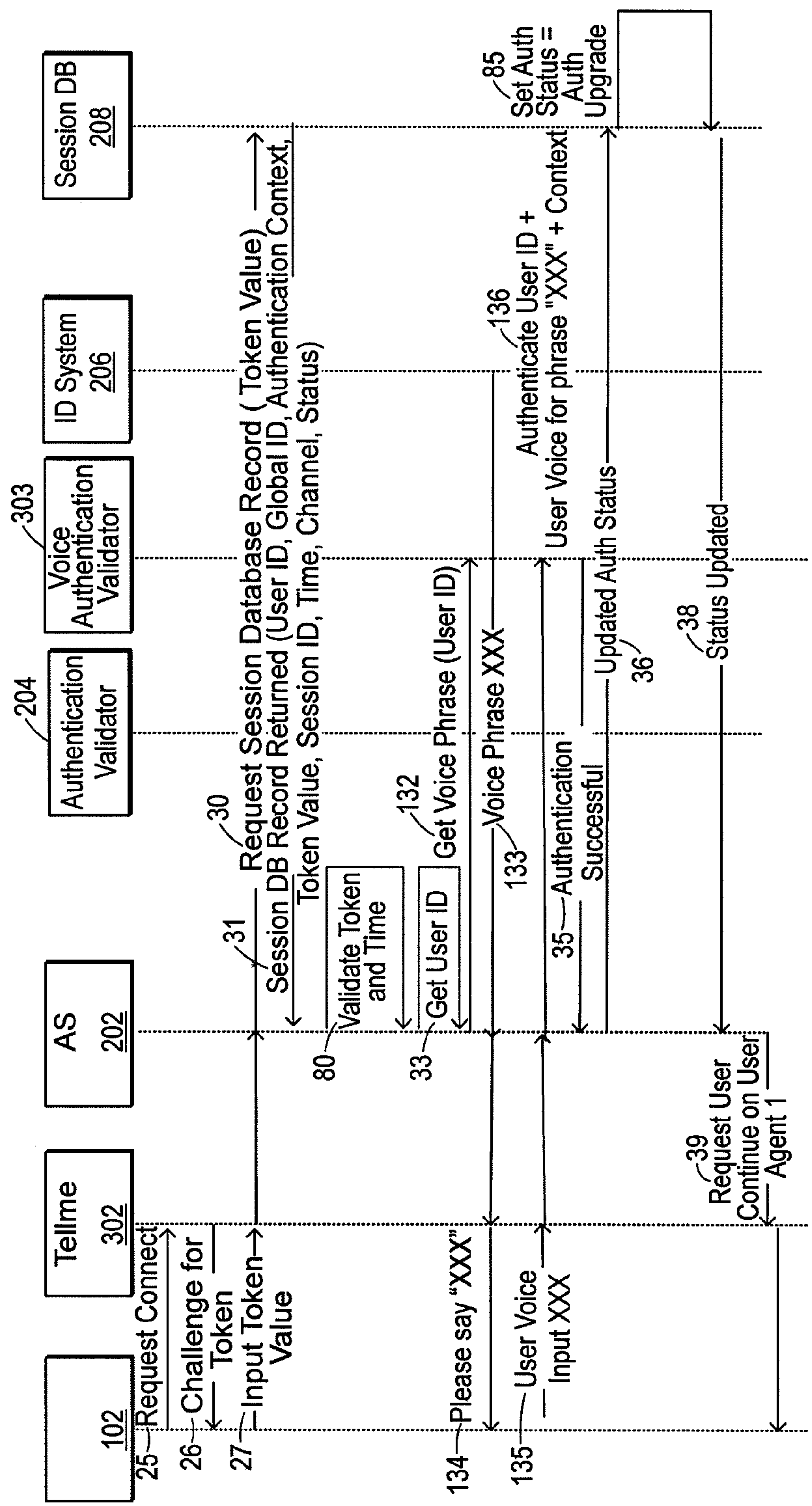
Using Phone as second channel and Voice as Authenticatior
FIG. 3B3

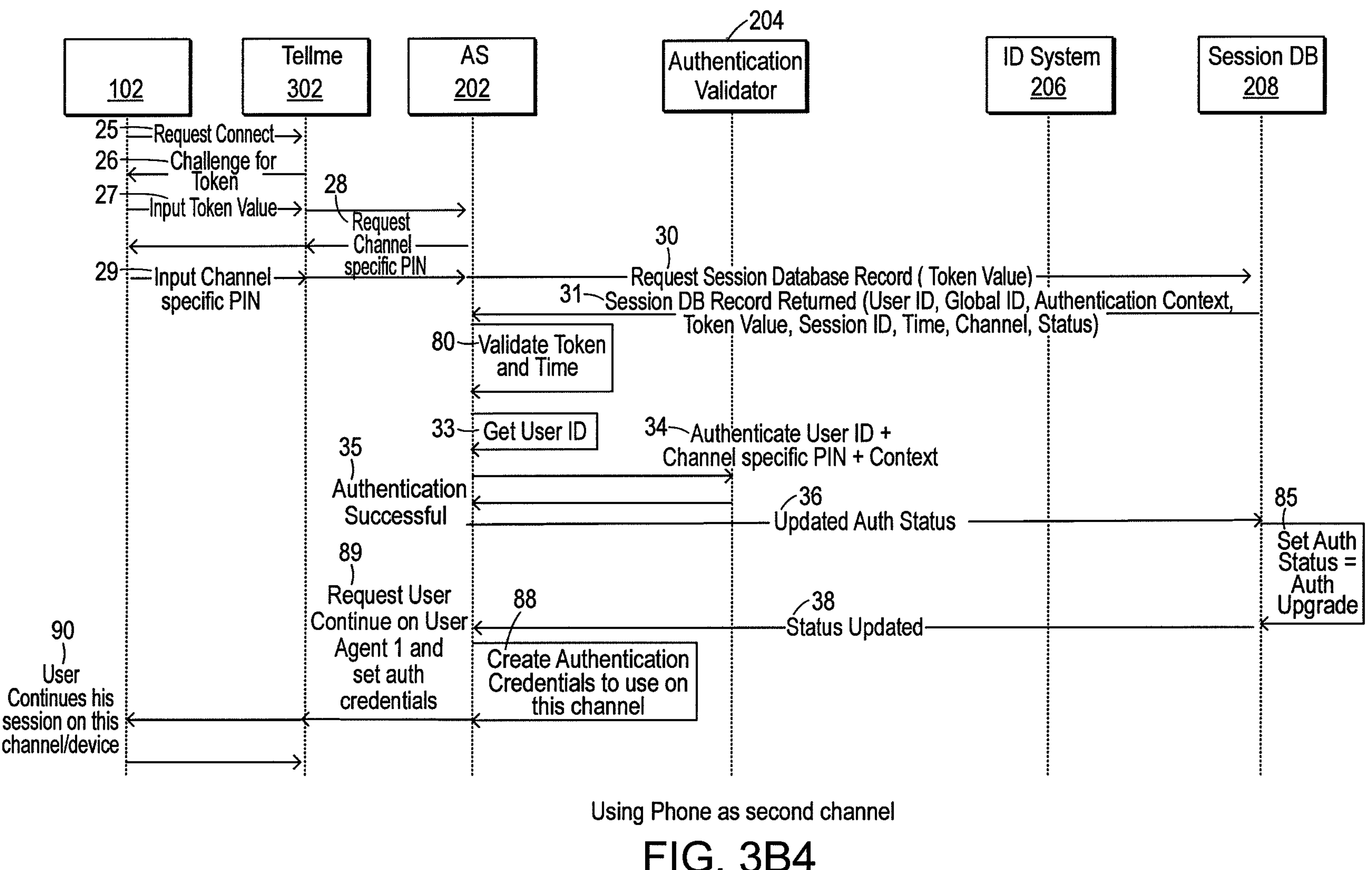
Using Phone as second channel
FIG. 3B4

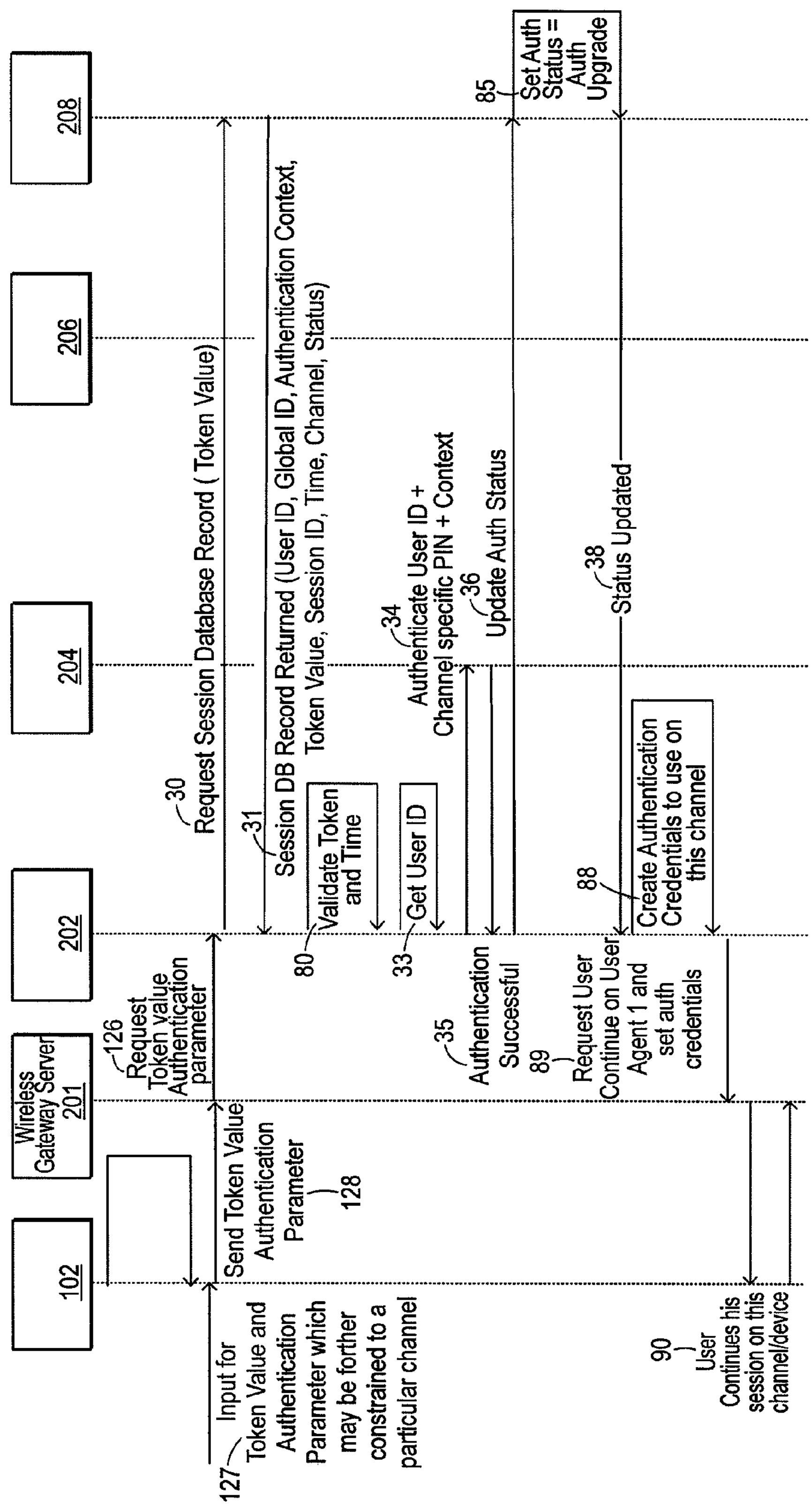
FIG. 3B5
Using Wireless/Cell Phone Applet as second Channel

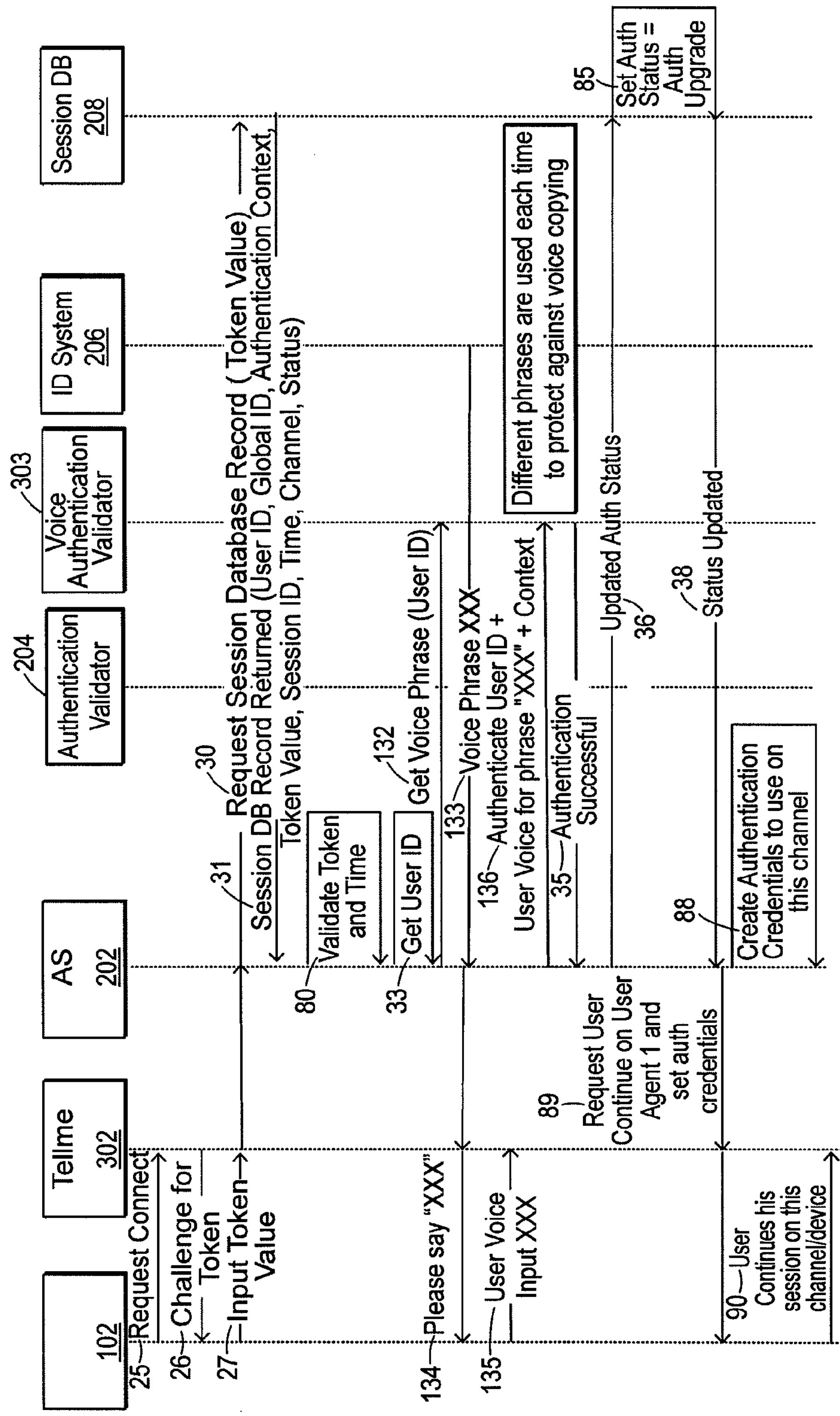
Using Phone as second channel and Voice as Authenticatior
FIG. 3B6

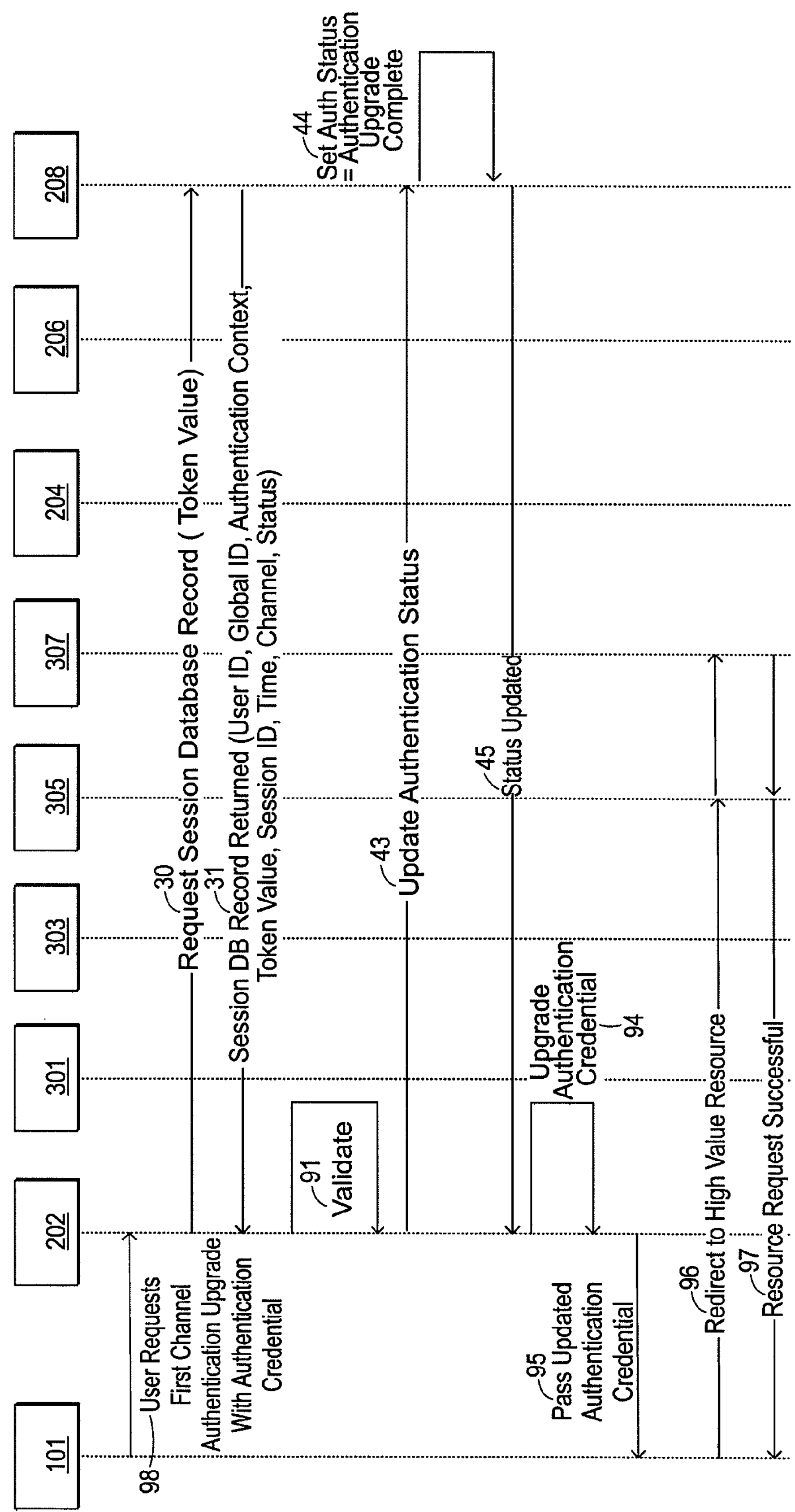
FIG. 3C1

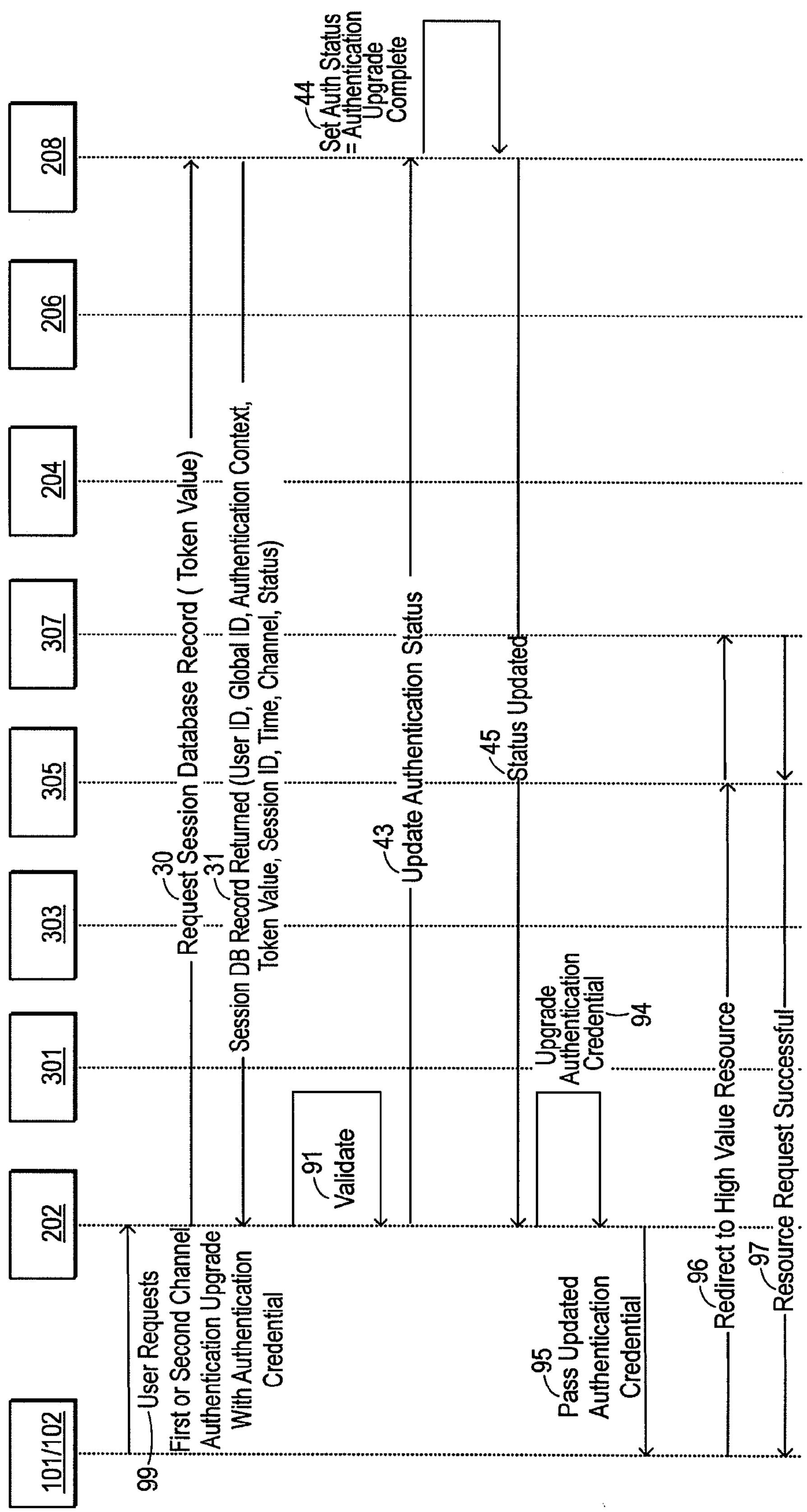
FIG. 3C2

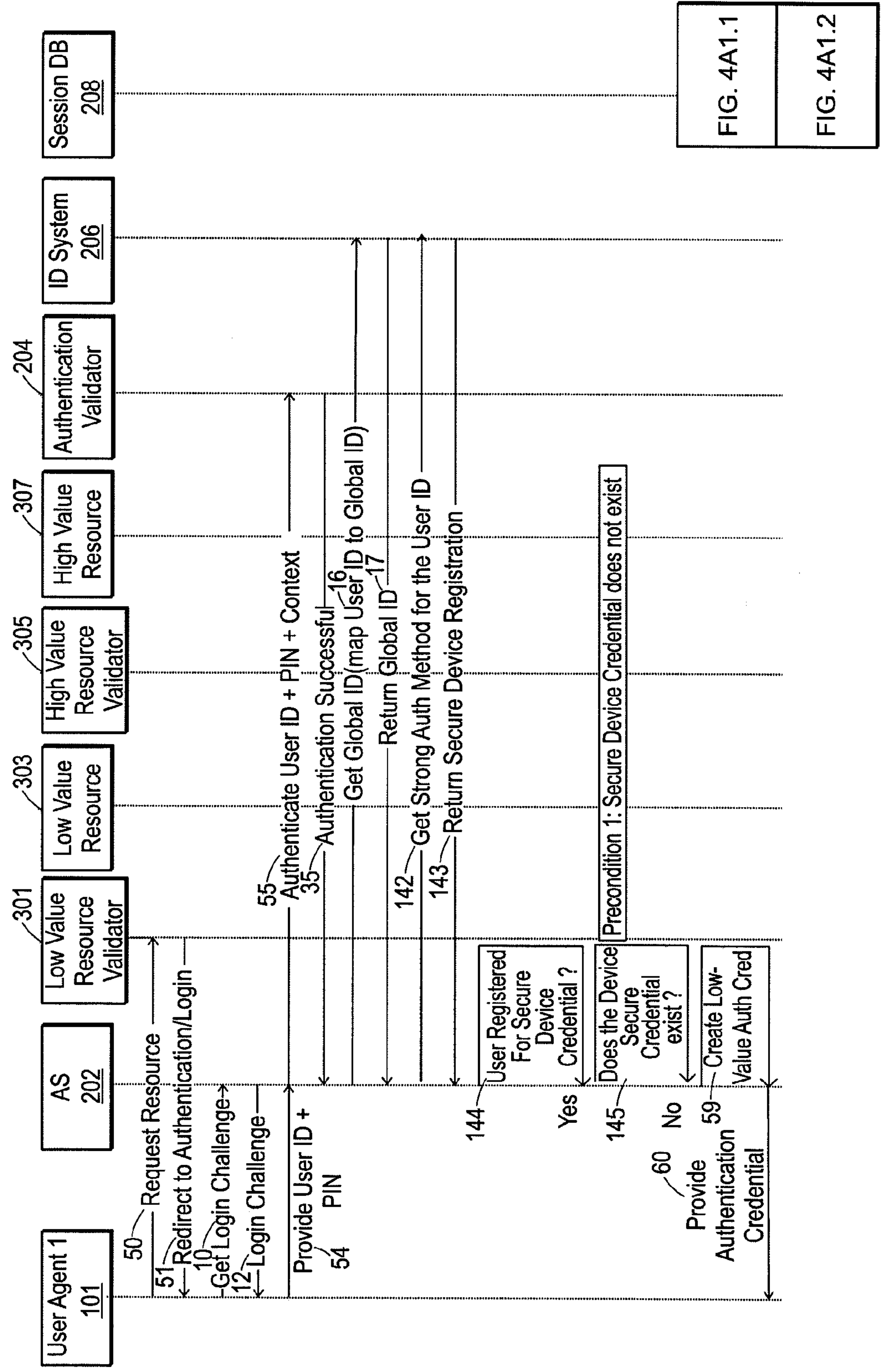
FIG. 4A1.1

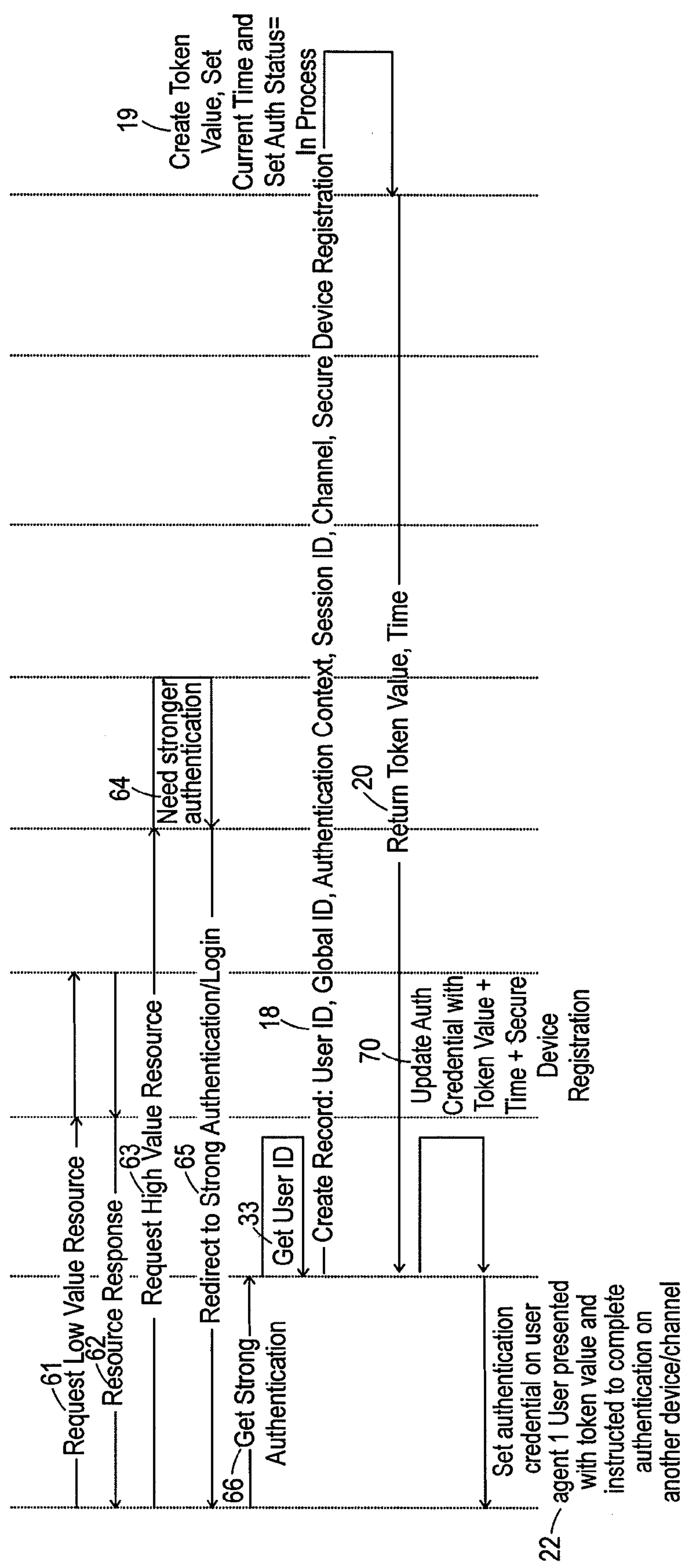
FIG. 4A1.2

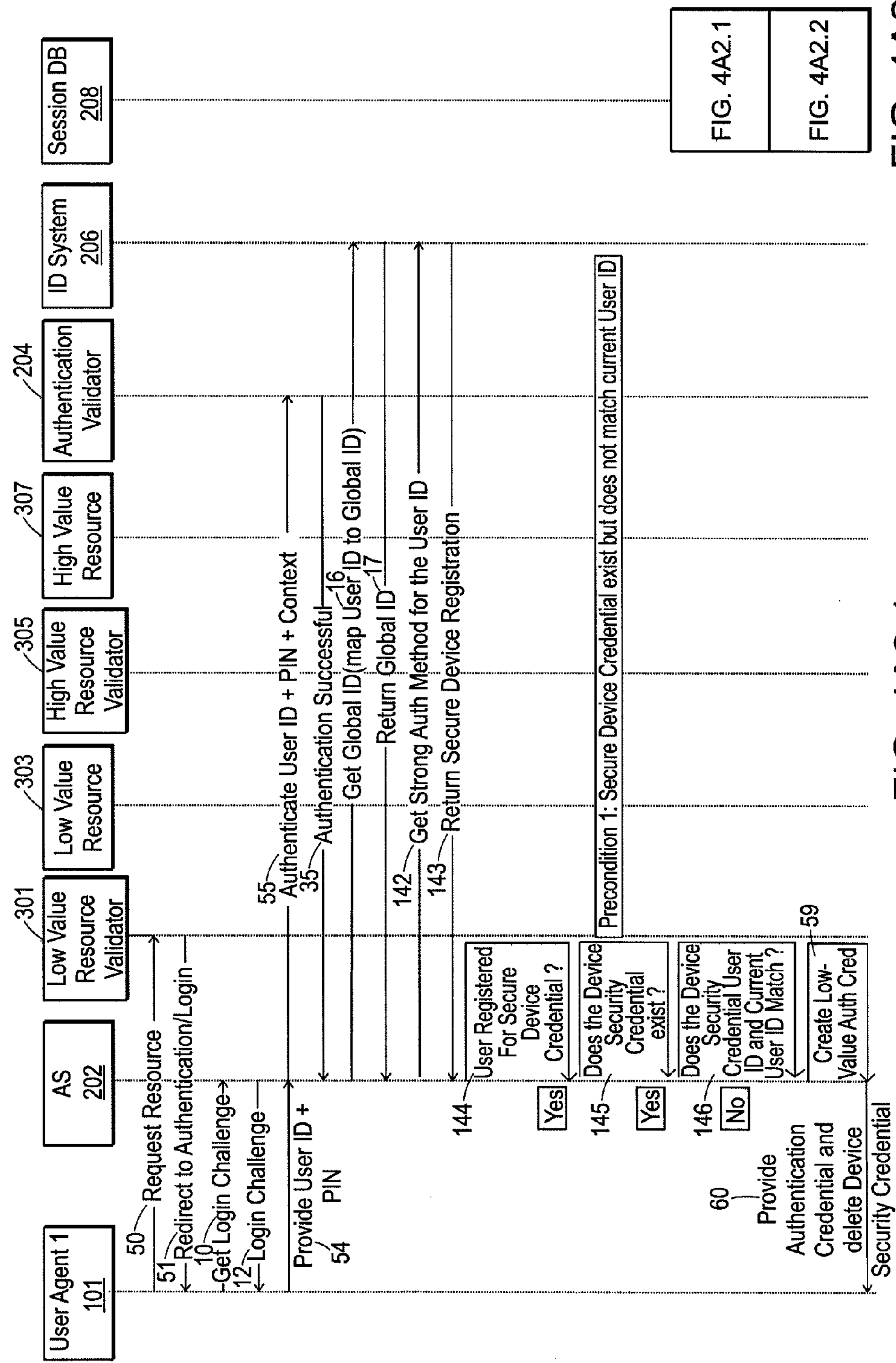
FIG. 4A2.1
FIG. 4A2

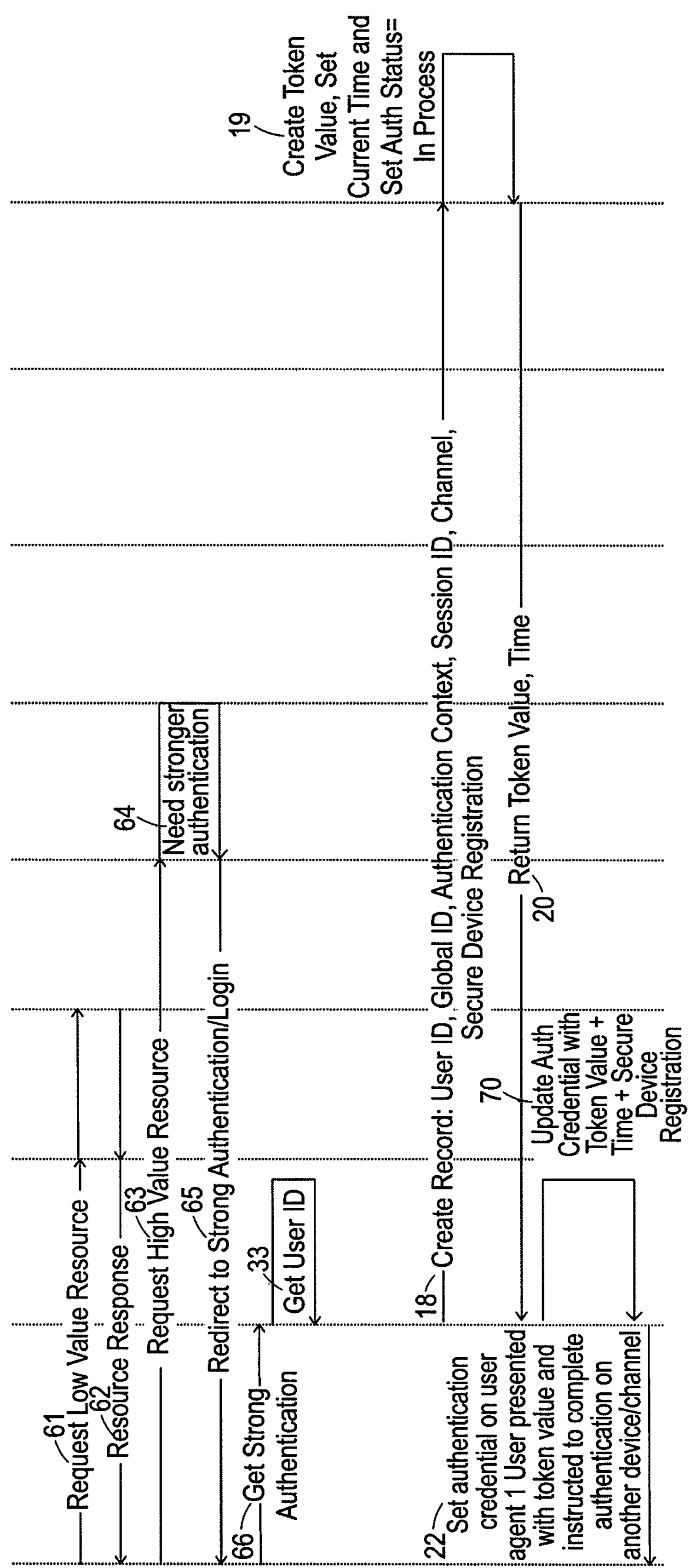
FIG. 4A2.2

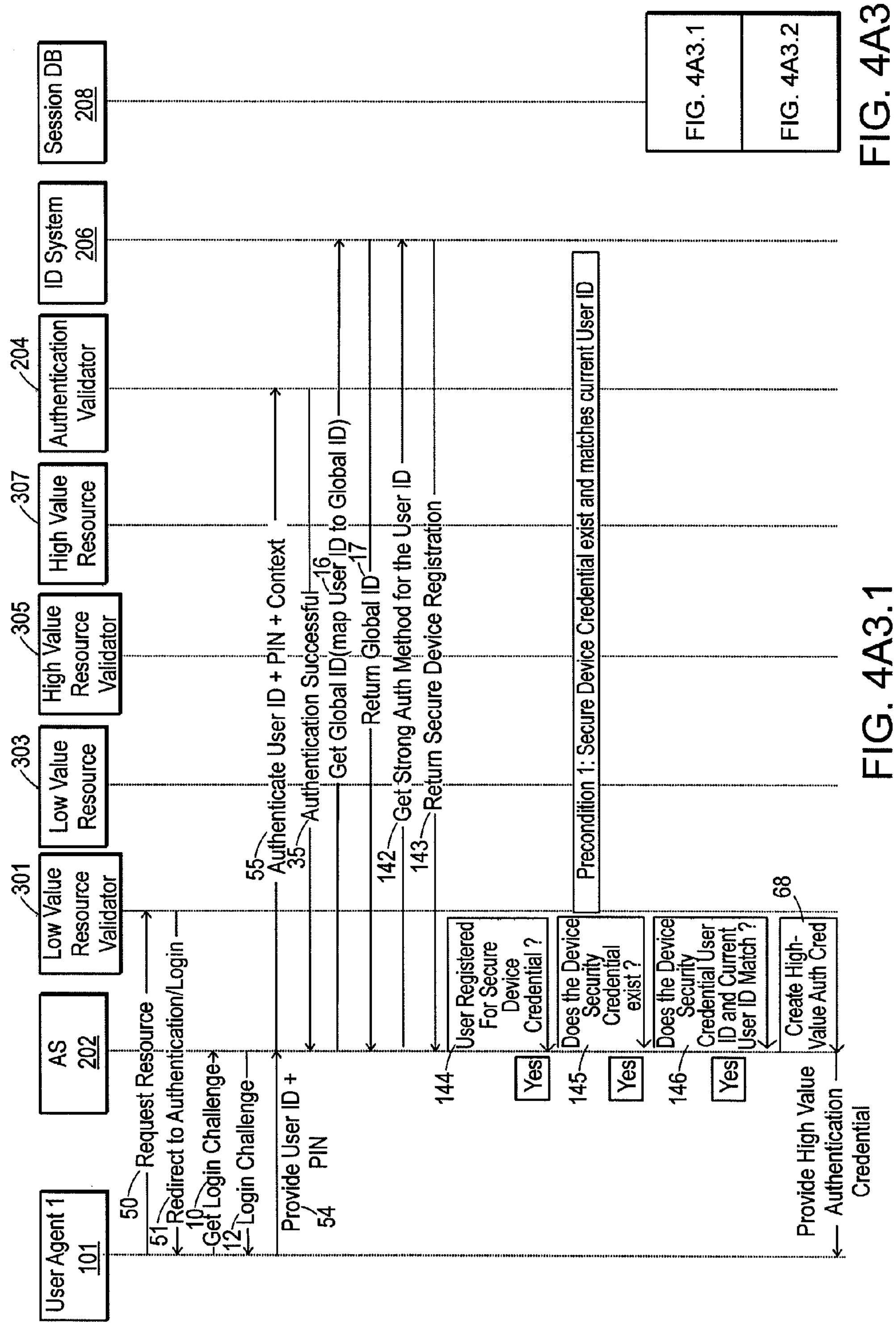
FIG. 4A3.1
FIG. 4A3

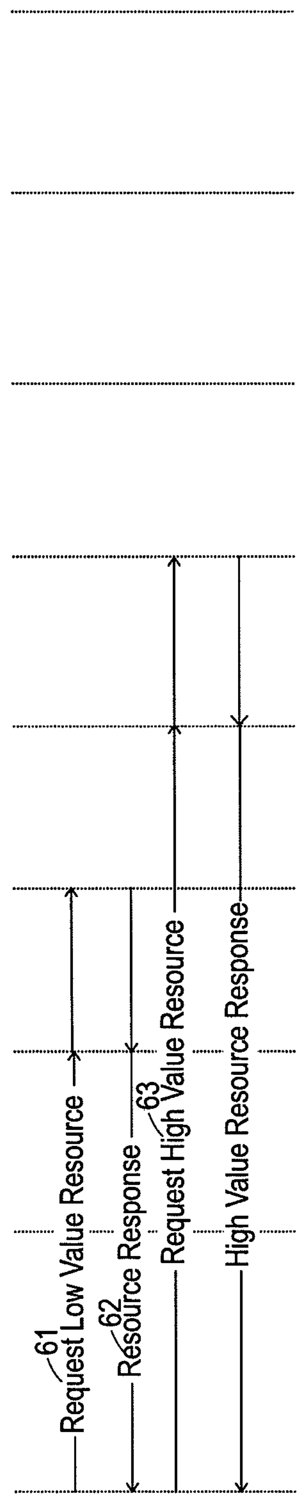
FIG. 4A3.2

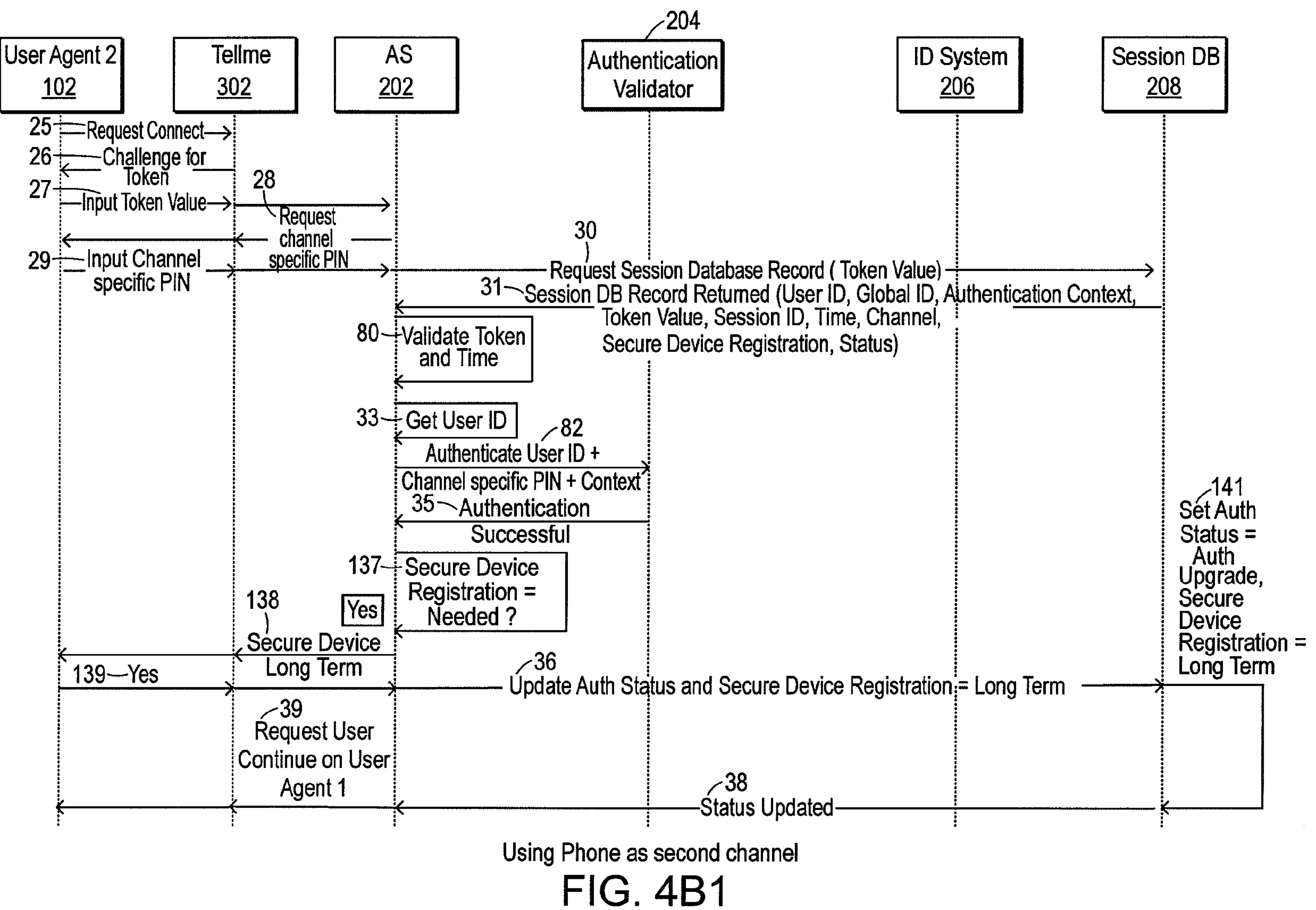
FIG. 4B1

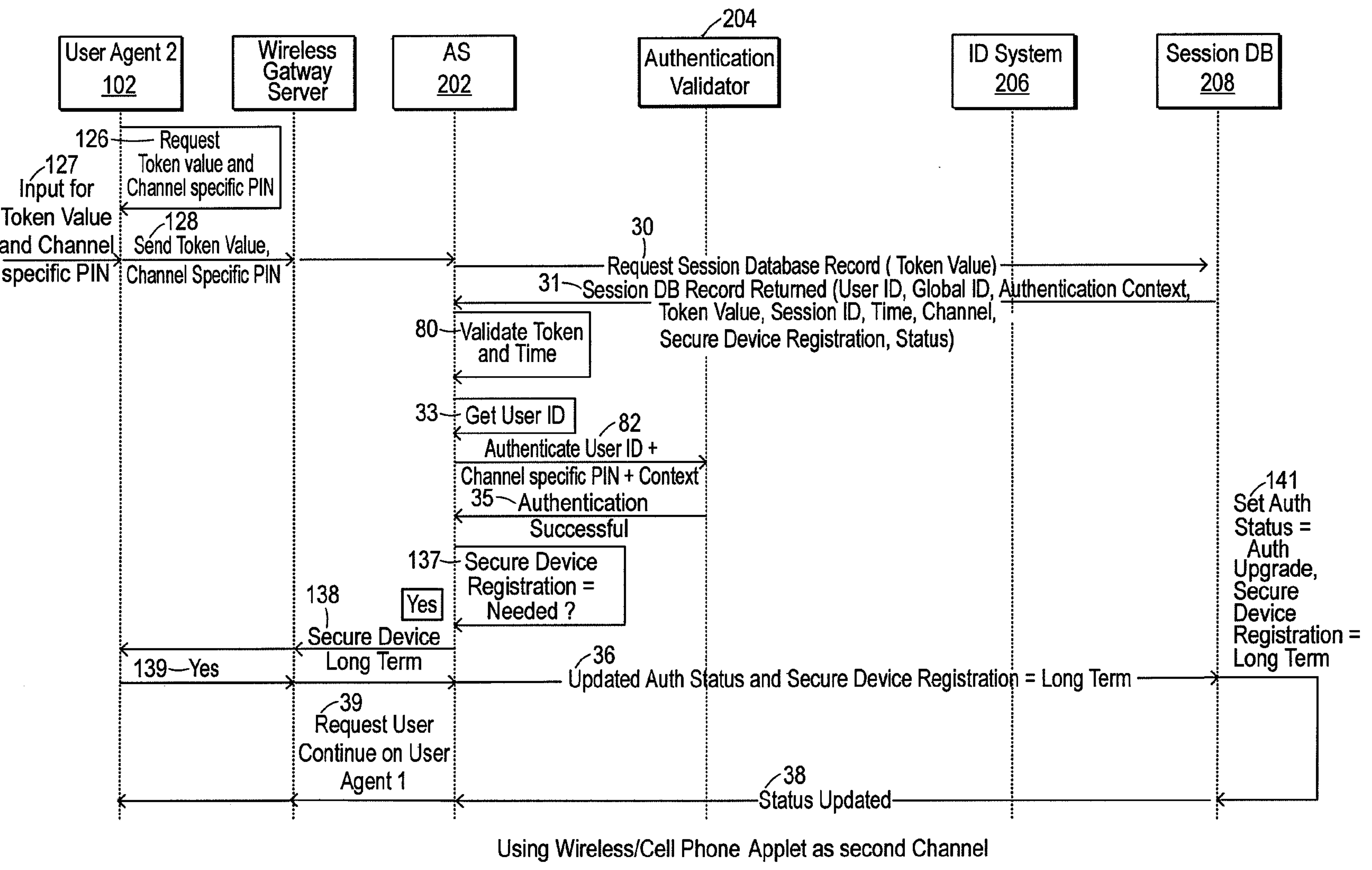
FIG. 4B2

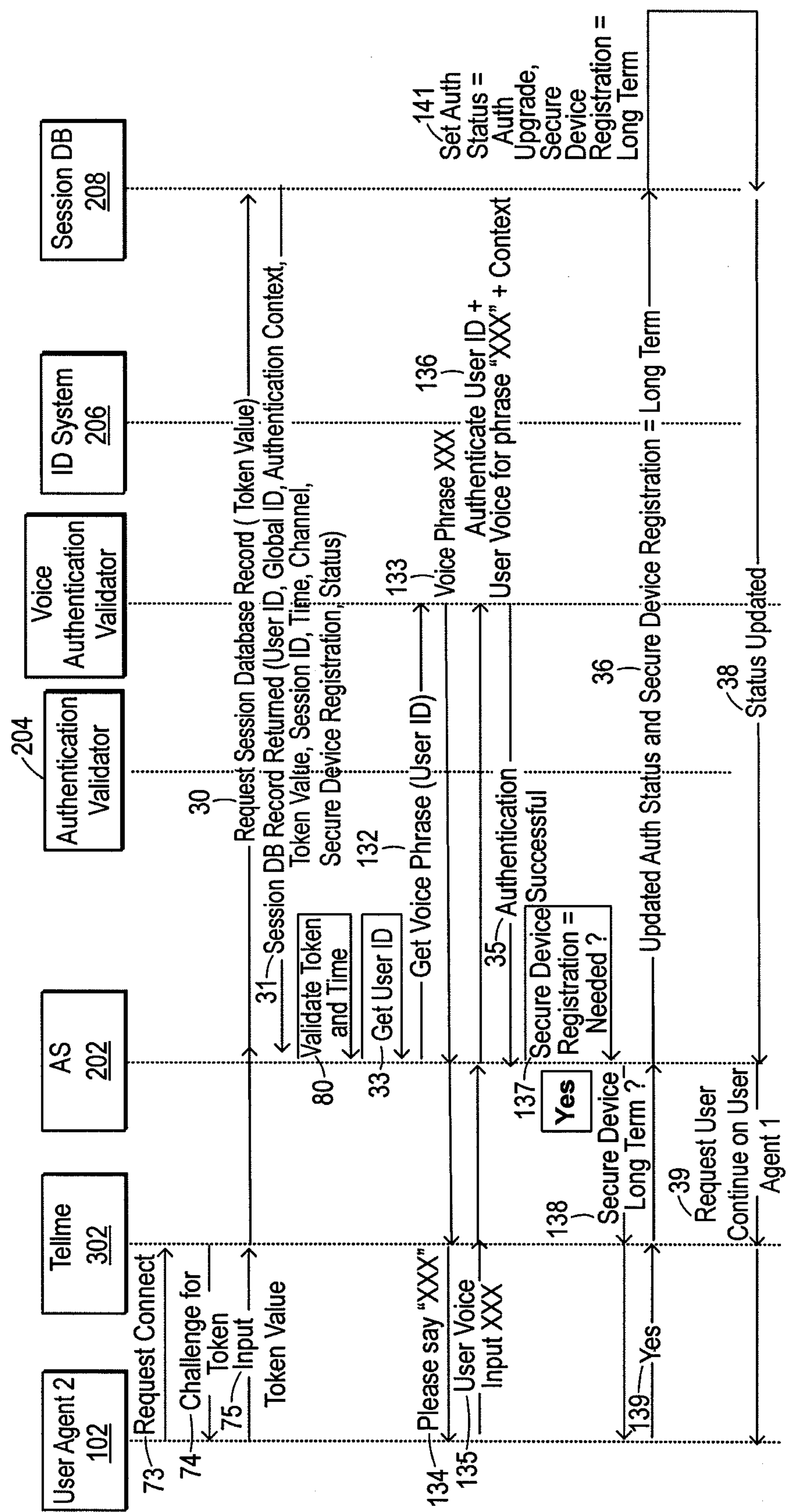
Using Phone as second channel and Voice as Authenticator
FIG. 4B3

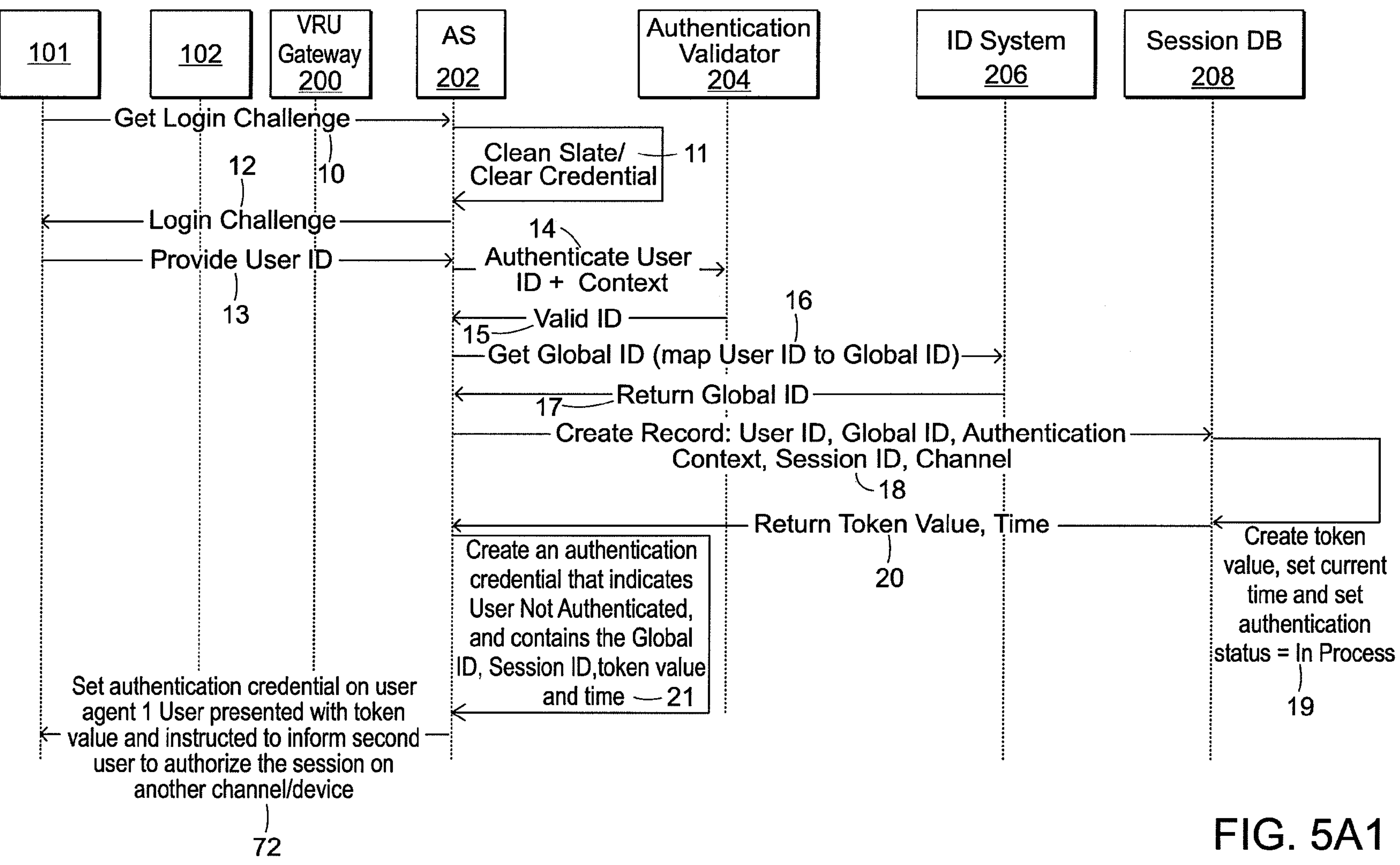
FIG. 5A1

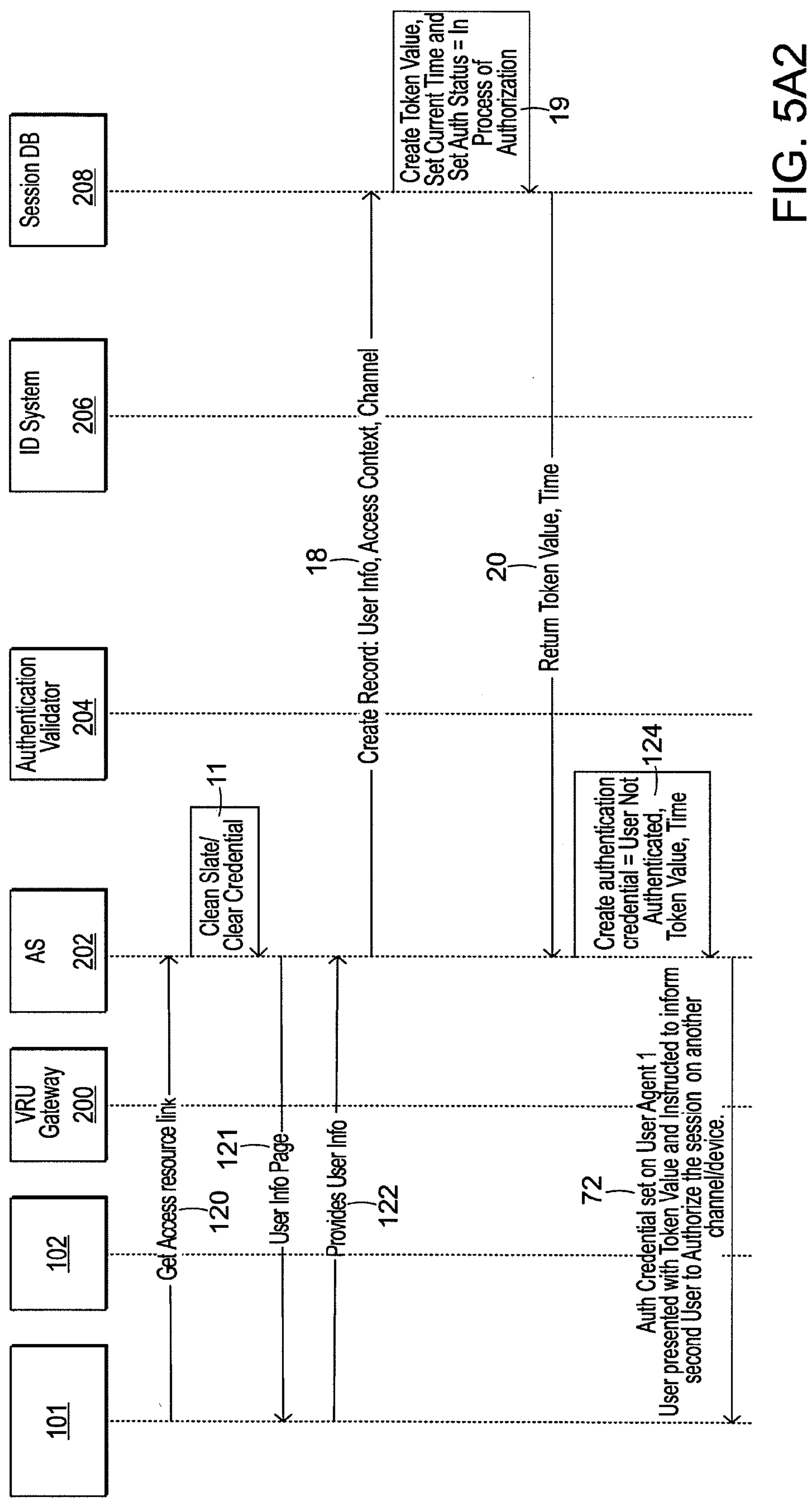
FIG. 5A2

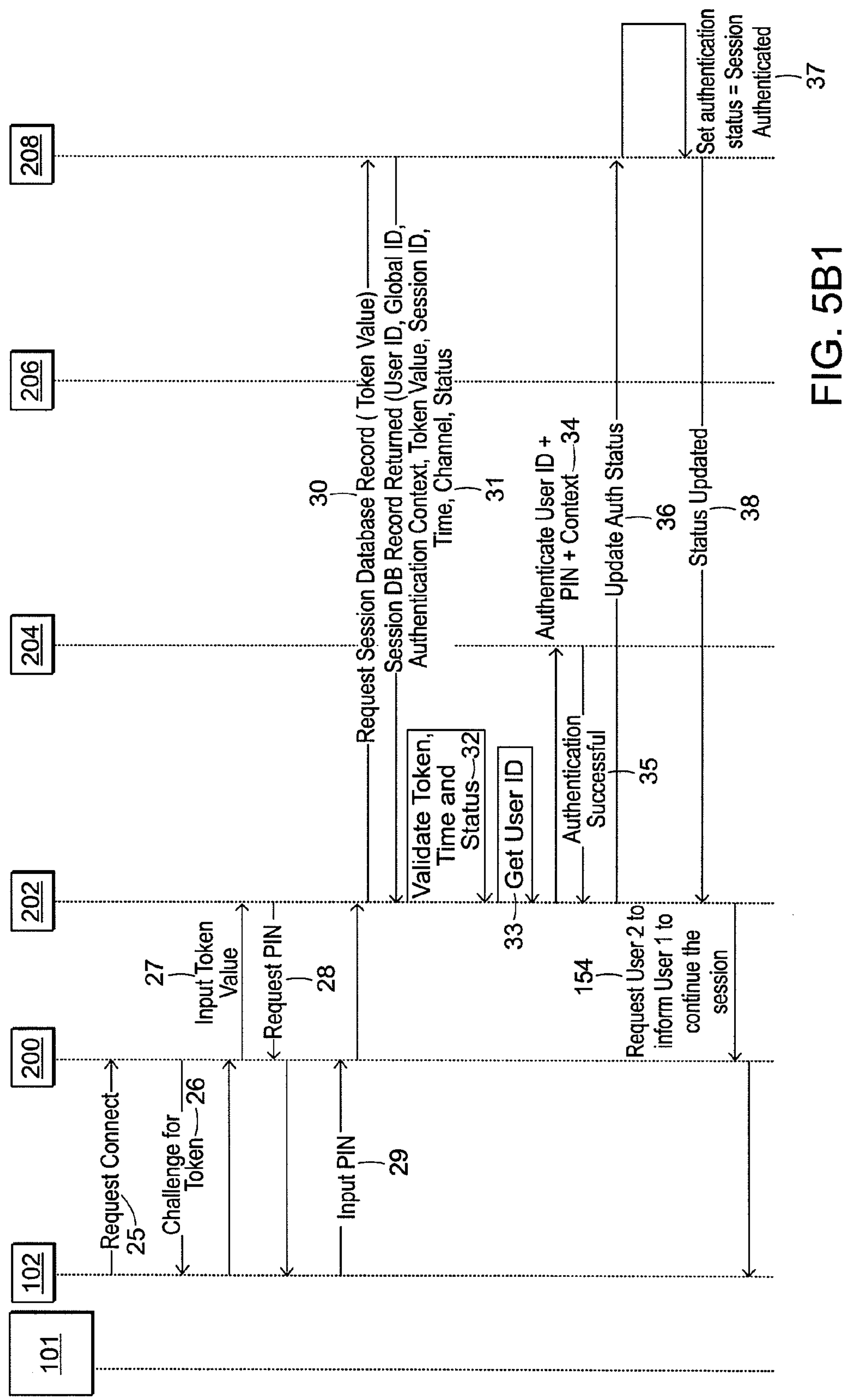
FIG. 5B1

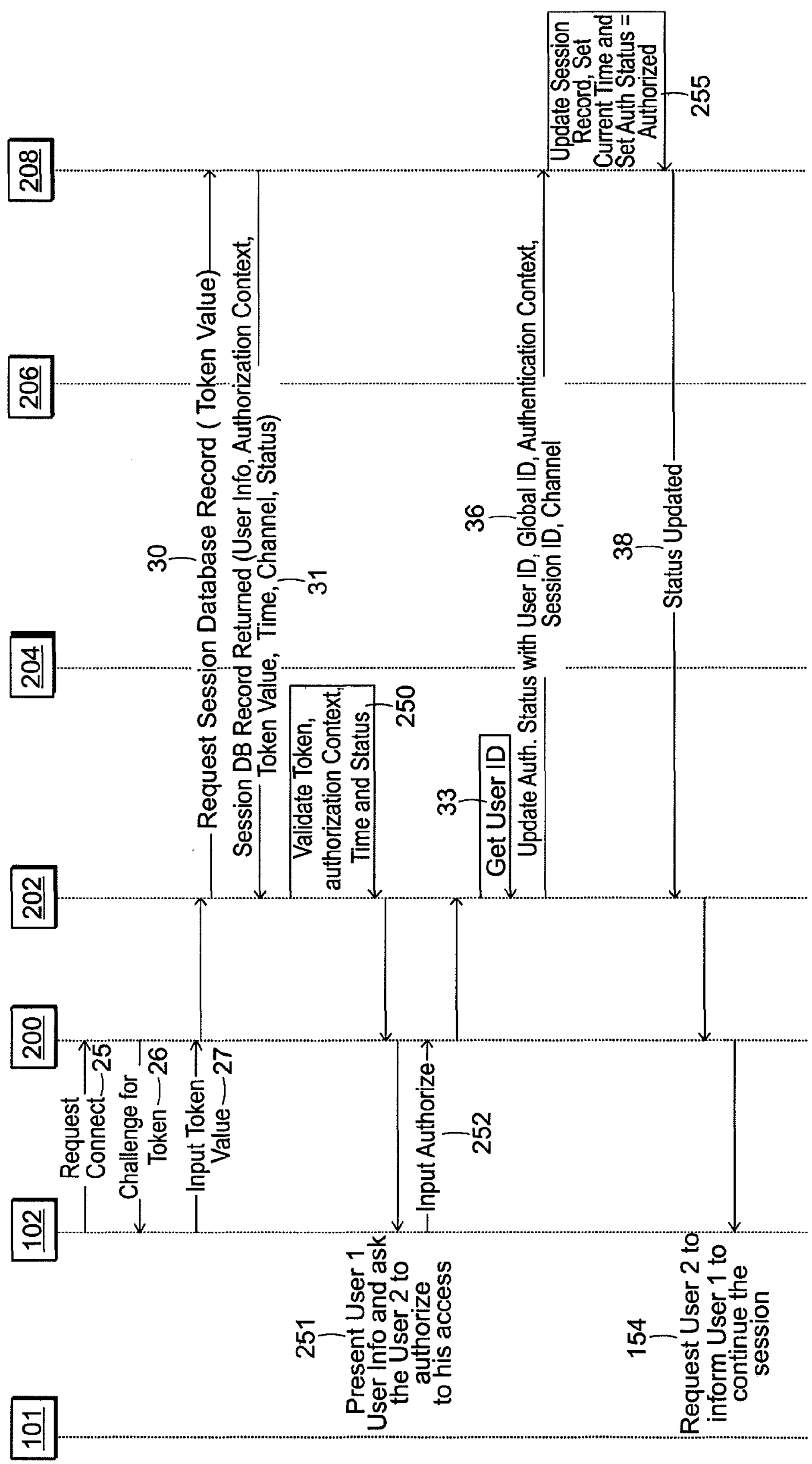
FIG. 5B2

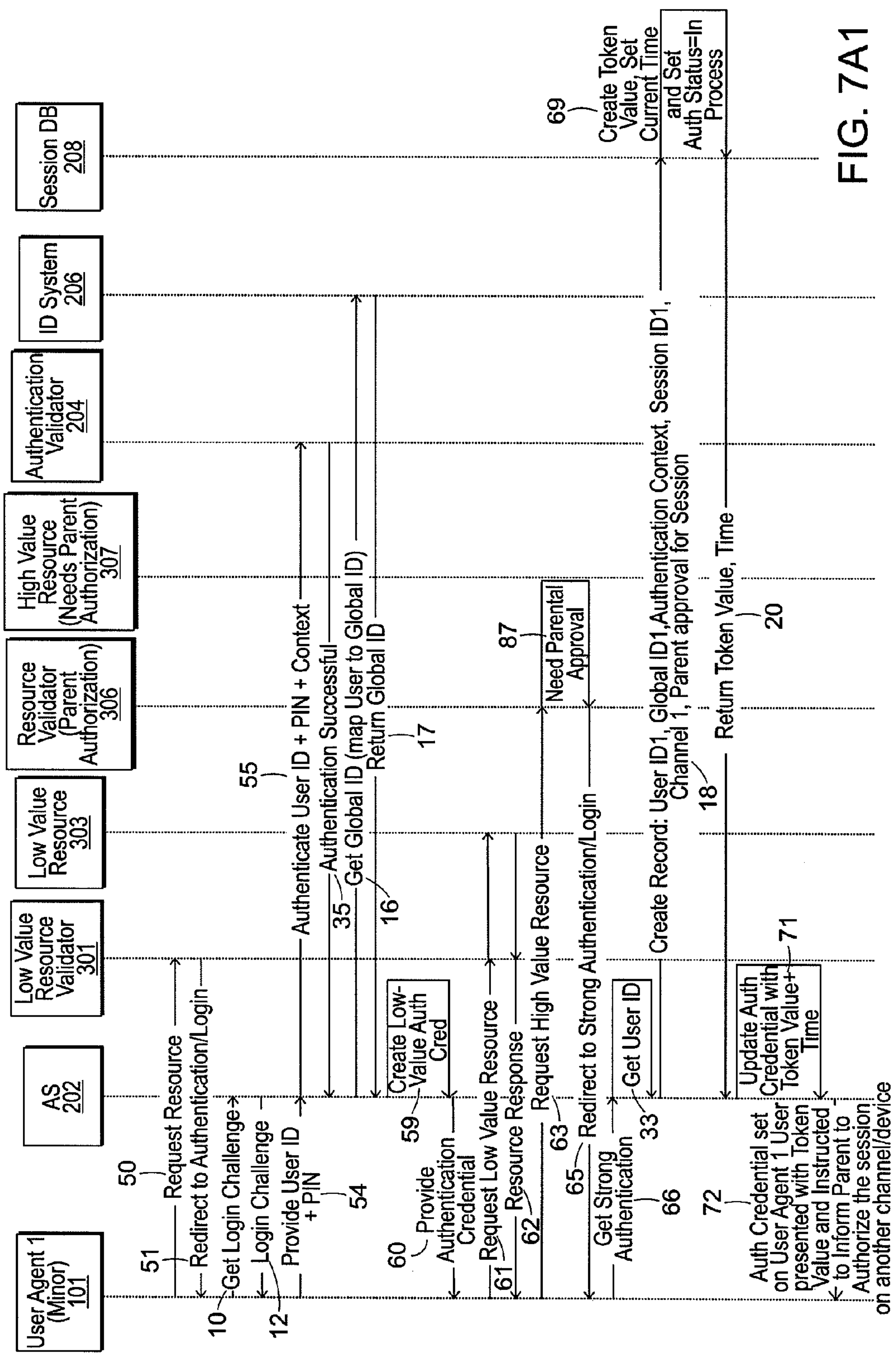
FIG. 7A1

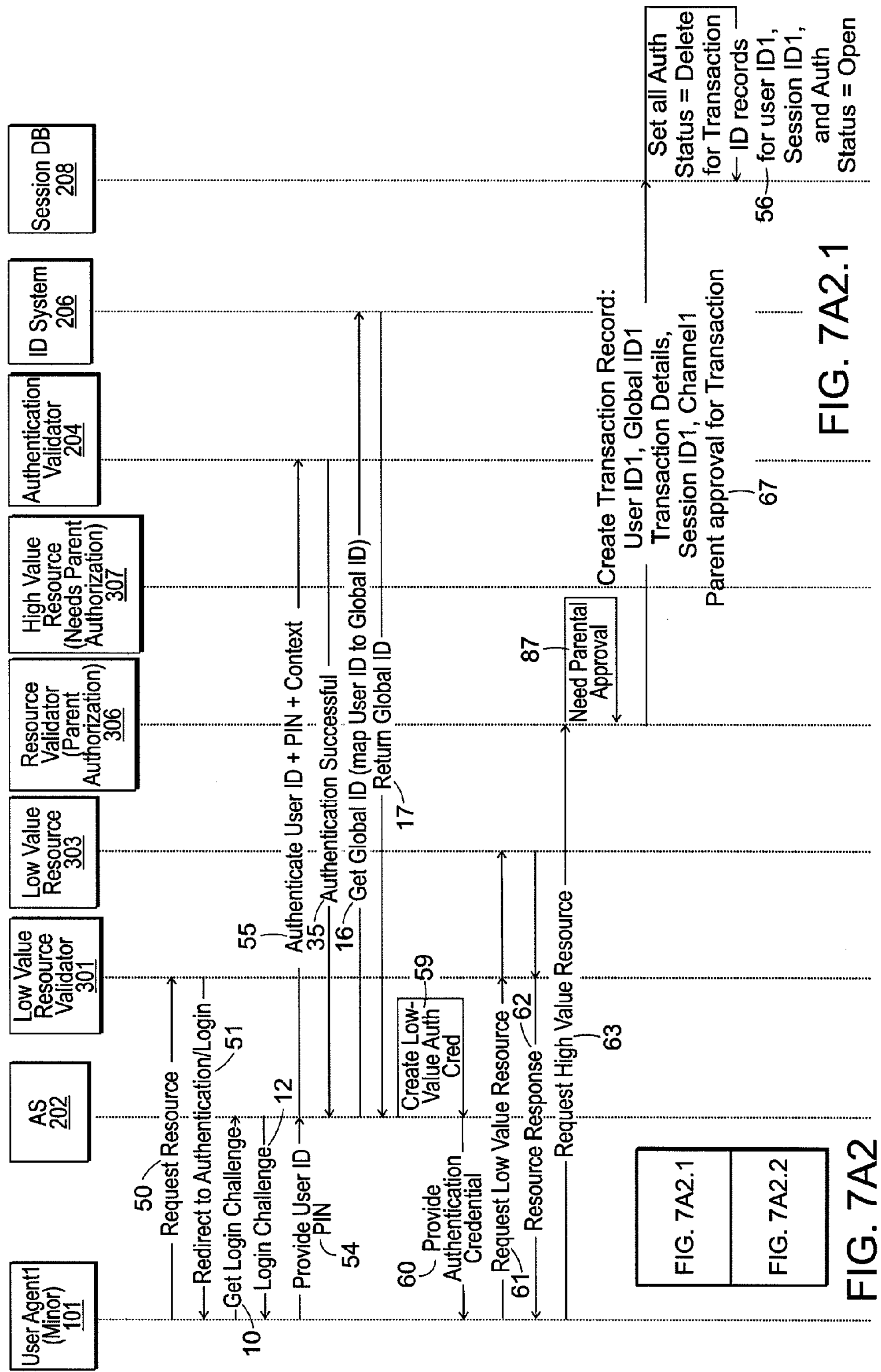
FIG. 7A2
FIG. 7A2.1

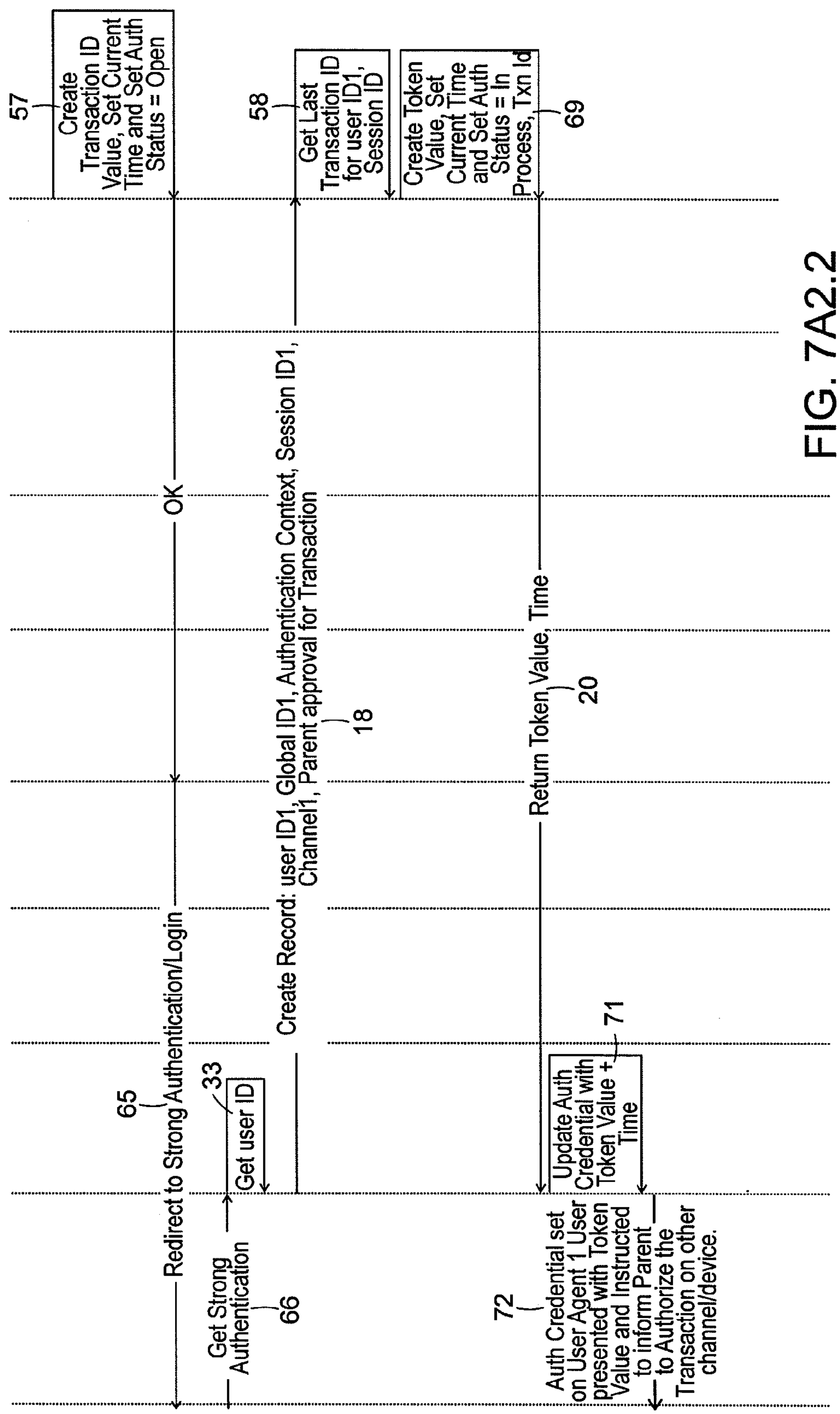
FIG. 7A2.2

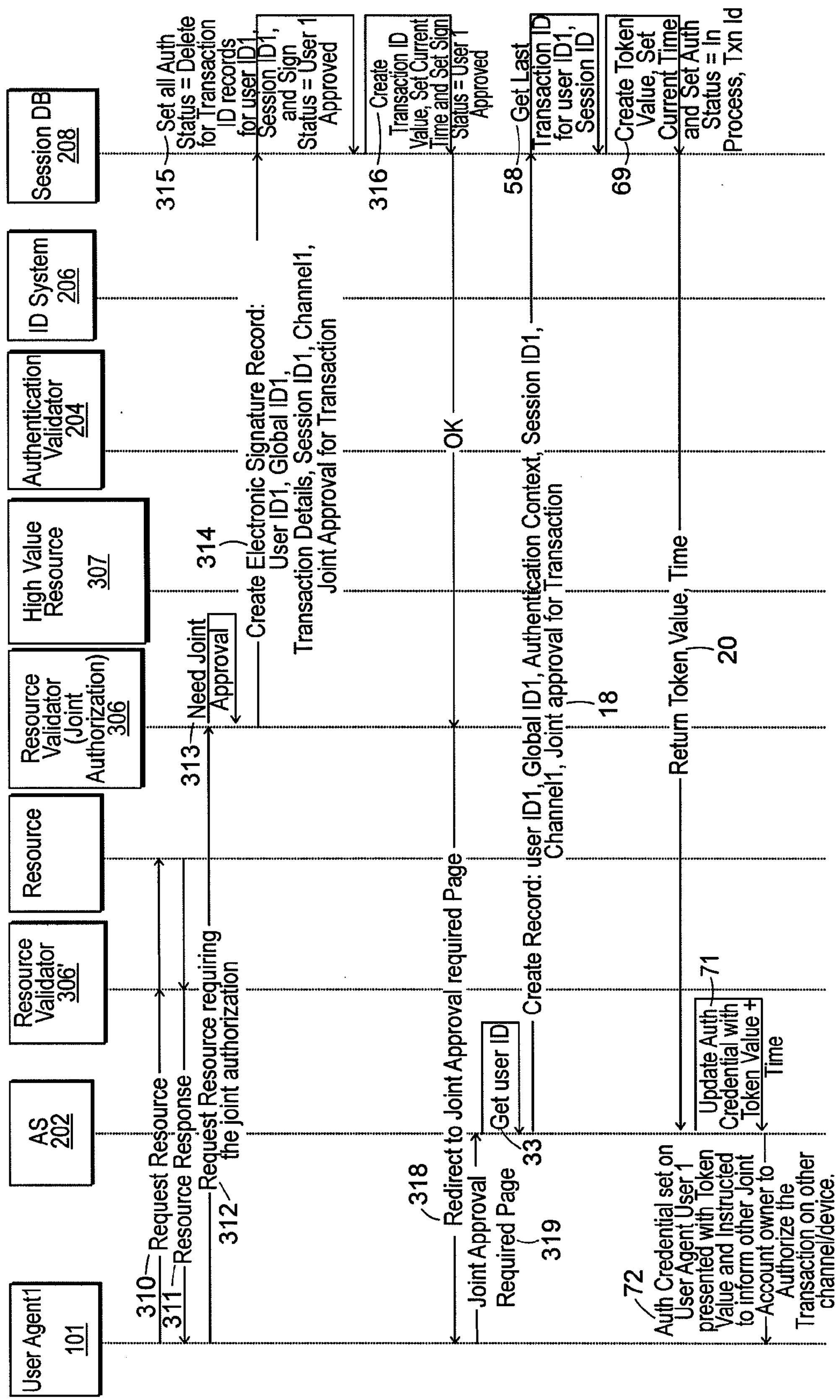
Use case for Joint account electronic signature
FIG. 7A3

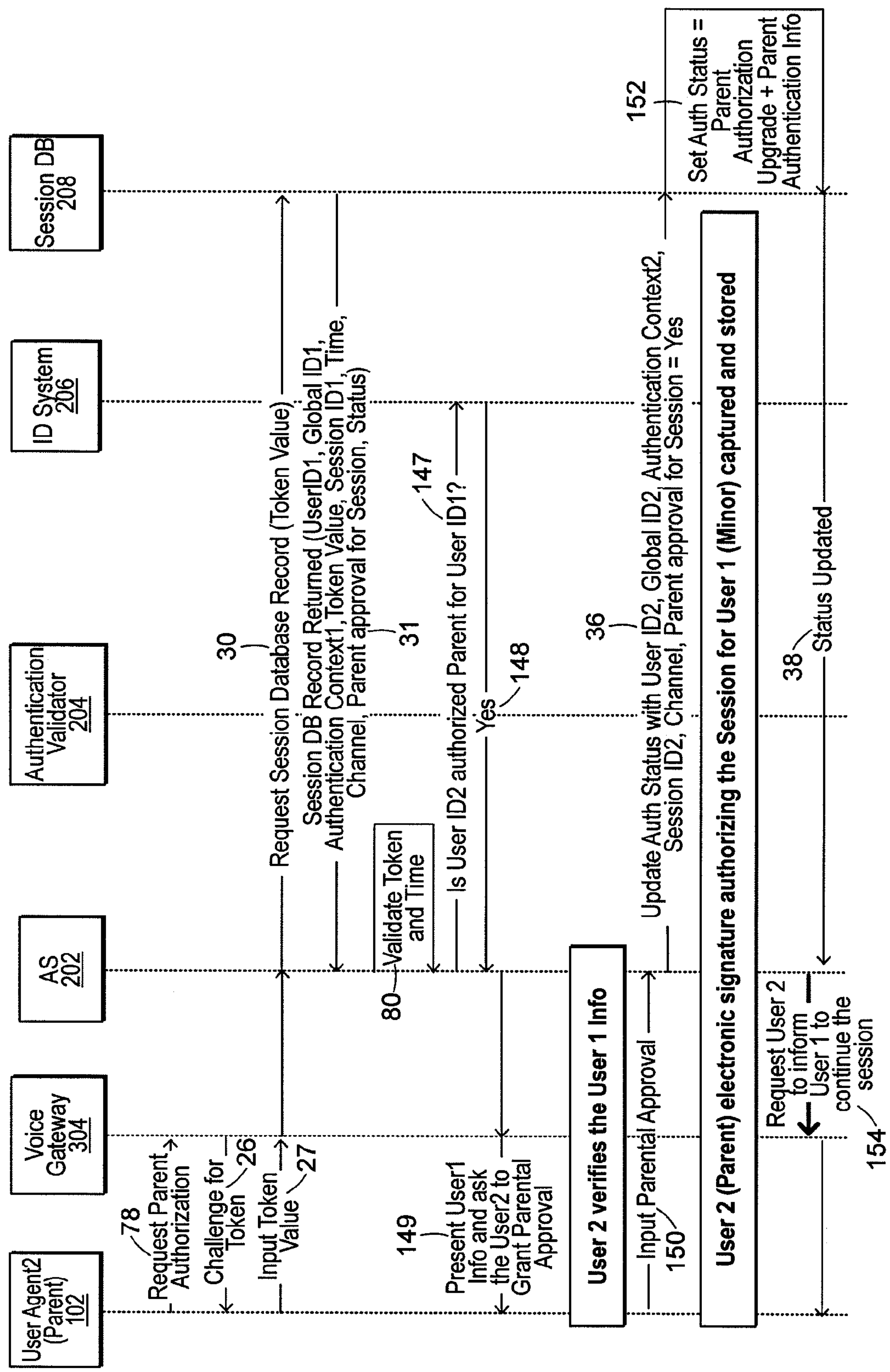
FIG. 7B1

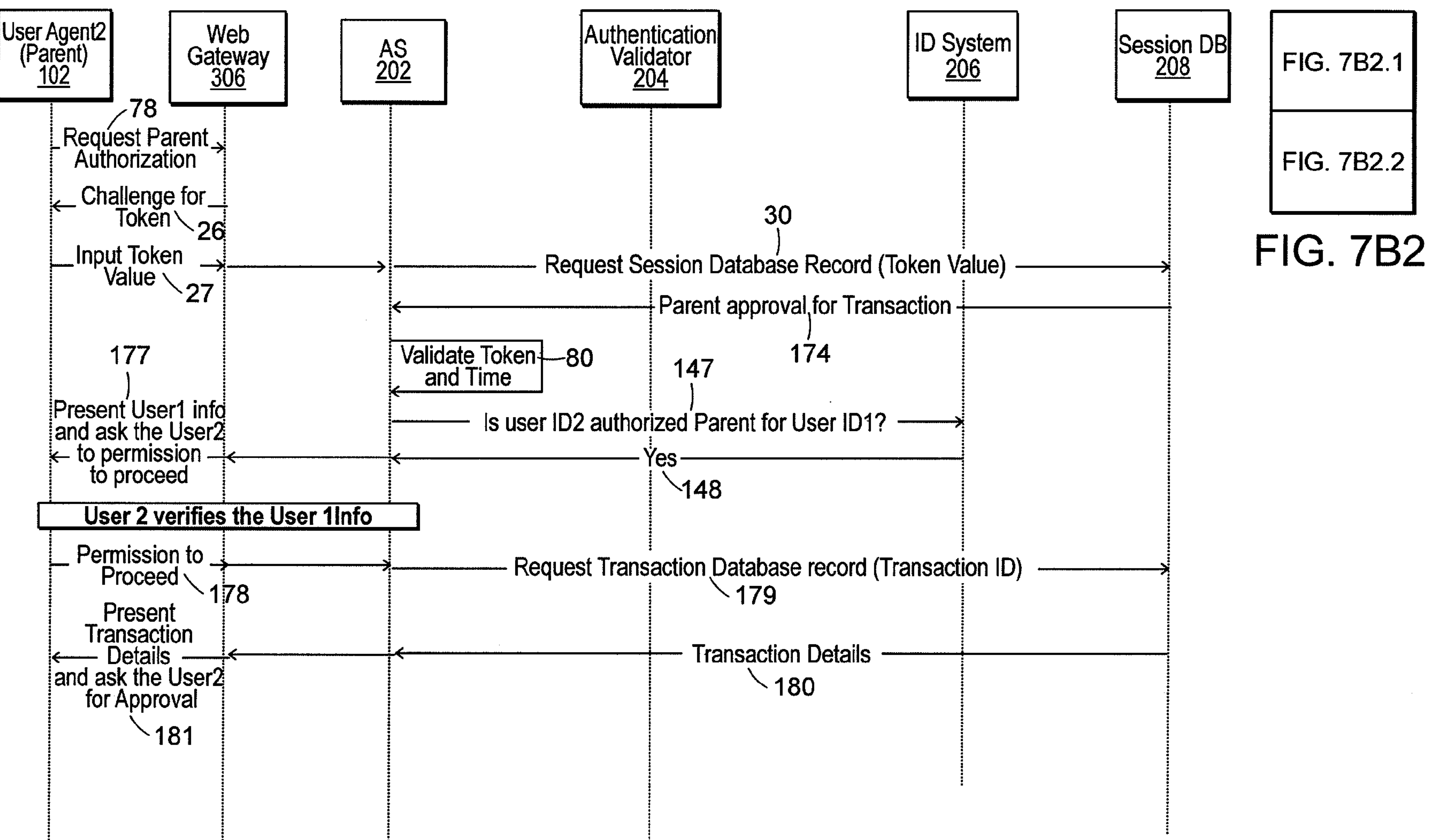
FIG. 7B2.1

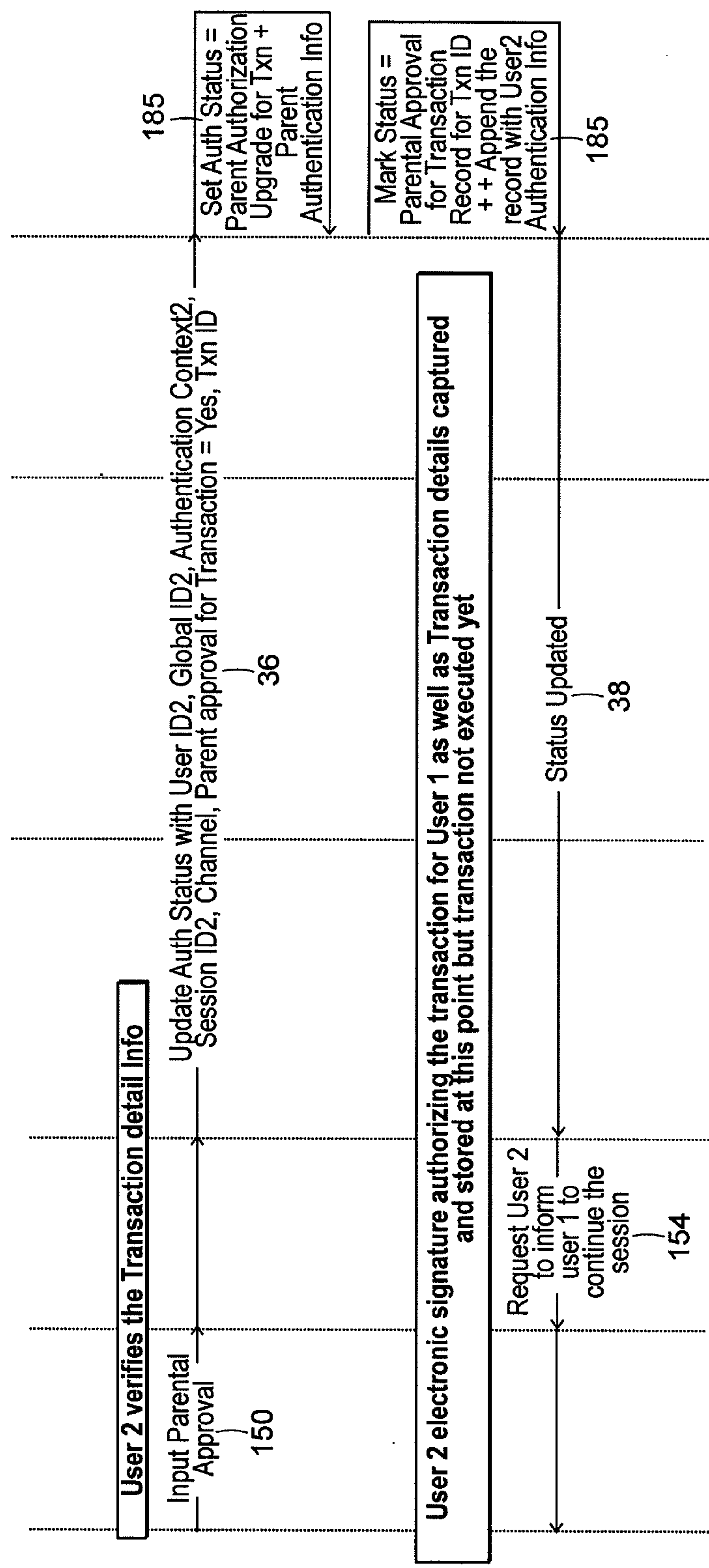
FIG. 7B2.2

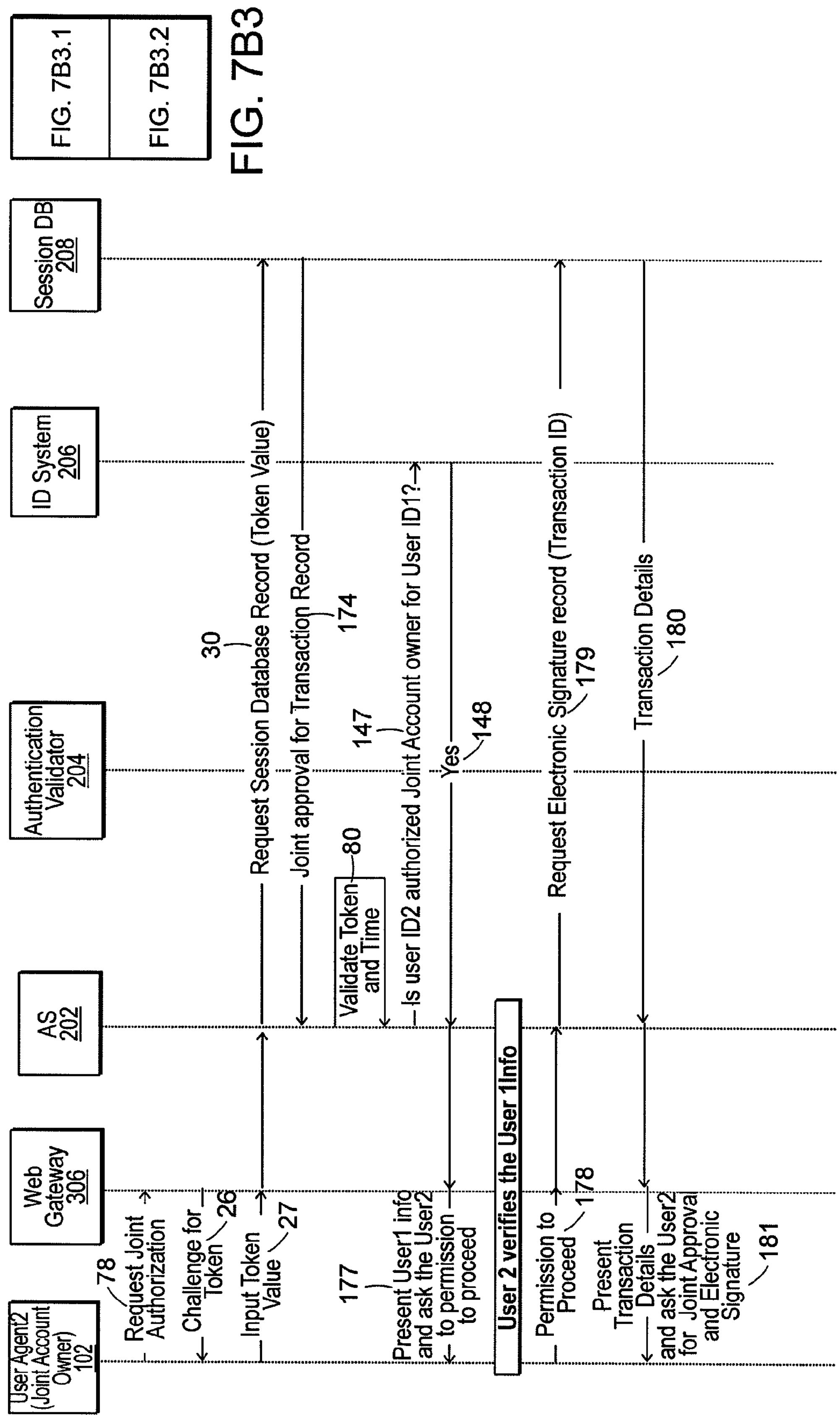
FIG. 7B3.1

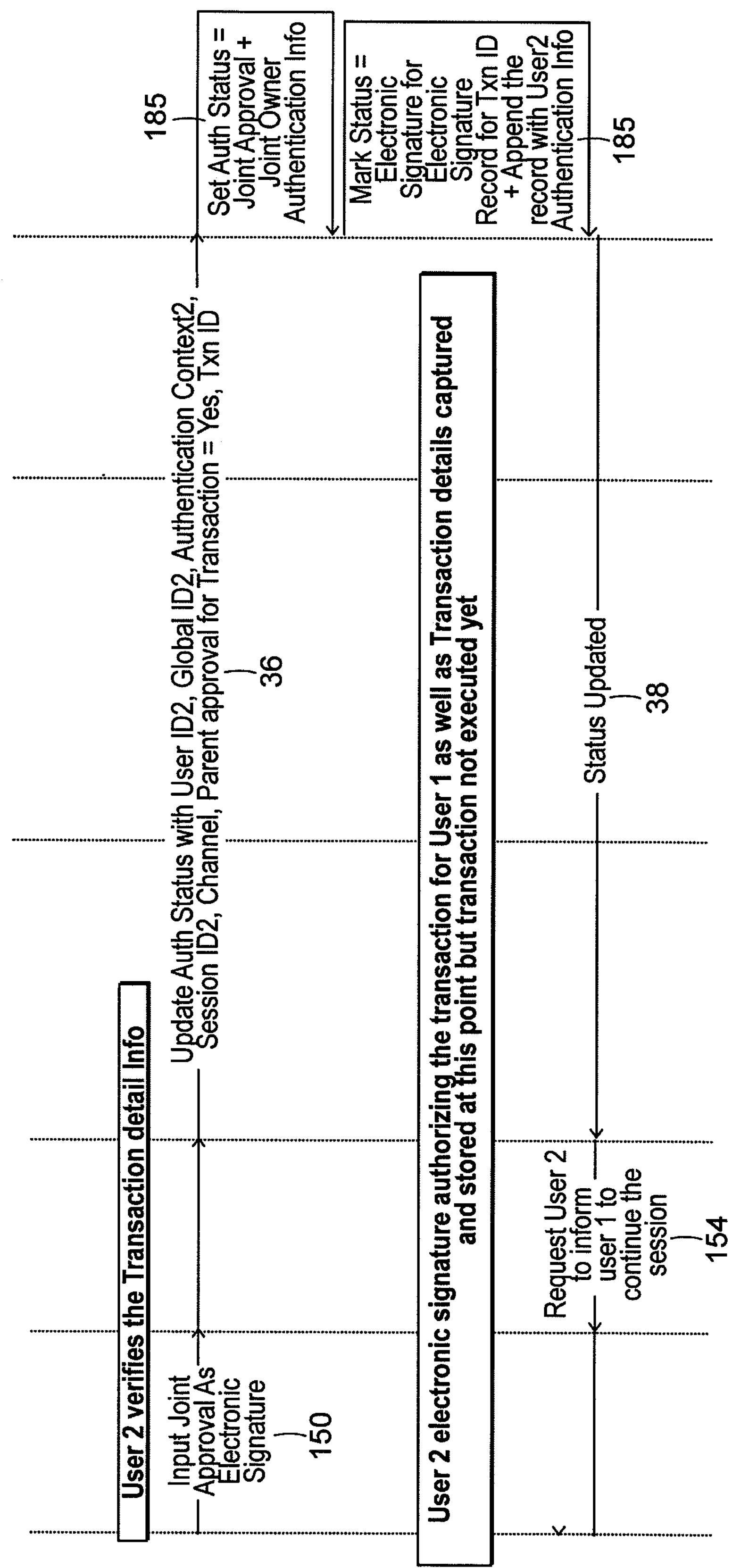
Using Phone as Authorization Channel for whole session
FIG. 7B3.2

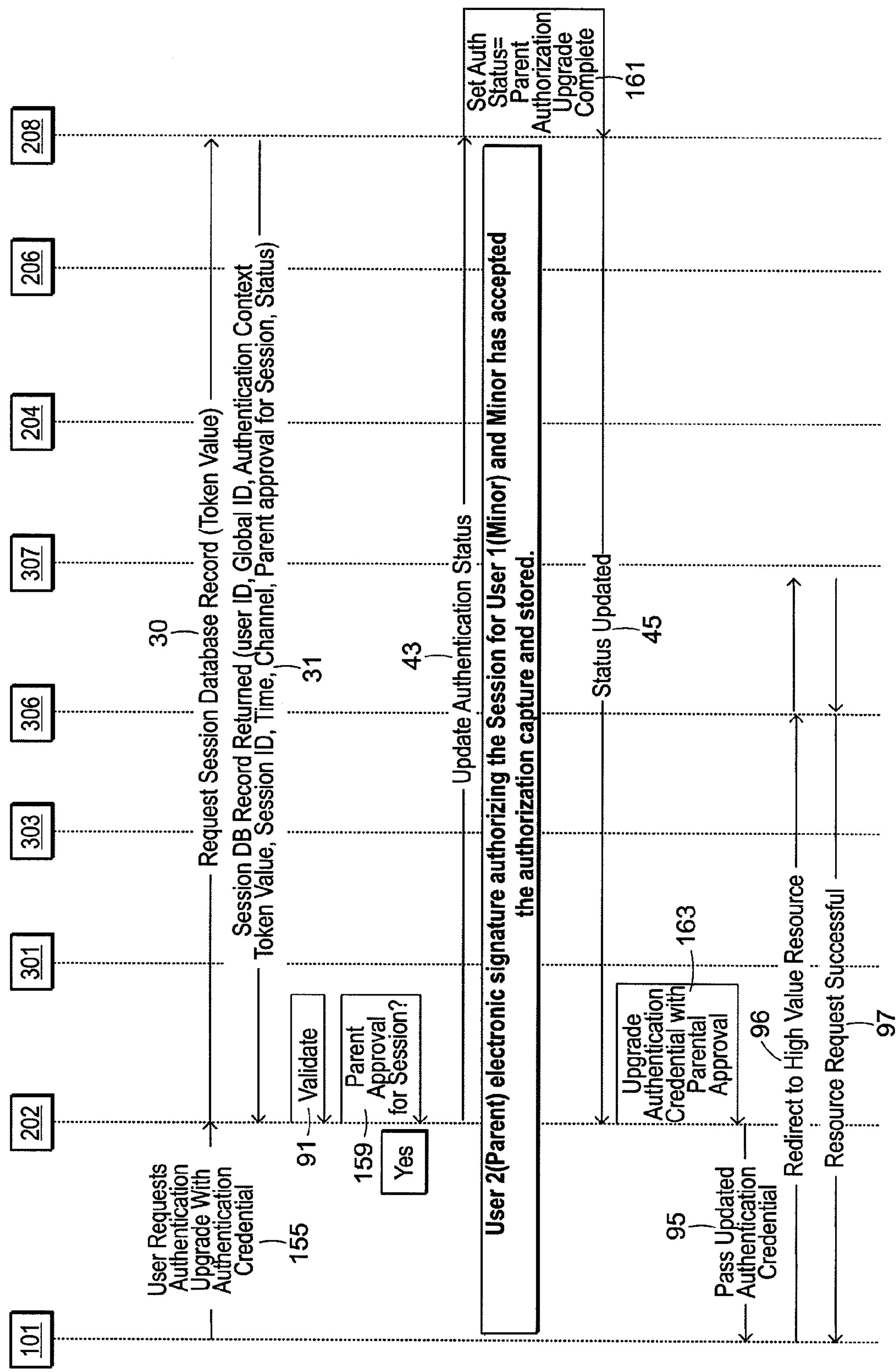
FIG. 7C1

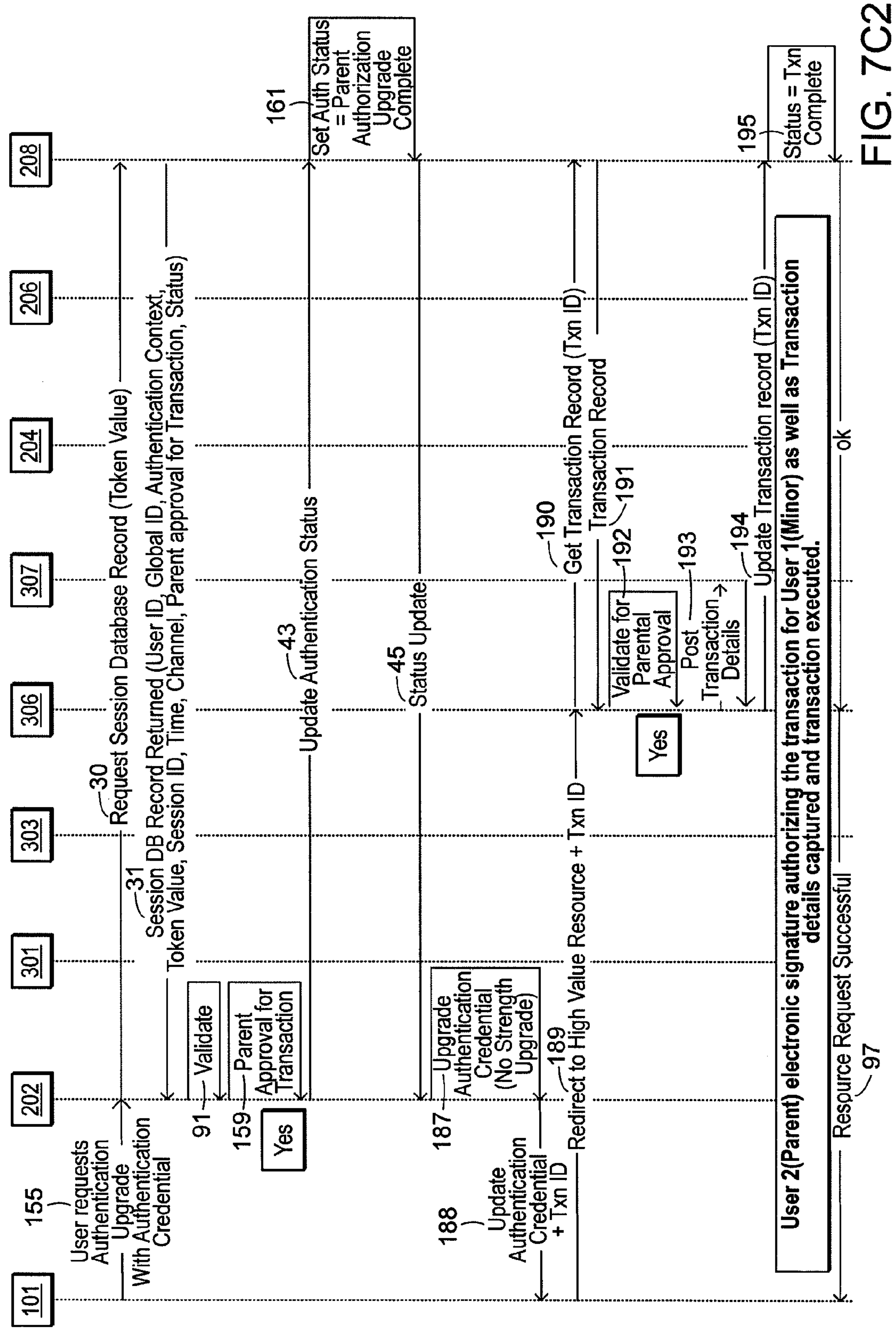
FIG. 7C2

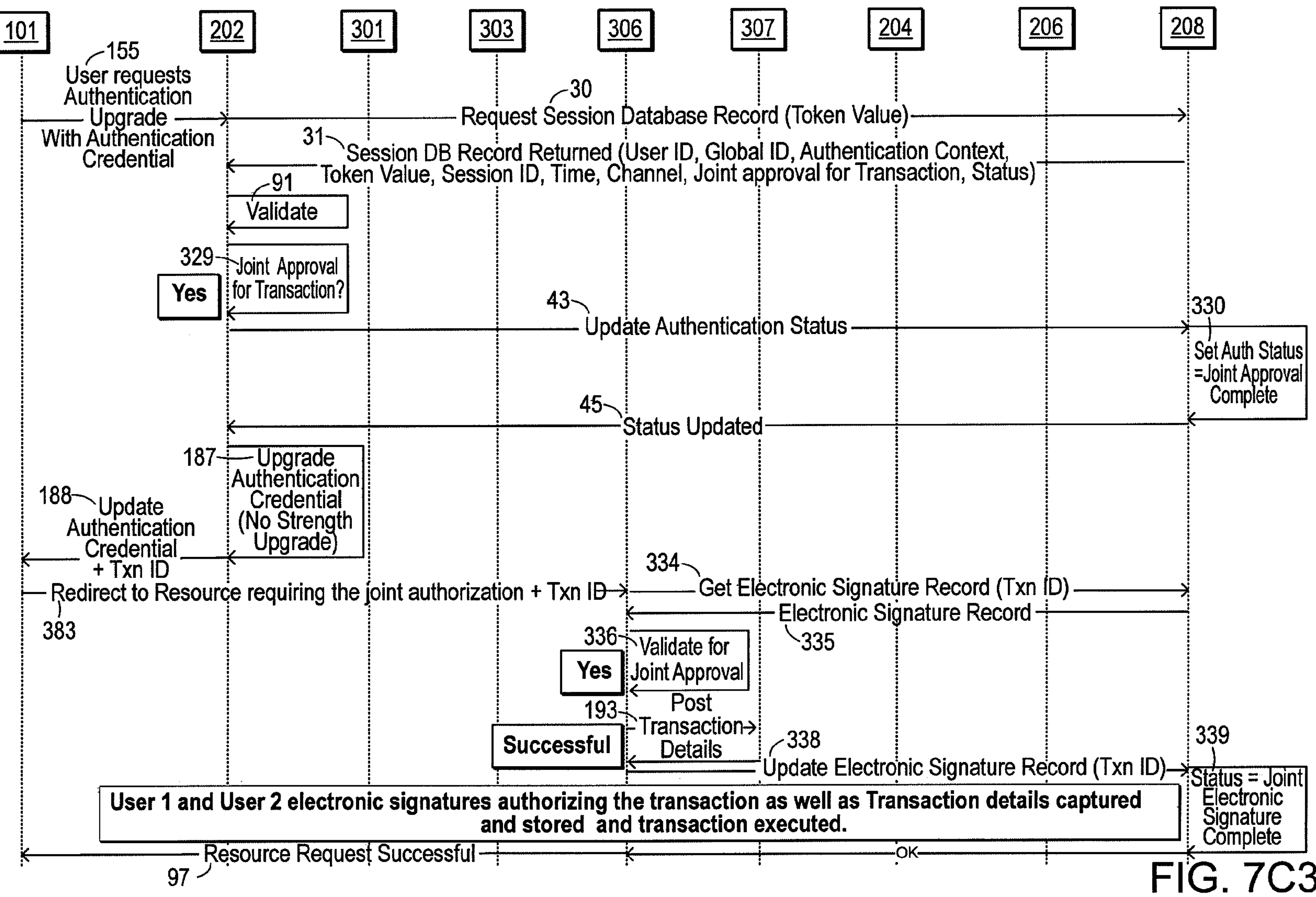
FIG. 7C3

SINGLE-PARTY, SECURE MULTI-CHANNEL AUTHENTICATION

CROSS REFERENCE TO RELATED APPLICATIONS

This application claims priority to and the benefit of U.S. Patent Application No. 60/849,971, filed on Oct. 6, 2006, entitled "Secure Multi-Channel Authentication," the disclosure of which is hereby incorporated by reference.

FIELD OF THE INVENTION

The present invention relates generally to using multiple channels during the authentication of a single user or multiple users.

BACKGROUND

Electronic commerce depends upon the secure and correct authentication of the end user. The advent of widespread, successful attacks on simple user credentials (user id and password) compromises the ability of users to perform electronic transactions. Attacks expose users to significant risk of financial loss, identity theft and/or other inconvenience. Attacks such as desktop viruses, key loggers, man-in-the-middle environments, phishing, and pharming all conspire to compromise a user's identity, often without the user becoming aware of the problem.

The threat of attacks contributes to an increased service provider cost of doing business. Service providers must expend resources to defend against attacks, to compensate attacked users, and to reassure users that electronic commerce remains safe. Ultimately, the failure to provide mechanisms that allow users to successfully and securely authenticate will erode user confidence in electronic transactions and will threaten the electronic channels as a viable means of commerce.

Authentication via electronic channels frequently involves the presentation of both identity data and shared secret data. The shared secret data, known only to the user and the service provider, establishes the user identity with a degree of confidence. This form of authentication is vulnerable to attack by interception. If the attacker acquires both the identity data and the shared secret, the attacker then becomes indistinguishable from the legitimate party in the view of the service provider. Attackers intercept exchanged data by compromising an endpoint of the electronic channel.

Many service providers enhance this basic data exchange by incorporating a mechanism that changes the secret data over time in an unpredictable fashion. Thus even the capture of the secret only compromises the user until the next change. Unfortunately, mechanisms that change the secret increase service provider costs and potentially inconvenience the user. For instance, the user may forget whatever device provides the changing secret. In this case the service provider must provide not only the time-change augmented authentication, but also an alternative authentication process that allows the user to bypass time-change authentication if the user forgets the device. This may require additional authentication steps by the user or impose restrictions on user access.

SUMMARY

In one approach, multiple channels may be used to authenticate a user. In one aspect, this includes a method that includes receiving a first authentication parameter from a first device associated with a user over a first channel, wherein the user is unauthenticated. The method also includes transmitting a token value and receiving the token value and a second authentication parameter from a second device over a second channel, wherein the second device is associated with the user; and using the token value to associate the first authentication parameter to the second authentication parameter.

In another approach, there is a method to access a resource over a first channel where the resource requires a second authentication parameter over a second channel. In one aspect of this approach there is a method including receiving a request over a first channel for a resource that requires a second authentication parameter; transmitting a token value over the first channel; receiving the token value and the second authentication parameter over a second channel; and using the token value to associate the request received over the first channel with the second authentication parameter received over the second channel.

In another approach, multiple channels may be used to provide a resource to a first party wherein the access to the resource requires an indication of approval from a second user. In one aspect there is a method that includes receiving a first authentication parameter from a first device, wherein the first device is associated with a first user, receiving a request for a resource from the first user that requires an indication of approval of a second user, and transmitting a token value to the first device. The method also includes receiving a second authentication parameter and the token value from a second device, wherein the second device is associated with the second user, using the token value to associate the first authentication parameter with the second authentication parameter, and receiving an indication of approval from the second user to allow the request from the first user.

In another aspect, the method includes authenticating a first user on a first channel, receiving a request for a resource from a first device over a first channel that requires an indication of approval from a second user, wherein the first device is associated with a first user, and transmitting a token value to the first device. The method also includes authenticating a second user on a second channel, receiving the token value from a second device over the second channel, wherein the second device is associated with the second user, and receiving the indication of approval from the second device. The method also includes using the token value to associate the request from the first device with the indication of approval from the second device and providing the resource to the first device.

In another aspect, the method includes authenticating a second user, receiving a token value, wherein the token value is associated with a user session wherein a first user has access to a resource based on an indication of approval from the second user, transmitting information about the user session to the device, and receiving instruction from the device regarding access of the first user to the resource.

The above mentioned aspects can include one or more of the following features. The user can be authenticated based on the first authentication parameter and the second authentication parameter. The first authentication parameter can be a user ID, password, hard token, soft token, wireless applet, voiceprint, or any combination thereof. The second authentication parameter can be a user ID, a password, a hard token, a soft token, a wireless applet, a voiceprint, or any combination thereof. The first authentication parameter and the second authentication parameter can be channel specific. The user can be notified over the second channel that the authentication is complete, allowing the user to continue a user session on the first channel. The first channel can be a phone line, a wireless connection or an online connection and the second channel can be a phone line, a wireless connection, or an online connection.

The aspects mentioned above can also include receiving the token value and at least one additional authentication parameter over at least one additional channel. The additional authentication parameter can be a user ID, a password, a partial password, a portion of the first authentication parameter, a portion of the second authentication parameter, a combination of the first and the second authentication parameters, a hard token, a soft token, a wireless applet, a voiceprint, or any combination thereof. The additional channel may not be the first or second channel, and the token value can be used to associate the first authentication parameter, the second authentication parameter, and the at least one additional authentication parameter. And the first authentication parameter, the second authentication parameter, and the at least one additional authentication parameter can be used to authenticate the user.

Any of the above aspects can include one or more of the following features. The resource can require a second authentication parameter and at least one additional authentication parameter. The method can also include receiving the token value and an additional authentication parameter over an additional channel, and using the token value to associate the request received over the first channel with the additional authentication parameter received over the additional channel.

Any of the above aspects can include one or more of the following features. The resource is provided over the first channel. The method can also include receiving a request over the first channel for a resource that requires an additional authentication parameter, receiving the token value and the additional authentication parameter over an additional channel, using the token value to associate the request received over the first channel with the additional authentication parameter received over the additional channel. The additional authentication parameter may not be the first authentication parameter or the second authentication parameter in some aspects. The additional authentication parameter can require more than either the first authentication parameter or the second authentication parameter in an additional or alternative aspect. And the additional authentication parameter can be a user ID, password, partial-password, hard token, soft token, wireless applet, voiceprint, or any combination thereof in some other aspects.

Any of the above aspects above may also include one or more of the following features. At least one additional user provides a token value over at least one additional channel. The additional user may be authenticated using a single channel or multi-channel authentication prior to providing the token value. The at least one additional user may provide an indication of approval for a first user to receive a requested resource over a first channel, an authentication parameter, a token value, or any combination over the at least one additional channel.

Any of the aspects above may also include one or more of the following features. The resource can be provided over the first channel and the second channel simultaneously. The first channel can be a phone line, a wireless connection, or an online connection and the second channel is a phone line, a wireless connection, or an online connection.

Any of the aspects above may include one or more of the following features. A user may be authenticated using a multi-channel authentication process or a single-channel authentication process. A method can also include authenticating a user by receiving a first authentication parameter from a first device through a first channel. The first device can be associated with the user. Furthermore, the aspects may include one or more of the following features. The first authentication parameter can be a user ID, password, hard token, soft token, wireless applet, voiceprint, or any combination thereof. The second authentication parameter can be a user ID, password, hard token, soft token, wireless applet, voiceprint, or any combination thereof. The second authentication parameter may not be the first authentication parameter. The second authentication parameter can require more than the first authentication parameter. And the first authentication and the second authentication parameter can be channel specific.

Any of the aspects above may also include one or more of the following features. A credential is generated wherein the information associated with the credential can indicate that the resource may be provided to a first device without the second authentication parameter being provided over the second channel. The credential can be a permanent credential, a time-sensitive credential, a credential that expires after a preset number of user sessions, or any combination thereof. Other features in some aspects may include when the user has exited their initial session and is attempting to begin a new session authenticating the user. The method can also include receiving a request for the resource from the first device over a first channel. The resource can require the second authentication parameter provided over the second channel. The method can also include processing information associated with a credential; and providing the resource if the information associated with the credential indicates that the resource should be provided to the first device without the second authentication parameter being provided over the second channel.

Any of the above aspects can include one or more of the following features. A first authentication parameter can be received from a first device. The method can also include receiving a first authentication parameter from a first device over a first channel, receiving a second authentication parameter and the token value from a second device, receiving a first authentication parameter from a first device over a first channel, using the token value to associate the request received from the first device with the indication of approval from the second user received over the second channel, and providing the resource to the first device.

Any of the above aspects can include one or more of the following features. The first authentication parameter can be a user ID, a descriptive title, password, hard token, soft token, wireless applet, voiceprint, or any combination thereof. The first authentication parameter can be associated with the second user. And the second authentication parameter can be a user ID, a descriptive title, password, hard token, soft token, wireless applet, voiceprint, or any combination thereof.

Any of the above aspects can include one or more of the following features. A user can be authenticated using a single-channel process or a multi-channel process. The method can also include receiving a user ID and first password associated with a first user over a first channel, authenticating the first user based on the user ID and the first password, receiving a user ID and second password associated with a second user over a second channel, and authenticating the second user based on the user ID and second password.

Any of the above aspects can include one or more of the following features. A credential can be generated with information that indicates whether a resource may be provided to the first device without the indication of approval from the second user. The credential can be a cookie, a permanent credential, a time-sensitive credential, a credential that expires after a pre-set number of user sessions, or any combination thereof. Other features that may be included in one or more of the aspects above include when the first user has exited an initial session and is attempting to begin a new session. The method can also include authenticating the first user. The method can also include receiving the first authentication parameter from the first device. The first device can be associated with the first user. The method can also include receiving a request for the resource from the first device, wherein access to the resource requires an indication of approval from the second user, and processing information associated with the credential. An additional feature that may be included in one or more of the aspects above includes providing the resource if the information associated with the credential indicates that the resource should be provided to the first device without the approval of the second user.

Any of the above aspects can include one or more of the following features. An authentication parameter can be received from a device. The authentication parameter can be associated with the second user. The method can also include receiving instructions from the second user to terminate the access of the first user to the resource, and receiving instructions from the second user to limit the access of the first user to the resource. And the second user can limit the access of the first user according to a time deadline, or a pre-set number of user sessions.

Any of the above aspects can include one or more of the following features. A first authentication parameter can be a user ID, a descriptive title, password, hard token, soft token, wireless applet, voiceprint, or any combination thereof. The first authentication parameter can be associated with a second user or a first user. The second authentication parameter can be a user ID, a descriptive title, password, hard token, soft token, wireless applet, voiceprint, or any combination thereof. The second authentication parameter can be associated with the first user or the second user. The second authentication parameter may not be the first authentication parameter. The second authentication parameter can require more than the first authentication parameter. And the first authentication, the second authentication parameter, and the additional authentication parameter can be channel specific. The additional authentication parameter may not be the first authentication parameter or the second authentication parameter. The additional authentication parameter can require more than either the first authentication parameter or the second authentication parameter. And the additional authentication parameter can be a user ID, a password, a partial password, a portion of the first authentication parameter, a portion of the second authentication parameter, a combination of the first and the second authentication parameters, a hard token, a soft token, a wireless applet, a voiceprint, or any combination thereof.

In another aspect, there is a computer program product for generating code on a network. The computer program product is tangibly embodied in an information carrier. The computer program product includes instructions being operable to cause a data processing apparatus to perform any of the methods described above.

In another aspect, there is a system for generating code on a network. The system includes a computing device. The computing device is configured to perform any of the methods described above.

Any of the above described methods and/or apparatuses can include one or more of the following advantages. An advantage of the disclosed technique is that the user does not provide all of their authentication parameters over a single channel. If an outside party was able to intercept the user's session, they would not be able to access the session at a later time because the outside party would not have access to, for example, the user's user ID and password. In addition, if the third-party was able to access the user ID and password, they would not be able to complete a transaction or access a resource that required the additional authentication parameter. Another advantage of the disclosed technique is that, for example, the second user's user ID, or other first authentication parameter in alternative embodiments, may be exposed but not the second user's Password, or second authentication parameter. The first user is then able to access the second user, or registered user's account information with limited exposure of the second user's authentication parameters. Another advantage is that the technique can be modified to authenticate or authorize a single user or a group of 'N' users. Additionally, the users who are authenticated or authorized do not need to have a preexisting relationship with the resource provider or provider of the back-end system.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIGS. 2A-2C show a single, party, multi-channel authentication process.

FIGS. 3A-3C show a higher level authentication process to access a restricted resource for an single party, over multiple channels.

FIGS. 4A-4C show higher level authentication process to access a restricted resource for an single party, over multiple channels wherein a device is also registered as secure for future sessions.

FIGS. 5A-5C show an authentication process used by multiple parties over multiple channels.

FIGS. 7A-7C show implementations whereby a parent or second joint account owner must authorize the session of a minor or first joint account owner.

Variations, modifications, and other implementations of what is described herein will occur to those of ordinary skill in the art without departing from the spirit and the scope of the invention. Accordingly, the invention is to be not limited by the following illustrative descriptions.

DETAILED DESCRIPTION

The techniques described herein allow a single user to use at least two different channels sequentially to perform authentication to a single session. By using multiple channels, the user is prevented from providing all of their authenticating, or personally identifying, information over a single data stream channel that may be intercepted. In addition, if one data stream is intercepted by a third-party trying to improperly access the user's personal information, the third-party will be unable to use any intercepted information to later access the user's account or personal information because the third-party will not have access to all of the user's authenticating information, only the authenticating information that was passed over the intercepted channel or data stream. Therefore, access to the user's account or personal information is protected.

One implementation of these techniques includes a single user who uses multiple channels to authenticate their usage. Multiple users can also use a multi-channel authentication/authorization technique.

Figure 1:
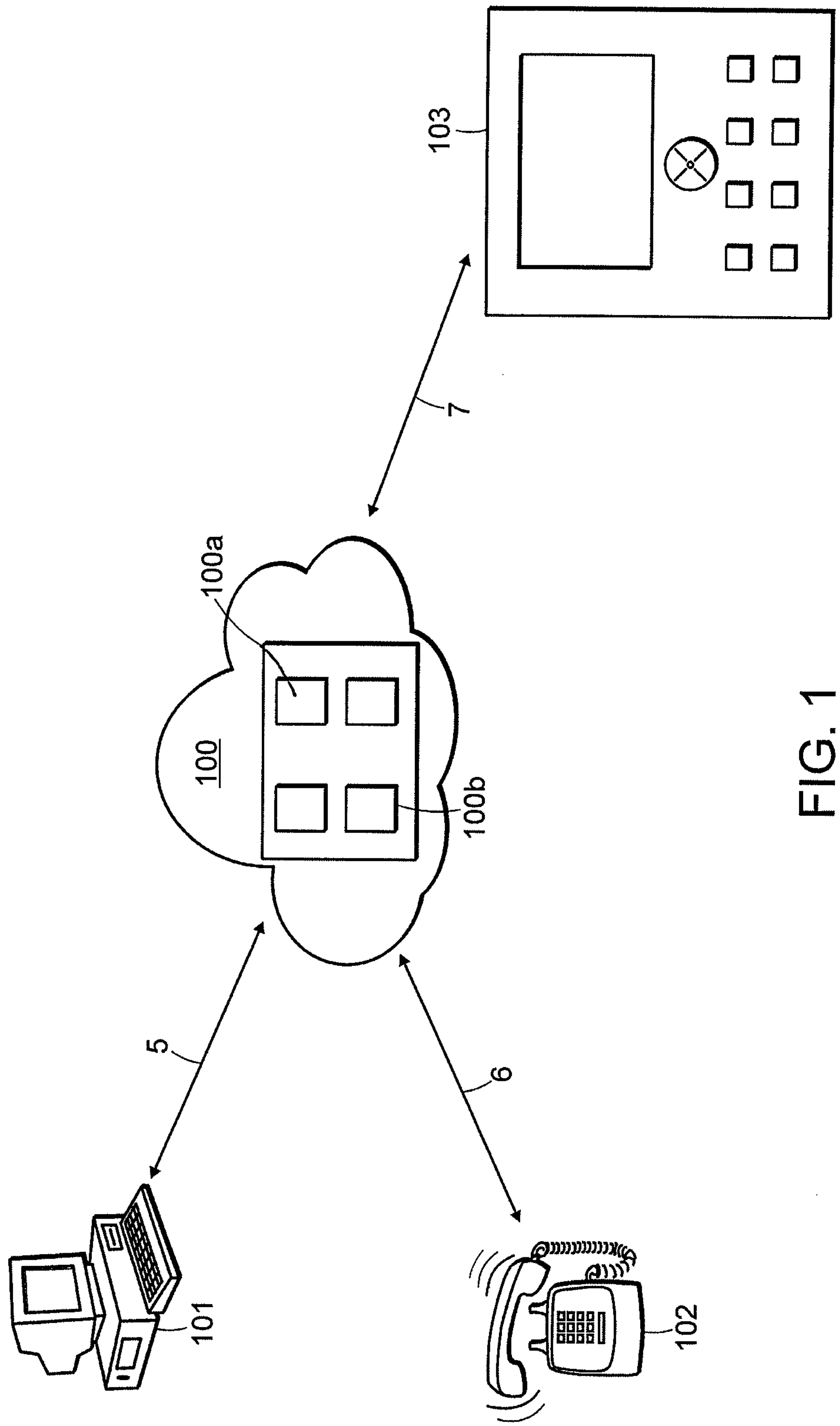
FIG. 1 shows the elements of a multi-channel authentication process.

FIG. 1 depicts a system that can be used in some implementations. This system can include, for example, a user agent 1 101, a first channel 5, a user agent 2 102, a second channel 6, at least one additional user agent 103, at least one additional channel 7 and a back end system 100. The back end system 100 is in communication with the different channels 5, 6, 7, using interfaces and/or networks associated with each channel (not shown). The user(s) can provide a first authentication parameter over a first channel 5. The back end system 100 includes a token generator module 100*a* that generates a token value, and transmits that token value to the user over the first channel 5. The user takes the token value and uses a second channel where they enter the token value and a second authentication parameter. This process of entering the token value and an additional authentication parameter can be repeated on an unlimited number of different channels. The back-end system 100 includes an authentication module 100*b* that uses the token value to associate the request for a resource or authentication on the first channel 5 with the authentication parameters or authorization provided over the second channel 6 and/or additional channels 7. In some embodiments the back-end system 100 can be a single device and in other embodiments, the back-end system 100 can include multiple devices. The modules 100*a* and 100*b* can likewise be part of the same device or distributed on different devices. In some implementations the user may choose a different second, or additional channel each time they complete the second part of the authentication process. In some implementations, the user should choose a first and second channel to ensure that all of the data being transmitted does not pass over the same data stream. This ensures that if one channel is intercepted by an unauthorized third-party, all of the personal or authentication parameters of the user is not at risk.

The user agents 101, 102, 103 can be computers, telephones, IP phones, mobile devices (e.g., cellular phones, personal digital assistant (PDA) devices, laptop computers, and/or the like), and/or other communication devices.

User agent 1 101 can be associated with a first user or a first device. In some implementations user agent 1 101 can include a first device, and in some other implementations user agent 1 101 can be both the first channel 5 and a first device. Similarly, user agent 2 102 can be associated with a second user or a second device. In some implementations user agent 2 102 can be a second device, and in some other implementations user agent 2 102 can include both the second channel 6 and a second device.

The information entered by the user on the first channel 5 and the information entered on the second 6, or additional 7, channels, is associated by a token. A benefit of the token value is that it allows easy association of the user's authentication parameters that are entered over multiple channels.

In some implementations user agent 1 101, user agent 2 102 and any additional user agent 103 is associated with a single user. In some implementations each user agent is associated with a different user.

In some implementations, the token value is used when authenticating a user or multiple users over multiple channels. In a first implementation the token value may ensure that only the device and user are authenticated, and that other unauthorized users associated with other devices do not have access to a user's information or transactional authority. A token value can also be mapped back to a database record and one or more users in some implementations. A token value can associate the first authentication parameter which is associated with the first channel, and the second authentication parameter which is associated with the second channel. The token value can also be used to associate the Nth parameter with any of the previously entered N-1 parameters. In some implementations the token value can associate the request received over a first channel with an indication of authorization from an authenticated user received over a second or Nth (additional) channel. And in some implementations the token will be entered with authenticating data or parameters, not alone or solely with an indication of approval.

In some implementations, the user may determine the relative security strength of the token, and in some implementations the resource provider may determine the strength of the token. In some implementations the token value can be, for example, a randomly generated alphanumeric string, encrypted, previously known by the account owner or registered user, unique to the requested resource or authentication level, more secure depending on the requested resource or authentication level, or any combination thereof. In some implementations the token value can be limited by the number of transactions, a time limit, or be session specific. And in some embodiments, the token may be unique to the event or scenario.

Information transfer over the first channel 5, second channel 6, and/or at least one additional channel 7 can be based on one or more communication protocols and/or communication modes. Communication protocols can include, for example, Internet Protocol (IP), Voice over IP (VOIP), Peer-to-Peer (P2P), Hypertext Transfer Protocol (HTTP), Session Initiation Protocol (SIP), Really Simple Syndication (RSS), podcasting, Signaling System #7 (SS7), Global System for Mobile Communications (GSM), Push-to-Talk (PTT), PTT over Cellular (POC), and/or other communication protocols. Communication modes can range from textual modality (e.g., electronic mail and/or instant messaging) to graphical modality (e.g., still and/or moving pictures) to audio modality (e.g., voice calls), or any combination thereof.

The first channel 5, the second channel 6, and/or the at least one additional channels 7 can include one or more packet-based networks and/or one or more circuit-based networks in any configuration. Packet-based networks can include, for example, the Internet, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks.

The first channel 5, second channel 6, and additional channel 7 can be connected, directly or indirectly to the back-end system 100. The back-end system 100 can include, for example, an authentication server, an authentication validator, an ID system, a session database, a wireless gateway server, a low-value resource validator, a high value resource validator, a resource validator, a Tellme application, a voice authentication validator, and a VRU gateway.

Figure 2A:
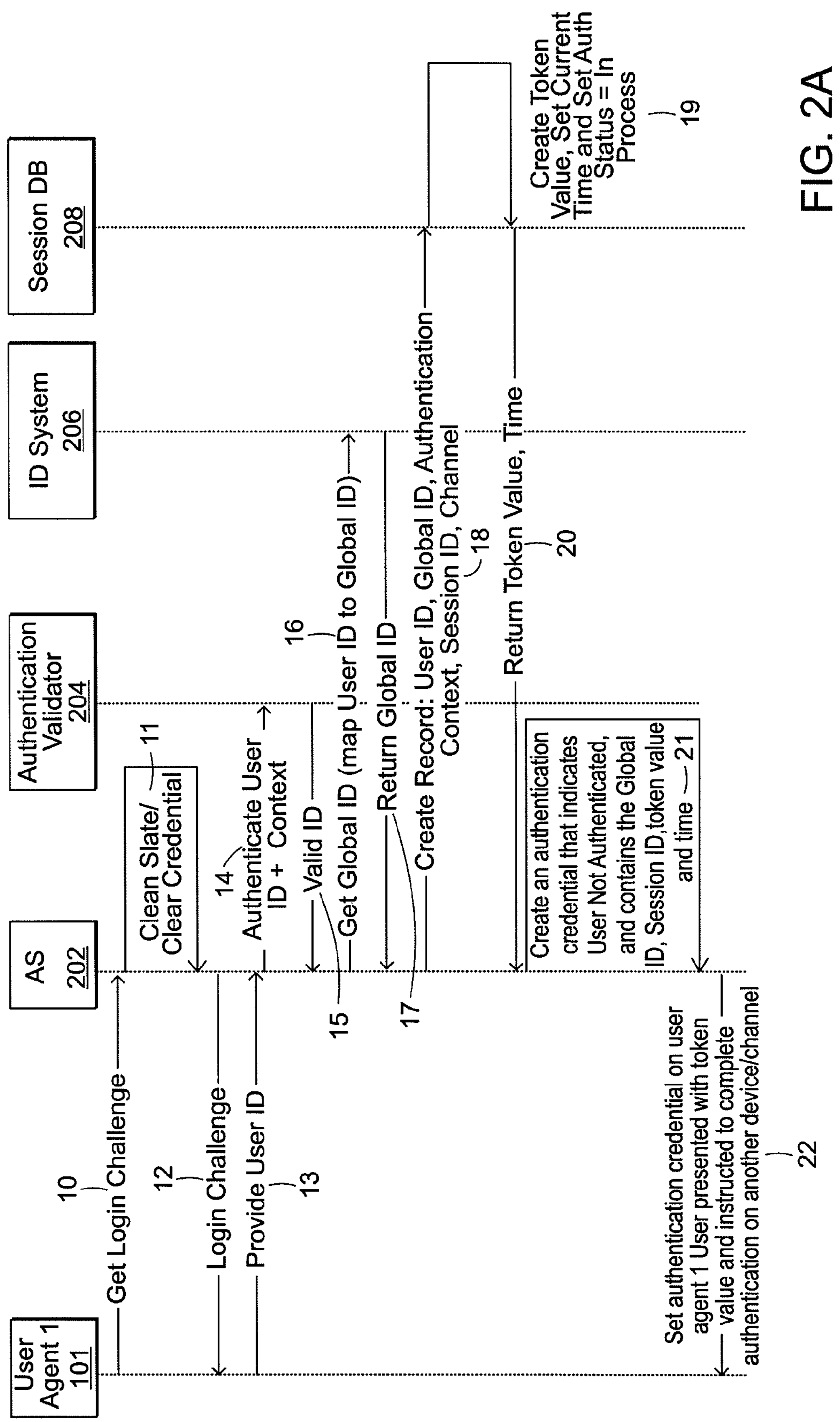

FIG. 2A illustrates a first implementation wherein the user obtains a token. The technique in FIG. 2A uses a system of several devices to perform the process. This system includes a first channel 101 (included as part of user agent 1 101), an authentication server 202, an authentication validator 204, an ID system 206 and a session database 208. The first channel 101 can be, for example, a website, a telephone line, and the like. In FIG. 2A, the user uses the first channel 101 to enter (13) their user ID. Further processing that is illustrated in FIG. 2A is completed using the system elements as indicated. A token value is returned (22) to the first channel 101. In some embodiments a token value may be an alphanumeric string. In some embodiments the token value is a single use token. In addition, or alternatively, the token value may be time sensitive or valid for a limited duration.

In FIG. 2A, the user using user agent 1 101, associated with the first channel requests a log-in challenge (10) from the Authentication Service 202. The Authentication Service (AS) 202 clears (11) any current user authentication credentials and presents the login challenge page 12 on user agent 1 101. The user provides (13) the user ID, or first authentication parameter, to the Authentication Service 202. In some implementations, the first authentication parameter can be a user ID, password, hard token, soft token, wireless applet, voiceprint, or any combination of these. In some implementations, the first authentication parameter can also be specific to the device or type of channel used. In other words, in some implementations, the user may have a first authentication parameter that is specific to a land-line phone, or cellular phone, a computer, or a wireless device.

In some implementations, the authentication validator 204 using (14) the user ID presented and the authentication context determines that the user is a valid user (15). The authentication service 202 uses (16) the ID system 206 to map the user ID to its global ID 17. Next, the authentication service 202 transmits a request (18) to the session DB 208 to create a record that includes, for example, user ID, global ID, authentication context (including channel) and session ID. The session DB 208 creates a token value (19), and combines the token value with the values provided and the current time. The session DB 208 also creates a session database entry, setting its authentication status value to: In-Progress (19). The session DB 208 returns all of this information (20) to the authentication service 202 which uses the returned token value and time 20 to produce an authentication credential. This authentication credential indicates that the user is not yet authenticated, and includes the global ID, the session ID, the token value and the time 21. The authentication service 202 sets the authentication credential to user agent 1 101, and presents (22) the token value and instructions to complete authentication on another channel.

The exemplary process of FIG. 2B1 shows the use of user agent 2 102, which can be, for example, a land-line phone. The exemplary process of FIG. 2B2 shows the use of user agent 2 102, which may be, for example, a wireless device. The process of providing the token value and the PIN or password, or second authentication parameter, in a second part of the authentication process will depend on whether the user is attempting to connect by phone (e.g., FIG. 2B1) or handheld wireless Applet (e.g., FIG. 2B2). In some implementations, the user enters (27) the token value provided and later enters (29) their user password. In other implementations, the user can enter the token value and their password in a single step. The token value associates the information provided on user agent 1 101 with the information provided via user agent 2 102. This allows the provided user identification information to be aggregated and used to complete the authentication of the user.

In FIG. 2B1, the second authentication parameter is provided through user agent 2 102. In some implementations user agent 2 102 is associated with a second channel, in some implementations user agent 2 102 is associated with both a second channel and a second device. In one implementation, FIG. 2B1, when the user requests a connection (25) to the second channel 102 by telephone, the user dials the telephone number provided over the first channel. In some embodiments, the user may dial a telephone number that is already known, or was provided to the user before the instant session. A VRU Gateway 200 requests the token value (26). After receiving the token value 27, the VRU Gateway 200 requests (28) a PIN, password, or other second authentication parameter from the user. In some implementations, the second authentication parameter may be is a user ID, password, hard token, soft token, wireless applet, voiceprint, or any combination, instead of, or in addition to, a password or PIN.

In FIG. 2B2, the user uses a wireless hand held device to access a second, or additional, channel. In the wireless handheld embodiment, the user may be asked to input (127) the token value and the PIN or password in a single request. The user will then follow the process of using a wireless device as the second device. In some of the embodiments, after the token and Password are inputted, any subsequent process is identical regardless of whether the user is utilizing the phone or a wireless hand-held device as the second device associated with a second or additional channel.

In FIGS. 2B1 and 2B2, the Authentication Service 202 requests (30) the session data from the session DB 208, based on the inputted token value. The session DB 208 uses (31) the token value to acquire and return the entry creation time, user ID, global ID, authentication context (including the original channel), session ID, and authentication status (e.g., In Progress) to the AS 202. The AS 202 validates (32) the session entry token, time and authentication status. It obtains (33) the user ID, and requests (34) that the authentication validator 204 authenticates the user ID, PIN, and authentication context. In some implementations the PIN is a channel specific PIN (see e.g., FIG. 2B2). On successful authentication (35), the AS 202 sends an indication to the session DB 208 to update the authentication status (36) in the session database entry to, for example, Session Authenticated 37. In some implementations the session DB 208 may set (85) the authentication status to authentication upgrade. The session database 208 reports back (38) to the AS 202 when the authentication status has been updated. The user is informed that authentication was successful and that they can now continue their session on the user agent 1 101.

Figure 2C:
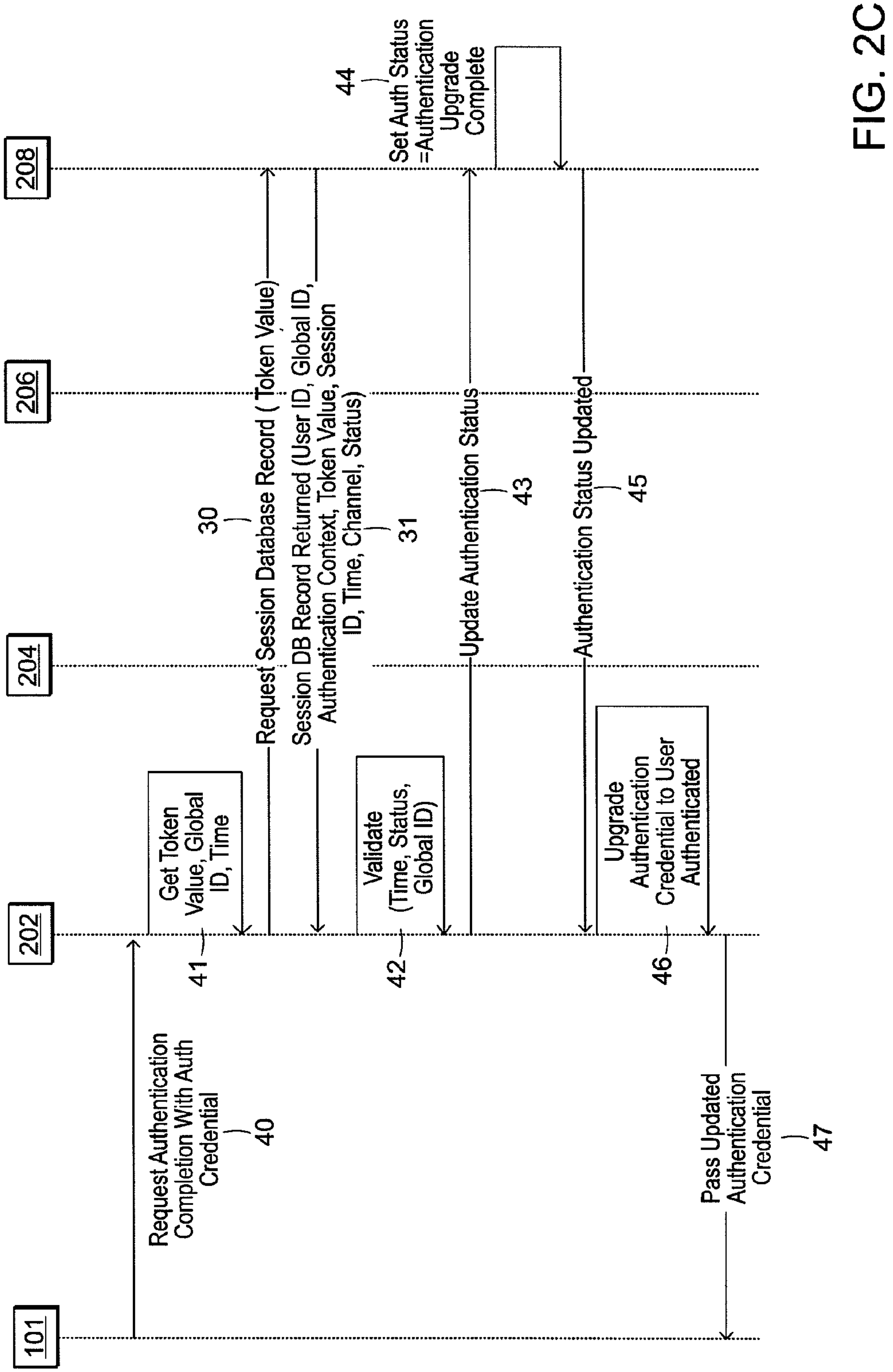

In FIG. 2C, the user returns to the first channel and requests (40) authentication completion with the authentication credential. The Authentication Service 202 obtains (41) the token value, the global ID, and the time from the authentication credential delivered with the user request. The AS 202 requests (30) that the session DB 208 acquire the session database record associated with the token value provided. The session DB 208 returns 931) the session database record that includes, for example, the user ID, global ID, authentication context, token value, session ID, creation time and authentication status.

The Authentication Service 202 validates (42) the time, authentication status and global ID and transmits (43) the updated authentication status to the session DB 208 which updates (44) the authentication status in the session database 208 to authentication upgrade complete. The session DB 208 then transmits (45) the updated status back to the AS 202. The fall authentication credentials 46 are built and returned (47) to user agent 1 101. The user is notified that the authentication is complete and that they may proceed.

In some implementations, the secured multi-channel authentication method allows a single user to upgrade his/her authentication level via multiple channels whereby the user is able to access a resource wherein access to the resource requires a second authentication parameter. In some implementations an additional authentication parameter is required over a second or additional channel. The second or additional authentication parameter can be provided from a second device associated with the user.

In a first implementation of accessing the requested resource a user follows a traditional authentication process at a website by entering their ID and password on a login page. In other embodiments, the user may authenticate using a multi-channel authentication process. After logging onto the website, the user navigates the website at an initial resource access level. When the user navigates to, or requests a resource that requires a higher authentication access level they are directed to a page that presents a token value. The page then directs the user to user agent 2 102 to provide an additional authentication parameter. This can be associated with a second channel 6 or an additional channel 7.

The user chooses a second channel 6 or an additional channel 7 (e.g. the phone) and dials the given number. In other implementations, the user may access a second channel through a handheld device, cell phone, or other web channel. The user inputs the token value over the second channel, and provides the second or additional authentication parameter, such as a hard token, answer to secure question, or voice print. The authentication parameter entered on the phone channel is validated. The token value provided serves to link to the session on the first channel (e.g., the web). When the user completes the necessary process the user session on the first channel 5 is upgraded to the higher authentication access level.

In some implementations because the user provided authentication parameters securely and independently via two or more separate channels (e.g. web and phone), the user may be authenticated on all channels and may proceed on any of these authenticated channels. Therefore, the phone, or second channel 6, associated with user agent 2 102, can have the same level of authentication as the web, or first channel 5, associated with user agent 1 101.

Figure 3A:
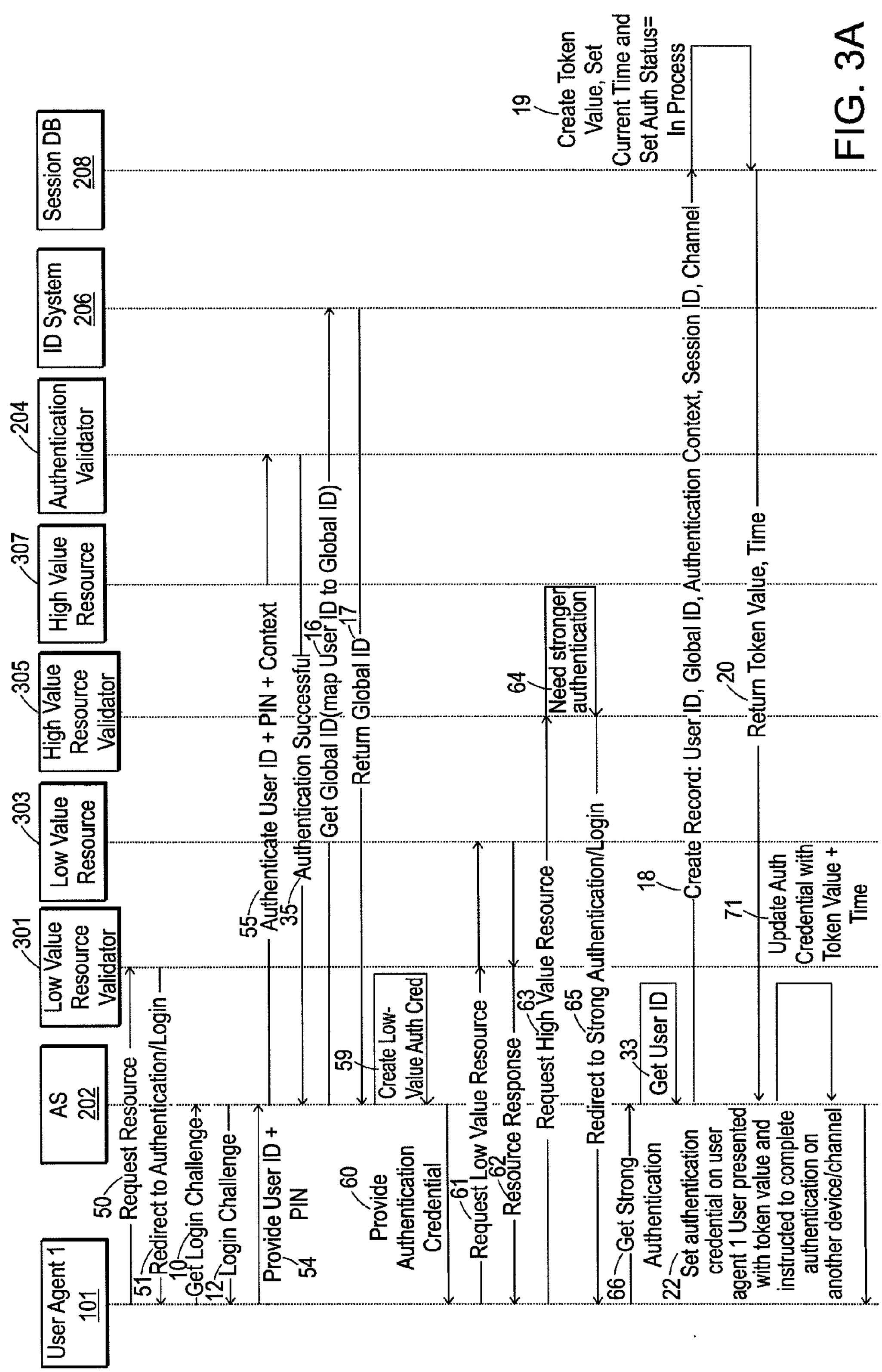

FIG. 3A shows a user requesting (50) access to a low level resource. The resource redirects (51) the unauthenticated user to a traditional authentication. The user is challenged (12) by the Authentication Service (AS) 202 to provide (54) their user ID and password. The AS 202 forwards (55) the user ID, the PIN and the context to the authentication validator 204 which authenticates (35) the user identity and password. Then, the AS 202 requests the ID System 206 to map (16) the user ID into their global ID (17). The AS 202 creates (59) a low value resource authentication credential that the AS 202 returns (60) to the user agent 1 101. The user now has full access to the low value resource 303.

Later in the session when the user requests (63) a higher value resource 307, they will need stronger authentication credentials (64) to access this resource. The user is redirected (65) by the AS 202 to acquire stronger authentication credentials. After the user indicates (66) a desire for the stronger authentication credential, the AS 202 acquires (33) the user ID and requests to the session DB 208 to create (18) a record that includes: user ID, global ID, authentication context (including channel) and session ID. The session DB 208 creates (19) a token value, and combines the token value with the other values provided and the current time. In some embodiments, the session database 208 also creates (19) a session database entry, setting its authentication status value to in-progress. The session DB 208 returns (20) all of this information to the AS 202, which uses the data to update (71) the current user authentication credential with the token value and the time. The AS 202 sets (22) the authentication credentials on user agent 1 101 and presents the token value to the user with instructions to complete the additional authentication steps on another channel.

Methods in FIGS. 3B1 and 3B2 are similar to FIGS. 2B1 and 2B2. The second authentication parameter used to fulfill this higher level resource access requirement may be a password in some implementations. In other implementations, the second authentication parameter may be any appropriate second factor including a wireless applet, a voice print, a phone-only PW, a soft token, or a hard token. In an alternative implementation, FIG. 3B3, the user may use a phone channel as the second channel and a voice print as the authentication parameter. In this implementation, the AS 202 sends (132) a request for a voice phrase to the voice authentication validator 303. The voice authentication validator 303 sends (133) a Voice Phrase XXX to the AS 202, which then requests (134) that the user say XXX. The user then responds by saying XXX 135, the designated voice phrase XXX is then forwarded to the voice authentication validator 303 which authenticates (136) the user ID, the user voice for phrase XXX and the context. The voice authentication validator 303 then sends (35) notice to the AS 202 that the authentication was successful. The AS 202 forwards (36) an updated authentication status to the session database 208, which sets (82) the authentication status as authentication upgrade. An updated status message is then sent (38) to the AS 202, and the AS 202 requests (39) that the user continue their session on user agent 1 101.

Figure 6:
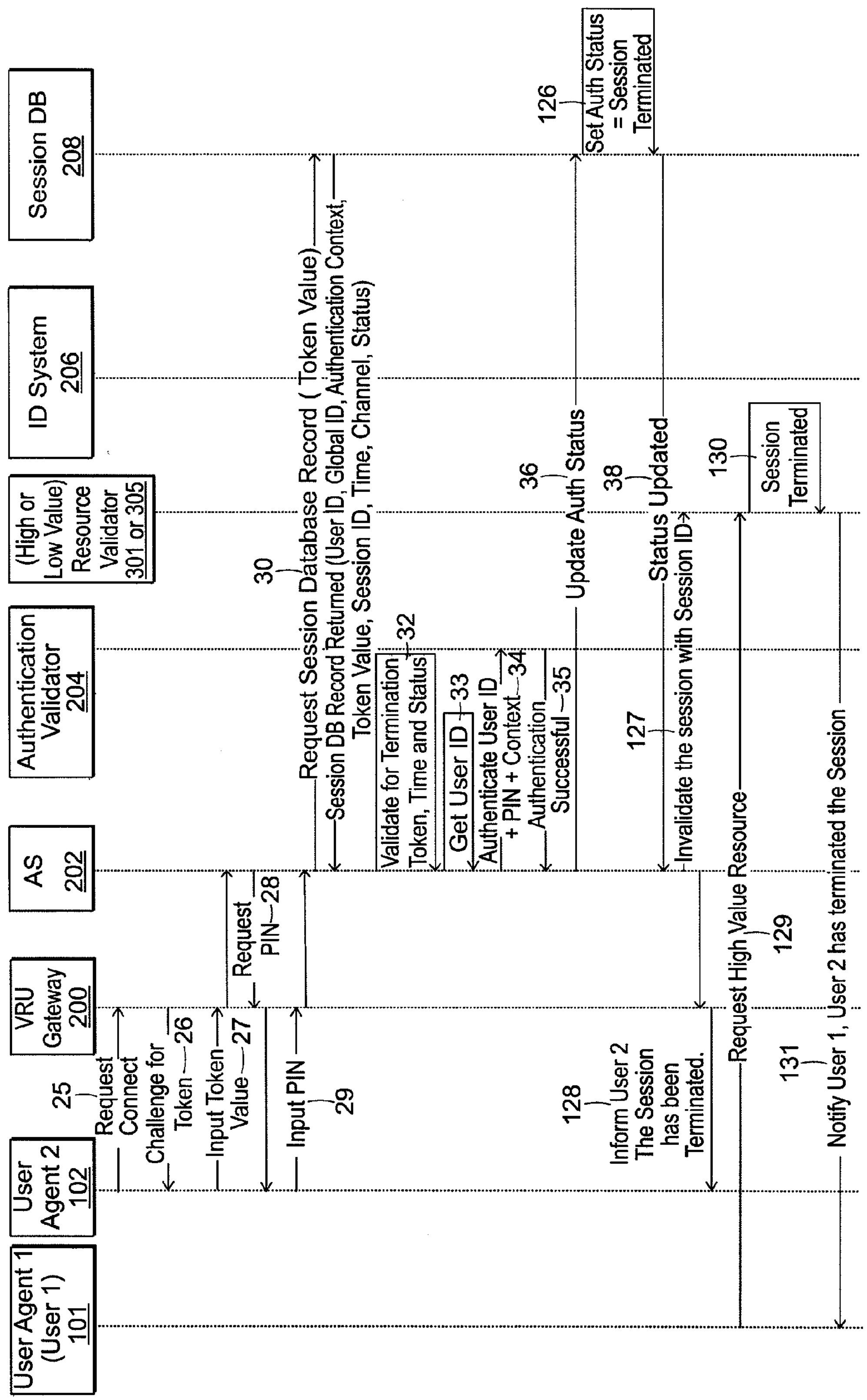
FIG. 6 shows the process whereby a registered user terminates the access of a first user to a requested resource.

Alternatively, the user may continue their user session on either the first or second channel and the authentication strength is deemed the same on both channels once the user completes the authentication procedure. In FIGS. 3B4-3B6, the AS 202 creates (88) an authentication credential to use on the second channel. The AS 202 may then request (39) that the user continue his session on user agent 1 101, but the user can also continue (90) his session on user agent 2 202.

In FIG. 3C1, after the user has completed the authentication steps on the second channel (i.e. user agent 2 102), they return to the first channel and request (98) authentication upgrade completion. The AS 202 requests (30) the session database record associated with the token value provided. The session DB 208 returns (31) the session database record that can include, for example, the user ID, global ID, authentication context, token value, session ID, creation time and authentication status. The authentication service 202 validates 91 the time, authentication status and global ID and sends indication (43) to the session DB 208 which updates (44) the authentication status in the session database 208 to authentication upgrade complete. The session DB 208 then transmits (45) the updated status back to the AS 202. Now, the upgraded authentication credentials are built (94) and returned (95) to user agent 1 101. The user is redirected (96) back to access the higher level resource that was requested. In another implementation (e.g., FIG. 3C2) the user completes the authentication process on either the first or second channel. In FIG. 3C2, the user requests (99) the channel authentication upgrade for the high-level resource on both the first and the second channel. After the credential is established for both channels, the user can continue to complete the authentication process as depicted in FIG. 3C1.

The process of requiring higher level access authentication credentials, as higher-value resources are requested, can be repeated for as many types of high-level access resources as are needed. Further, additional factor authentication for higher level resource access can be required at initial login and not delayed until the higher level resource is actually requested.

Some implementations may also incorporate device registration. Device registration allows an authenticated user to register a specific device as secure for high level resource access, whereby the user is not required to provide an additional or second authentication parameter when the user requests access to the high-level resource in the future.

In FIGS. 4A1 and 4A2, the user follows the same process as described in FIG. 3A. However, after the ID System 206 returns the global ID 17, the AS 202 requests (142) the strong authentication method for the user ID and the ID system 206 returns (143) the secure device registration. The AS 202 can determine if the user is registered for a secure device credential 144, if the secure device credential exists 145, and if the device security credential user ID match the current user ID entered by the current user 146.

FIG. 4A1 shows one implementation where the secure device credential does not exist. In FIG. 4A1, after the AS 202 determines that the secure device credential does not exist 145, the AS 202 creates a (59) low-level resource credential, and provides (60) the authentication credential for the lower-level resource to the user. The user then follows the same process of FIG. 3A to request and access a resource that requires a second or additional authentication parameter. In addition, in some implementations, the AS 202 may include (70) a secure device registration along with the authentication credential that includes the token value and time.

In FIG. 4A2, a secure device credential exists but does not match the current user ID 146. In this implementation, the AS 202 creates (59) the authentication credential for the initial authentication level, and provides (60) the authentication credential while deleting the device security credential. The user then follows the same process of FIG. 4A1 to request a resource that requires a second or additional authentication parameter.

In FIG. 4A3, the secure device credential exists and matches the current user ID 146. In this implementation, the AS 202 creates a high-value authentication credential 68 for a resource that requires an additional, or second authentication parameter. The AS 202 then provides the high level authentication credential to user agent 1 101. The user is now able to access the resource that requires an additional, or second, authentication parameter without having to provide the additional, or second authentication parameter over the second channel.

The implementations disclosed in FIGS. 4B1-4B3 are similar to those disclosed in FIGS. 3B1-3B3 except that in the implementations shown in FIGS. 4B1-4B3 after the authentication validator 204 indicates (35) to the AS 202 that the authentication is successful, the AS 202 determines (137) if secure device registration is needed. If secure device registration is desired, the AS 202 sends a request to user agent 2 102 asking (138) if the user wants to register the device associated with user agent 1 101 as a long-term secure device. The user may then indicate (139) that they do want to register the device. The session database 208 sets (141) the authentication status to authentication upgrade and the secure device registration to long term. The updated status is returned (38) to the AS 202 which requests (39) that the user continue their session on user agent 1 101. In some implementations the first device, or the device associate with user agent 1 101, may be registered as a permanently long-term secure device. In some implementations, the device may be registered for the current session, in some implementations the device may be registered for a limited amount of time or specified number of user sessions, long-ins, or requests for the resource. In FIG. 4B1 the user may be asked if secure device registration is needed when the phone can be the second channel/device, in FIG. 4B2 a wireless/cell phone applet can be the second channel/device, and in FIG. 4B3 the phone can be the second channel/device and the user's voice can be the authentication parameter.

Figure 4C:
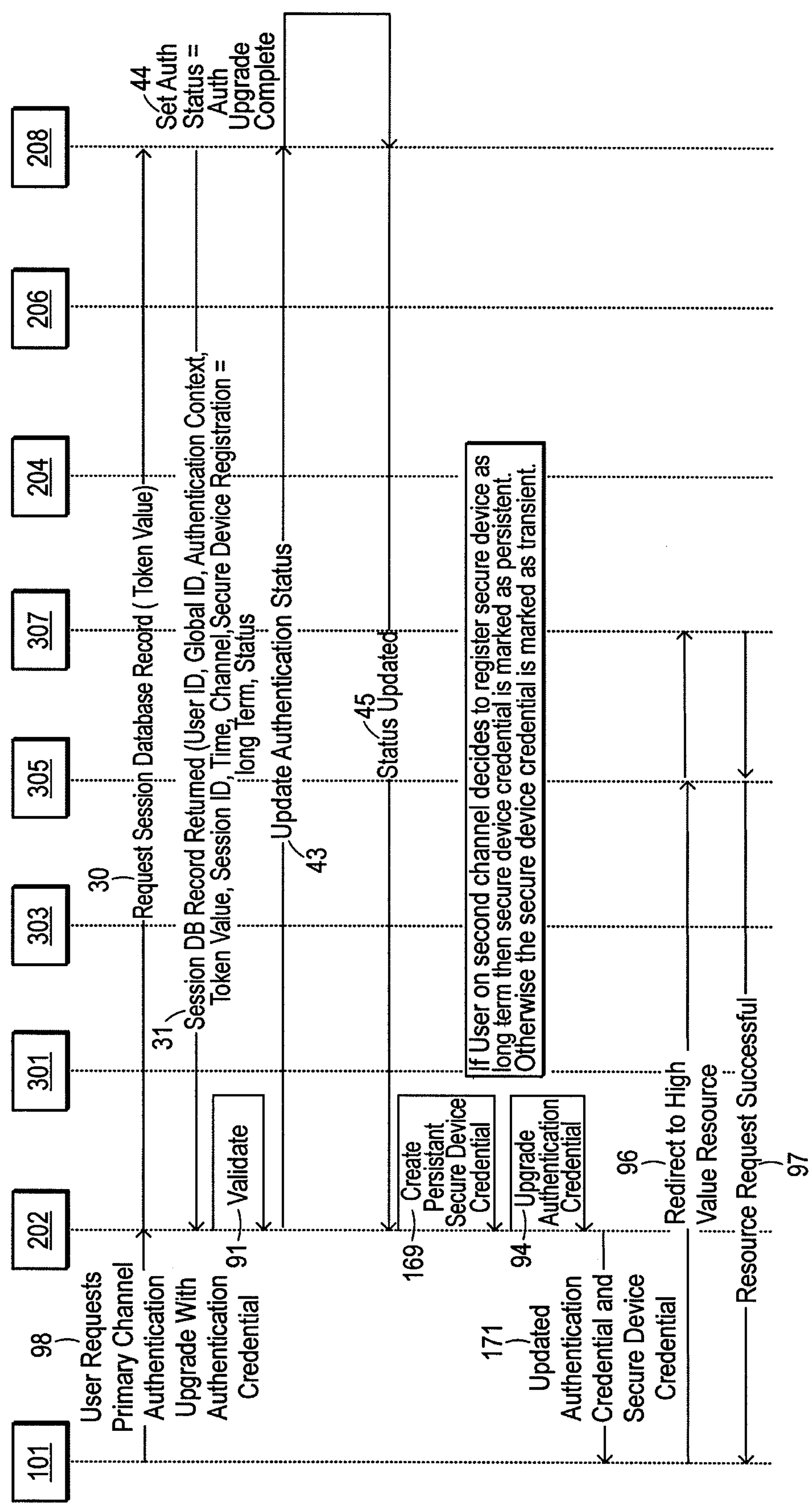

In FIG. 4C, when control is returned to the first device over the first channel, the AS 202, upon seeing the device registration in the session data, generates (169) a persistent credential that specifies the owner and the type of credential that has been enabled for the first device. The AS 202 also upgrades (94) the authentication credentials, notice (171) of the updated authentication and secure device credential are then returned to user agent 1 101. Subsequently, when the user requests (96) a high-value resource over user agent 1 101, the resource request is successful 97.

On subsequent upgrade authentication requests to the AS 202, the credential, which may be a persistent cookie in some implementations, is found and examined. And if the user and the device are registered for secure access to the requested resource(s), then the upgrade is completed without recourse to the second, or additional, channel (e.g. FIG. 4A3).

FIGS. 5A1-5C comprise different but related implementations that describe how an authenticated, or second user may provide an indication of approval for a third-party, or first user, to be authenticated and act as the registered user. In some implementations, the first user will only have access to the second user's account, and in some implementations the first user will have access to a resource that requires the indication of approval. The third-party is able to access at least some of the registered user's resources without the registered user exposing their private authenticating information to the third-party user. In some implementations, the first user who desires access to the account or resource is not known by the resource provider and in some implementations the first user may not have an account with the resource provider. In some implementations the first user is associated with user agent 1 101 and a single registered user will be associated with user agent 2 102. In some implementations, the process associated with user agent 2 102 may be carried out by N different registered/authenticated users, all who provide an indication of approval for the first user to be authenticated or to have access to the requested resource.

In FIG. 5A1, a first user requests access to the account of a registered user. FIG. 5A1 is identical to FIG. 2A above. However, in FIG. 5A1 the second user, here the account-owner/registered user, gives a first authentication parameter, which may include a user ID in one embodiment, to the interested third-party/first user. The first authentication parameter provided to the first user can also be, for example, a descriptive title, identifying number, or SSN. The third-party user enters (13) the user ID on the first channel. The AS sets (22) the authentication credential on user agent 1, and the first user is presented with a token value and instructed to complete authentication on another device/channel. The first user can communicate the token value to the second user, or registered user, associated with user agent 2 102.

In FIG. 5B1 the second user associated with user agent 2 102 accesses the system via a second, channel, or, in an alternative implementation, a different device on the same channel. In some implementations, the second user enters (27) the token value and the second authentication parameter (29), which in one embodiment can be a password or PIN. Alternative or additional embodiments of the second authentication parameter may be a user ID, a descriptive title, password, hard token, soft token, wireless applet, voiceprint, or any combination thereof. Subsequently, the second user can follow the process depicted in FIG. 2B1.

Some implementations further protect the registered user's identity. In FIG. 5A2, the interested third-party, or first user, accesses (120) a webpage 121 where they enter (122) personal descriptive information, like their name or their function. Examples of the personally descriptive information may include financial advisor, broker, doctor, tax preparer, or spouse in some embodiments. In some implementations, the requested resources may be the authentication of the first user, in some implementations the resource is information that is restricted or requires the approval of the second user, and in some implementations the resource may be access to the registered or second user's personal account or information, or authorization to complete a transaction. In FIG. 5A2, the AS 202 creates a record 18 that includes the user info, access context, and channel information. The session database 208 creates (19) a token value, sets the current time, and set authentication status to in-process. After the session database 208 returns (20) the token value and time to the AS 202, the AS creates (124) an authentication credential reflecting that the user is not authenticated, the token value, and the time. The first user is presented (72) with a token value that they communicate to the registered user.

Figure 5C:
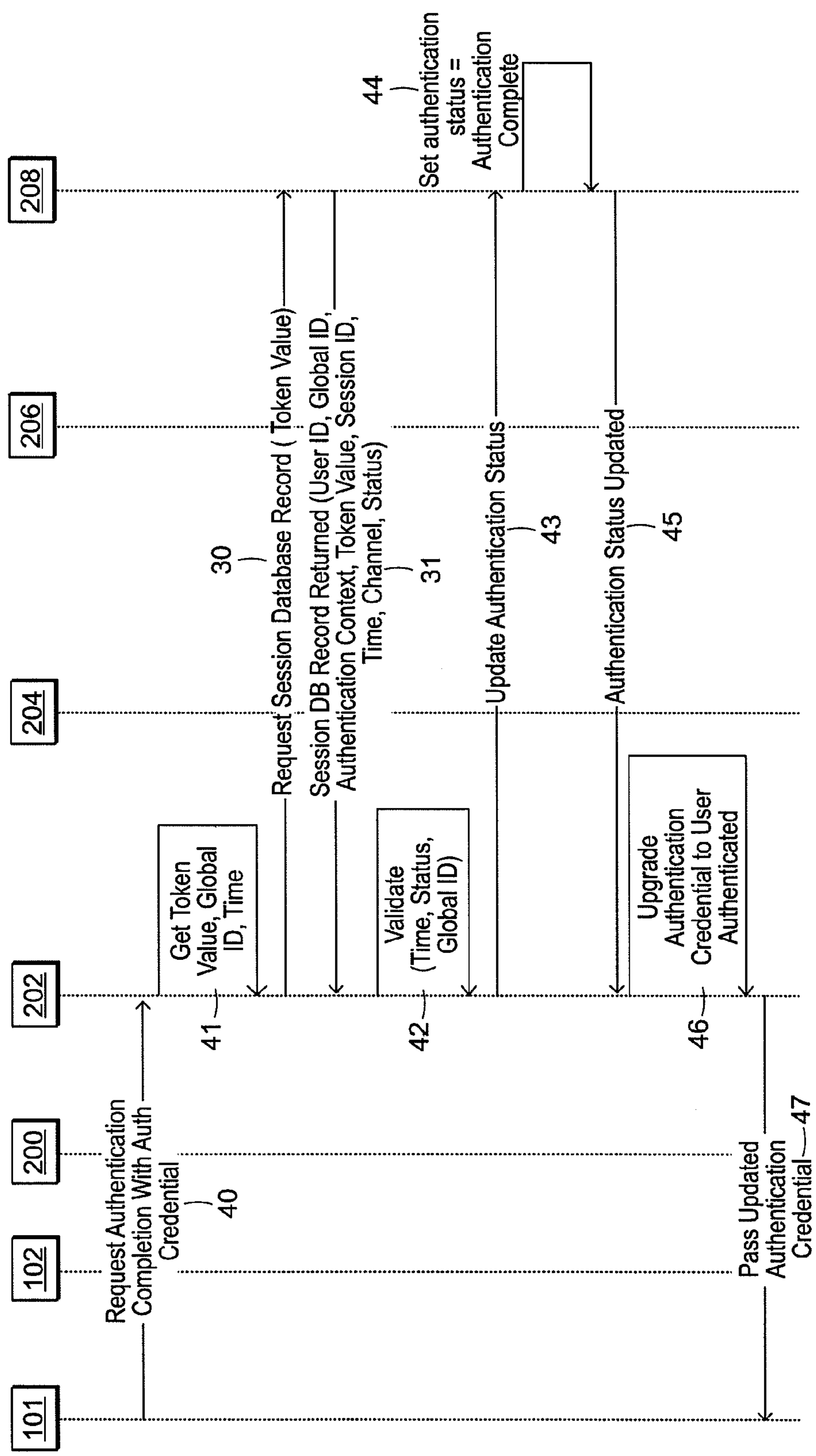

After receiving the token value and the request to complete the authorization process on a second channel, the registered or second user authenticates themselves in some implementations. The second user may authentication themselves through a traditional authentication process, in other implementations the second user may authenticate themselves uses the multi-channel process shown in FIGS. 2A-2C. Next, the second user may access an alternate, or second channel that challenges (26) them for the token value. In FIG. 5B2, after the AS 202 validates the token, authentication, context, time and status 251, the second user is presented (251) with the descriptive information that was entered by the third-party. If satisfied, the second user can authorize (252) the third-party user's access. Upon receiving the indication of authorization from the second user, the AS 202 updates the authorization status and the session DB 208 updates (255) the session record, including setting the authorization 36 status to authorized. The updated status is returned (38) to the AS 202, and the AS requests (154) that the second user inform the first user that the first user may continue the session on user agent 1 101. As before, in FIG. 5C, the third-party user continues on the first channel and is granted an authentication credential as if they were the registered user.

In FIGS. 5A2 and 5B2, none of the second (registered) user's authentication information was exposed to the third-party because the second user is allowed to withhold the password or authentication parameter from the first user and enter their authentication parameter(s) over a second channel. The second user's user ID, or other first authentication parameter in alternative embodiments, may be exposed but not the second user's Password, or second authentication parameter. In some implementation the second user ensures that their account is safe from unauthorized access by the first user at a later time and that none of their authentication information is publicly distributed. However, the authorization context may permit the first user access to the second user's personal information, financial, or other sensitive materials and information. The first user is therefore able to access the second user, or registered user's account information with limited exposure of the second user's authentication parameters.

In FIG. 5C, after the second user enters the second authentication parameter on the second device (associated with user agent 2 102), the first user continues on the first channel associated with user agent 1 101 (see e.g., FIG. 2C), and is granted an authentication credential as if they were the owner of the account.

In FIG. 6, a registered user accesses a third-party session that was authorized or authenticated by the registered user and can terminate the session if desired. In other implementations, the second (registered) user may upgrade or downgrade the access of the first user to the resource or multiple resources. In some implementations, the registered user who is associated with user agent 2 102, requests to be connected (25) to a resource that determines the status of a session associated with the first user. The system then requests the token value (26) and the authentication parameter which may be a channel specific PIN (29) associated with the user. After the registered user enters the token value and their Password, the back-end system updates (36) the authentication status of the user session associated with the first user to reflect the status indicated by the second user 126. In some implementations, the status may be session terminated, in other implementation it may be session downgrade or upgrade. The second user is notified (128) that the first user's session has been terminated. In some implementations, the second user will be notified that the first user's access has been upgraded or downgraded. The status is kept with the session data (127) associated with the third-party user's session ID. When the third party user next requests (129) the resource, the termination status 130 is detected and the third-party user session is ended (131). In some implementations, an upgraded or downgraded status of the first user's session may be detected and the first user's session is appropriately modified to reflect the new status set by the second user (account owner/registered user).

In similar and related implementations, FIGS. 7A1-7C1 and FIGS. 7A2-7C2 show how to provide a means for a parent to authorize session-wide and transaction specific access to requested resources by an otherwise access-restricted, minor-child account holder. FIG. 7A3 also describes a means to provide a joint account type authorization facility for resources that require multiple user approval.

In one implementation a first user authenticates themselves, but still requires an authenticated second user to authorize the first user's session. In FIG. 7A1, the first user, here a minor child, has an account and is logged-in and navigating to low level resources. The implementation shown in FIG. 7A1 is similar to the implementation shown in FIG. 3A. However, in FIG. 7A1 when the child requests (63) a resource 307 that requires a stronger authentication parameter (e.g. parental approval), the high-value resource validator 305 indicates (87) that parental approval is necessary. In some implementations the resource can be a change of personal data, in other implementations the resource can be a limited-access website, or in an other implementations the resource can be a requested transaction. The high-value resource validator 305 redirects (65) the first user to complete the process necessary to access the restricted resource. The minor is presented (72) a token value and the instruction to communicate the token value to the second user, their parent, and have their parent allow access to the minor.

In another implementation a first user will authenticate themselves, but still requires that a second user authorize the first user's access to a requested resource. FIG. 7A2 shows one implementation where a first user, here a minor, tries to complete a transaction but the minor does not have the authentication credentials required by the resource. In some implementations, the minor can access lower-level resources without the higher value credential(s). When the minor requests (63) a higher level resource 307 that requires parental approval, the AS 202 recognizes (87) that the first user's request requires parental approval to complete. In some implementations this approval may be provided by any second user who is authorized to approve the first user's request for the resource, for example a teacher or supervisor. The AS 202 directs (67) the session database 208 to create a transaction record that includes the user ID, global ID, transaction details, channel, parental approval and session ID. The session database 208 sets (56) the authentication status by deleting the transaction ID records for the user ID 1, session ID 1 and sets the authentication status as open, or in an alternative implementation as user 1 (first user) approved. The session database 208 also creates (57) a transaction ID value, and sets the current time and authentication status as open. The minor is redirected (65) to the AS 202 to acquire stronger authentication credentials, in this implementation: parental approval. The AS 202 acquires (33) the user ID and makes a request (18) to the Session DB 208 to create (31) a record that includes, for example, user ID, global ID, transaction details, channel, parental approval and session ID. The session DB 208 retrieves the last transaction ID for user ID1, and the session ID 58, creates (69) a token value, combines the token value with the other values provided and the current time. The session database 208 also can create a session database entry, setting its authentication status value to in-progress, or in some implementations to in-progress, transaction ID. The session DB 208 returns (20) this information to the AS 202 which uses this information to update (71) the current user authentication credential with the token value and the time. The AS 202 sets authentication credentials on user agent 1 101 and presents (72) the token value to user agent 1 101, with instructions to inform a parent to complete the additional authentication steps on another channel, which may be, for example, user agent 2 102. In some implementations, the first user is instructed (72) to inform the other joint account owner to authorize the transaction on another device/channel (e.g., FIG. 7A3).

After completing the process disclosed in FIG. 7A1 or 7A2, the minor communicates the token value to a parent and asks the parent to indicate approval for the minor's access to the resource. In some implementation, FIG. 7B1, the parent authenticates themselves. In some embodiments, the parent, or second user, may authenticate themselves using a traditional single channel method, while in other embodiments, the parent/second user may authenticate themselves using a multi-channel method, which in some implementations may be similar to the method disclosed in FIG. 2A-2C above. In this embodiment, the parent, associated with user agent 2 102, requests parental authorization 78.

In FIG. 7B1, the parent may use the phone as the second channel. In some implementations, the parent, or second user, may use a computer, or a wireless device like a cell phone, a handheld computing device, a PDA, or a Blackberry device. The Authentication Service 202 requests (30) the session data from the session DB 208, based on the inputted token value. The session DB 208 uses the token value to acquire and return (31) the database record including, for example, the entry creation time, user ID, global ID, authentication context, token value, session ID, time, channel, parental approval for the session, and the authentication status to the AS 202. In some implementations the session DB 208 can return instructions requiring parental approval of the session (174). The AS 202 validates (80) the token and time. The ID system 206 confirms (147, 148) that the second user is an "authorized parent" for the first user. If the second user is an authorized parent, the AS 202 presents (149) the first user's information to user agent 1 101 and requests that the second user approve the first user's to access the requested resource. After verifying the first user's information, the parent authorizes (150) the request, and the AS 202 updates (36) the authorization status. The session DB 208 updates the authorization status with the parent authorization upgrade and the parent authentication information 152, and notifies (38) the AS 202 that the status has been updated. The AS 202 requests that the session be completed (22) on the first channel associated with user agent 1 101. In some implementations, the AS request (154) that the second user inform the first user to continue their session on the first channel.

In FIG. 7B2, after the ID system 206 confirms (147, 148) that the second user is an "authorized parent" for the first user, the AS 202 requests permission to proceed with the transaction (177). After the second user grants permission to proceed 178, the AS 202 requests (179) the transaction database record (Transaction ID) from the session database 208. The session database 208 provides the transaction details 180 through the AS 202, which passes (181) the transaction details to the second user and asks for the second user to approve the transaction. After verifying the transaction detail information, the second user indicates their approval (150), and the AS 202 updates (36) the authorization status. The session DB 208 sets the authorization status to parent authorization upgrade for transaction and parent authentication information 185. In addition, the status of the session is marked as parental approval and the transaction record reflects the transaction ID, and an appendix to the record with the second user's authentication information is created. An updated status message is sent (38) to the AS 202, and the AS 202 requests (154) that the second user inform the first user that they may continue their session on user agent 1 101.

In FIG. 7C1, after the second user (Parent) has authenticated or authorized the first user's (minor's) request for the resource, the first user may continue his session (155) on the first channel/device. The AS 202 obtains the token value, the global ID, and the time from the authentication credential delivered with this user request. Using the token value, the AS 202 requests (30) the session DB 208 to acquire the session database record associated with the token value provided. The session DB 208 returns (31) the session database record that includes the user ID, global ID, authentication context, token value, session ID, creation time, channel, and authentication status in some implementations. The authentication service 202 validates (91) the time, authentication status and global ID and confirms, in some implementations, that there is parental approval 159 for the session. In other implementations other forms of approval may be validated. The AS 202 uses the session DB 208 to update (43) the authentication status in the session database to parent authorization upgrade complete (161). In some implementations the authentication status may be updated to reflect that joint approval is complete. The AS 202 now reflects the upgraded authentication credentials, which in some implementations may reflect parental approval, and in some implementations (FIG. 7C2) may reflect no strength upgrade 187.

In FIG. 7C1, the upgraded authentication credentials, including an indication of parental approval in some embodiments, are built (163) and returned (95) to user agent 1 101 and the first user is redirected (96) back to access (97) the higher level requested resource.

In some implementations, FIG. 7C2 would follow after FIG. 7B2. After the AS 202 creates the updated authentication credential 187, which in this implementation contains no strength upgrade, the updated authentication credential and the transaction ID are returned (188) to the first user. The first user requests (189) the high-value resource and provides the transaction ID, which is used to retrieve (190) the transaction record. The session database 208 returns (191) the transaction record, which is validated (192) for parental approval, or another form of approval in some implementations, and the transaction details are posted (193). The resource validator 306 then updates (194) the transaction record with the session database 208, which records the status as transaction complete 195. The first user 101 is informed that the transaction was completed (97). The transaction is completed because the second user 102, or parent's, electronic signature authorizing the transaction, as well as the transaction details were captured during the authorization process, allowing the transaction to be executed.

In FIG. 7A3, a holder of a joint account attempts to perform a transaction that requires the approval of both account participants. The transaction application creates and sets an electronic signature request record into a session database 208 then it redirects the user to the authentication service 202. In some implementations the record will include user ID, global ID, transaction details, channel, joint approval for transaction, and session ID. The authentication service 202 creates a joint user session database entry that refers to the signature request entry. The entry may contain a session ID and sign status with an indication that the first user is approved. The token value created for this entry is returned to the first account holder with instructions for the second account holder to complete the approval process.

The second account holder, associated with user agent 2 102, logs on to the system and navigates to a location where they are asked for the token values. The electronic signature request is presented along with a display of the details of the transaction being requested (e.g., FIG. 7B3). The second user approves the transaction and informs the first user that the first user may complete the transaction 154.

In FIG. 7C3, the first user continues in an implementation similar to the FIG. 7C2. However, in this implementation, the AS 202 searches for joint approval 329 for the transaction, and the transaction record is an electronic signature record 335 and the resource requested is joint authorization for a transaction secured by the electronic signature. This causes the electronic signature transaction to be extracted from the session database 208 and presented to the application for execution. The user is informed of the completion of the requested transaction.

Another implementation of the multi-channel method includes a requested credit card transaction. In a first implementations, the user requests that credit card issuer contact user via a specific device for all transactions over a certain dollar amount. When the card is swiped and the transaction amount input for authorization exceeds user-defined limit, the user is contacted over the selected device by the credit card issuer back-end system and asked to provide an ID and credential, or other authentication parameter. This request for the authentication parameter may be executed at the time of purchase, or point of sale in some implementations, in other implementations the credit card back-end system may contact the credit card account owner, at another time that is not the time of sale. The back-end system authorizes the transaction only after the credentials are validated.

In another implementation, a credit card transaction may be authorized or authenticated using multiple channels. In a first implementation this includes, for example, a credit card service 401, credit card authorization 402, an AS 202, an authentication validator 204, an ID system 206, and a session database 208.

Figure 8A:
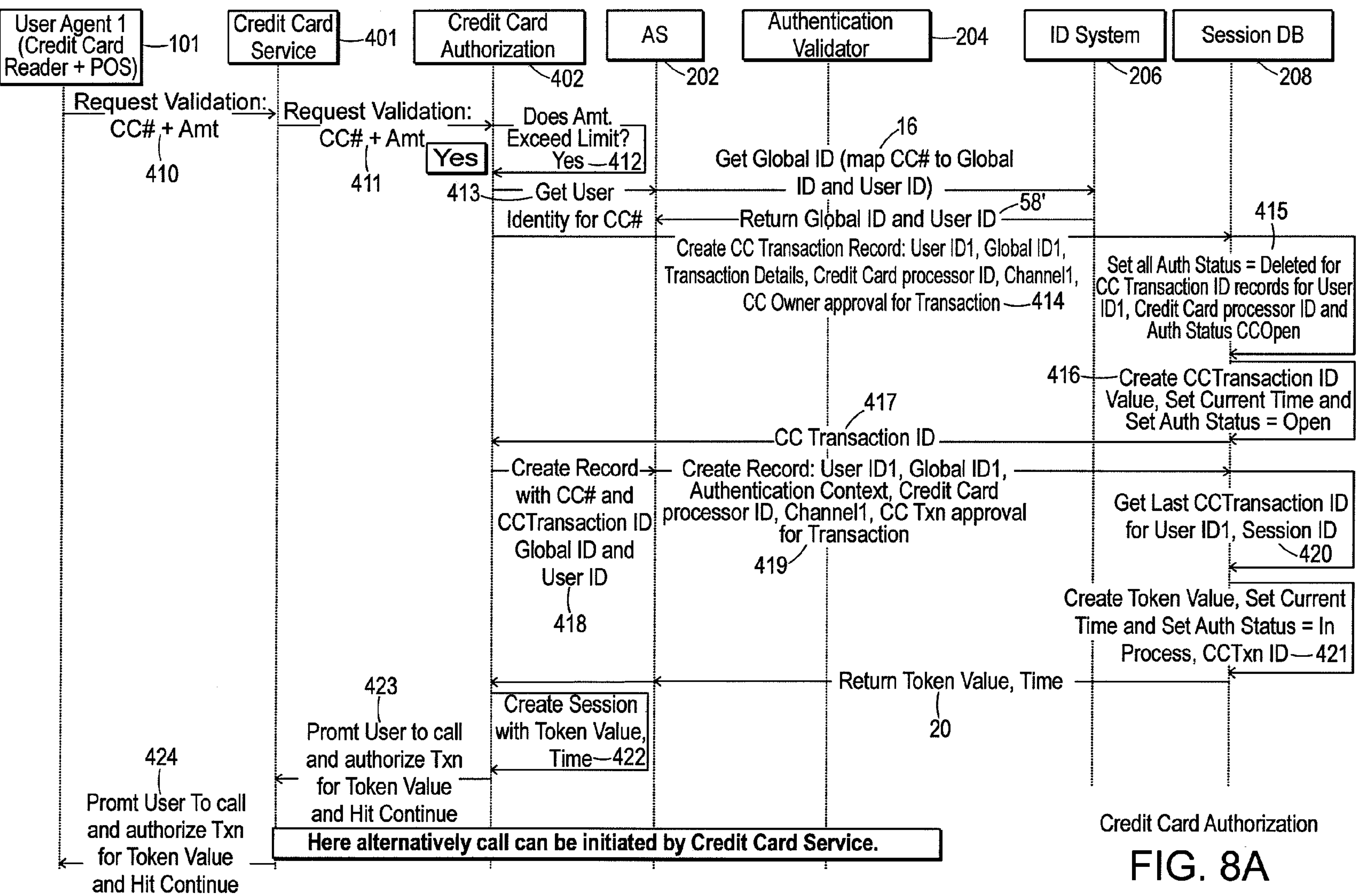
FIG. 8A-8C shows a multi-channel authentication process for a credit card transaction.

In FIG. 8A, a merchant associated with user agent 1 101 tries to make a transaction using a credit card on behalf of a credit card owner. In this embodiment the Credit card service requests validation (410) for the transaction, when the transaction is more than the previously-determined allowed limit 412. The credit card authorization 402 forwards the authorization process to the AS 202, authentication validator 204, ID system 206 and session DB 208, which create a record, and creates a session 422 with the token value and time. The user is provided with a prompt 424 to call and authorize the transaction.

In FIG. 8A, the first user, which may be for example the credit card reader at the point of sale, sends a request (410) to the credit card authorization 402. The credit card authorization 402 determines if the amount is greater than the predetermined limit 412. If the amount requested for the transaction is greater than the pre-determined limit, then the credit card authorization 402 retrieves the user ID 413 and the global ID 16, and map the credit card number to the global id and user ID for the ID system 206. The ID system 206 returns the global ID and the user ID 58' to the AS 202 which then creates a transaction record 414. The transaction record included user ID1, global ID1, the transaction details, the credit card processor ID, channel 1, and the credit card approval for the transaction. Next, the session DB 208 sets the authentication status 415 by deleting the credit card transaction ID records for user ID1, and setting the credit card processor ID and authorization status to credit card open. Next, the credit card authorization 402 requests the AS to create (418) a record that includes the credit card number, the credit card transaction ID, the global ID and the user ID 418. After creating the record 419, the session Db creates a token value and sets the authentication status to: In Process 412. The session DB 208 then returns the token value and the time (70) to the credit card authorization 402 which creates a session associated with the token value 422 and prompts the credit card service, which subsequently prompts the user (423, 424) to authorize the transaction associated with the token value on a second channel. In some implementations, the credit card reader may use a phone or telephone line as a second channel. In some implementations, the credit card owner, or second user who is associated with user agent 2 may use a computer or wireless device to authorize the transaction.

In some implementations, the call to authenticate or authorize the transaction may be initiated by the credit card company. In some implementations, the credit card company will have phone numbers on record to call a second user when a transaction is made that requires additional authentication or authorization.

Figure 8B:
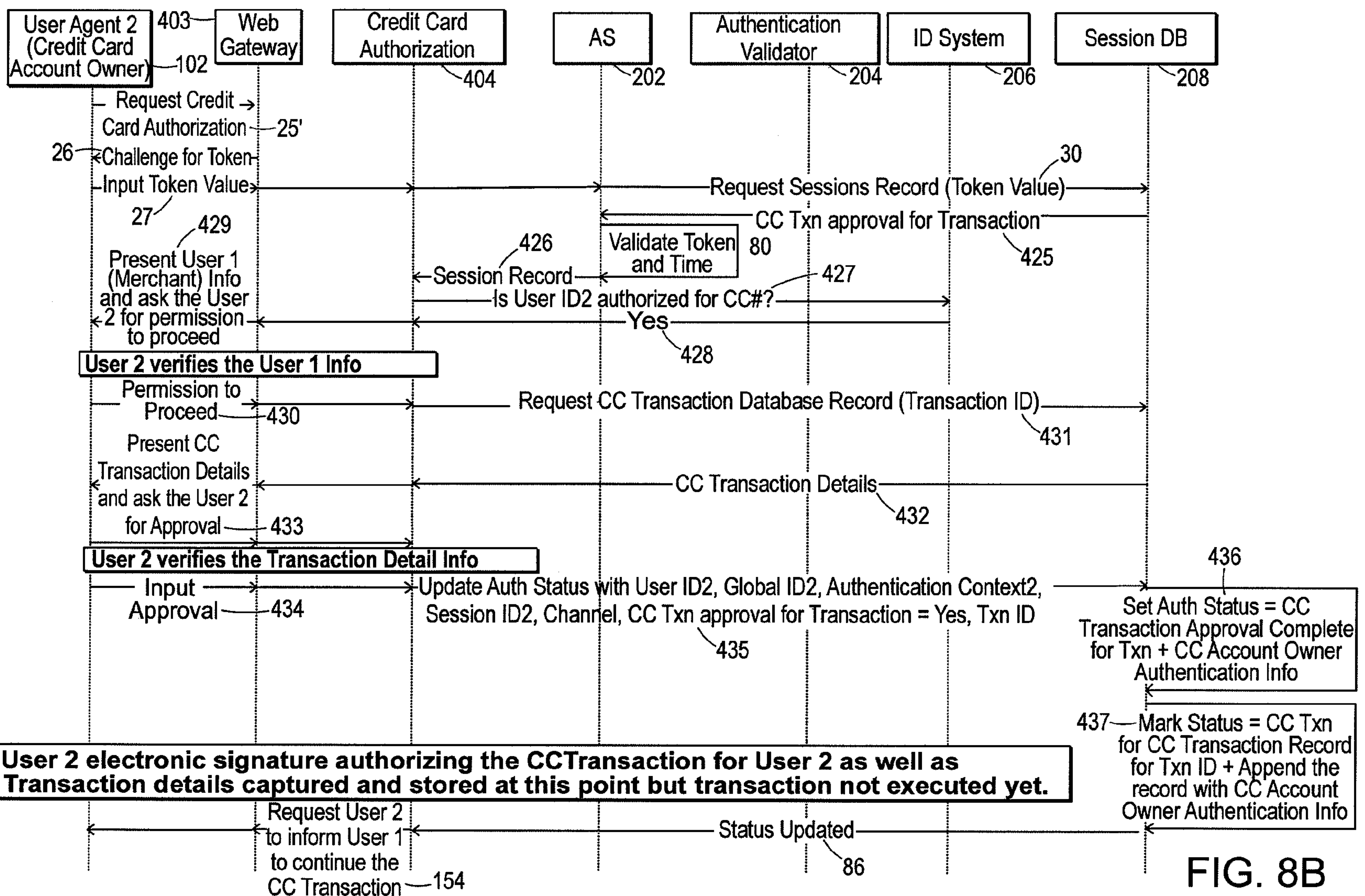
Figure 8C:
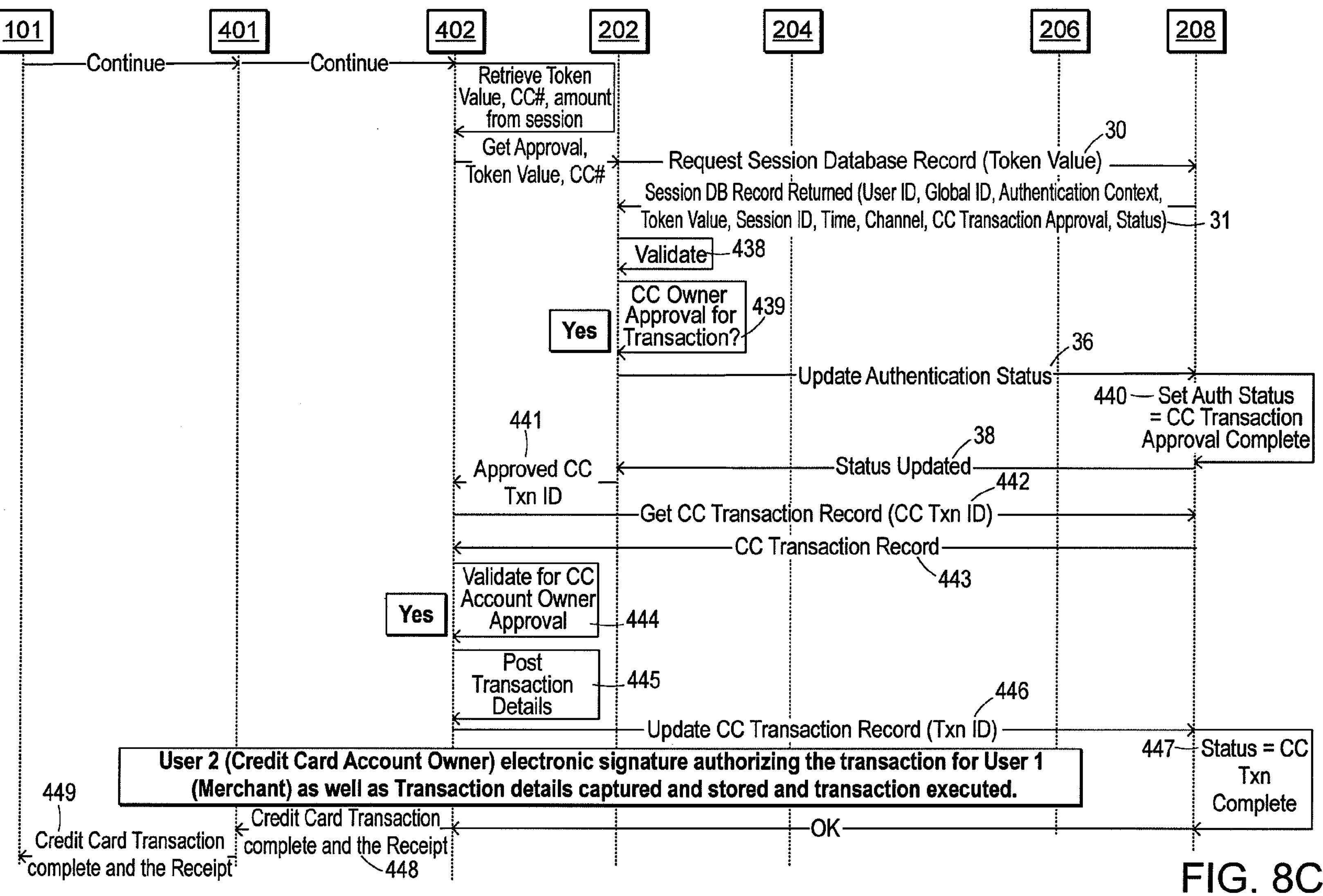

In FIG. 8B, the merchant passes the token to the credit card owner and requests that they complete the authorization process. In some implementations the credit card owner, or second user may authenticate himself through a traditional authentication process on an additional channel, in other implementations the second user may authenticate himself using a multi-channel process which in some embodiments may be similar to the process shown in FIGS. 3A-3C1. In some implementations the second user, or credit card owner, may authenticate themselves on the second channel associated with user agent 2 102. The second user may authenticate themselves on the channel associated with user agent 2 102 by entering the token and a user ID and password in some implementations, or a second and/or additional authentications parameter in an alternative implementation. The second user, who is now associated with the second channel now follows a process similar to the process disclosed in FIG. 7B2. In this implementations parental approval is not required, but rather the second user must be authorized to make the credit card transaction (427) and approval for the credit card transaction is needed. The authorization and approval are both stored by the back end system in the credit card transaction record 432. After the second user provides approval for the transaction (434), the status of the session associated with requested credit card transaction is updated (86). The second user is then instructed (154) to inform the first user, or merchant, to complete the transaction.

In 8C, the second user completes the transaction if the authentication parameters entered by the second user, or credit card account owner are validated. In some implementations, the second users can indicate approval for the transaction to proceed. The credit card authorization 402 provides the approval, token value, and credit card number to the AS 202 which requests (30) the database record. The session DB 208 returns (31) the database record that includes the user ID, global ID, authentication context, token value, session ID, time, channel, credit card transaction approval, and status. The AS 202 then validates the session DB record, and determines (39) that the credit card owner provided approval for the transaction. The updated authentication status 36 is then returned to the session DB 208, which sets (440) the authentication status to credit card transaction approval complete. The updated status is then returned (38) to the AS 202, and the approved credit card transaction ID 441 is retuned to the credit card authorization 402. The credit card authorization validates (444) the credit card account owner's approval and posts (445) the transaction details. The credit card authorization 402 then updates (446) the credit card transaction record in the session DB 208, which records the new status as credit card transaction complete 447. After the status is updated, the credit card authorization sends notification (401) of the completed transaction and the receipt to the credit card service 401 which then forwards (449) the information onto the end-user associated with user agent 1 101.

The above-described techniques can be implemented in digital electronic circuitry, or in computer hardware, firmware, software, or in combinations of them. The implementation can be as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit ("IC"), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges ("PBX"). In any of these cases, implementation may be achieved either by writing applications that are native to the chosen platform, or by interfacing the platform to one or more external application engines.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communications, e.g., a communications network. Examples of communications networks, also referred to as communications channels include a local area network ("LAN") and a wide area network ("WAN"), e.g., the Internet, and include both wired and wireless networks. Unless clearly indicated otherwise, communications networks can also include all or a portion of the PSTN, for example, a portion owned by a specific carrier.

The computing system can include clients and servers. A client and server are generally remote from each other and typically interact through a communications network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A method for using multiple channels to authenticate an unauthenticated user in an electronic session, the method comprising:

receiving, by an authentication system, a first authentication parameter from the unauthenticated user only over a first electronic communication channel from a first device;

initiating, by the authentication system, the session by creating an electronic session record for the unauthenticated user;

assigning, by the authentication system, a token value to the session record, wherein the token value comprises a unique identifier of the session;

setting, by the authentication system, an authentication status value corresponding to the session record to indicate that authentication for the unauthenticated user in the session is in progress;

transmitting, by the authentication system, the token value to the unauthenticated user only over the first channel;

receiving, by the authentication system, the token value and a second authentication parameter from the unauthenticated user only over a second electronic communication channel from a second device, wherein the authentication system receives the token value and the second authentication parameter without prior knowledge of the second device being associated with the second channel and wherein the second authentication parameter is different from the first authentication parameter;

retrieving, by the authentication system, the session record of the session initiated on the first channel based on the token value received from the unauthenticated user over the second channel, wherein the token value associates the first authentication parameter received over the first channel to the second authentication parameter received over the second channel;

authenticating, by the authentication system, the unauthenticated user referenced by the session record of the session based on the first authentication parameter received only over the first channel and the second authentication parameter received only over the second channel, wherein the session remains open during the authenticating;

updating, by the authentication system, the authentication status value to indicate that the unauthenticated user is authenticated; and upgrading, by the authentication system, the session record after authentication to allow the authenticated user to continue the session on at least the first or second channel.

2. The method of claim 1, further comprising:

notifying the authenticated user over the second channel that the authentication is complete.

3. The method of claim 1 wherein the first channel is a phone line, a wireless connection or an online connection.

4. The method of claim 1 wherein the second channel is a phone line, a wireless connection, or an online connection.

5. The method of claim 1 wherein the first authentication parameter is a user ID, password, hard token, soft token, wireless applet, voiceprint, or any combination thereof.

6. The method of claim 1, wherein the second authentication parameter is a user ID, a password, a hard token, a soft token, a wireless applet, a voiceprint, or any combination thereof.

7. The method of claim 1, further comprising:

receiving the token value and at least one additional authentication parameter over at least one additional channel.

8. The method of claim 7, wherein the additional authentication parameter is a user ID, a password, a partial password, a portion of the first authentication parameter, a portion of the second authentication parameter, or a combination of the first and the second authentication parameters, a hard token, a soft token, a wireless applet, a voiceprint, or any combination thereof.

9. The method of claim 7, further comprising using the token value to associate the first authentication parameter, the second authentication parameter, and the at least one additional authentication parameter.

10. The method of claim 7, further comprising using the first authentication parameter, the second authentication parameter, and the at least one additional authentication parameter to authenticate the user.

11. The method of claim 7, wherein the at least one additional channel is not the first channel or the second channel.

12. An authentication system for using multiple channels to authenticate an unauthenticated user in an electronic session, the authentication system comprising:

means for receiving a first authentication parameter from the unauthenticated user only over a first electronic communication channel from a first device;

means for initiating the session by creating an electronic session record for the unauthenticated user;

means for assigning a token value to the session record, wherein the token value comprises a unique identifier of the session;

means for setting an authentication status value corresponding to the session record to indicate that authentication for the unauthenticated user in the session is in progress;

means for transmitting the token value to the unauthenticated user only over the first channel;

means for receiving the token value and a second authentication parameter from the unauthenticated user only over a second electronic communication channel from a second device, wherein the means for receiving the token value and the second authentication parameter does not have prior knowledge of the second device being associated with the second channel and wherein the second authentication parameter is different from the first authentication parameter;

means for retrieving the session record of the session initiated on the first channel based on the token value received from the unauthenticated user over the second channel, wherein the token value associates the first authentication parameter received over the first channel to the second authentication parameter received over the second channel;

means for authenticating the unauthenticated user referenced by the session record of the session based on the first authentication parameter received only over the first channel and the second authentication parameter received only over the second channel, wherein the session remains open during the authenticating;

means for updating the authentication status value to indicate that the unauthenticated user is authenticated; and means for upgrading the session record after authentication to allow the authenticated user to continue the session on the first or second channel.

13. A computer program product, tangibly embodied in a non-transitory computer readable medium, for using multiple channels to authenticate an unauthenticated user in an electronic session, the computer program product including instructions being operable to cause data processing apparatus to:

receive a first authentication parameter from the unauthenticated user only over a first electronic communication channel from a first device;

initiate the session by creating an electronic session record for the unauthenticated user;

assign a token value to the session record, wherein the token value comprises a unique identifier of the session;

set an authentication status value corresponding to the session record to indicate that authentication for the unauthenticated user in the session is in progress;

transmit the token value to the unauthenticated user only over the first channel;

receive the token value and a second authentication parameter from the unauthenticated user only over a second electronic communication channel from a second device, wherein the token value and the second authentication parameter are received without prior knowledge of the second device being associated with the second channel and wherein the second authentication parameter is different from the first authentication parameter;

retrieve the session record of the session initiated on the first channel based on the token value received from the unauthenticated user over the second channel, wherein the token value associates the first authentication parameter received over the first channel to the second authentication parameter received over the second channel;

authenticate the unauthenticated user referenced by the session record of the session based on the first authentication parameter received only over the first channel and the second authentication parameter received only over the second channel, wherein the session remains open during authentication;

update the authentication status value to indicate that the unauthenticated user is authenticated; and upgrade the session record after authentication to allow the authenticated user to continue the session on the first or second channel.

* * * * *